US012718232B2

(12) United States Patent
Petersen et al.

(10) Patent No.: US 12,718,232 B2
(45) Date of Patent: *Aug. 25, 2026

(54) NETWORK-LEVEL EXCHANGE MODIFICATION FOR NETWORK-BASED EXCHANGES

(71) Applicant: 1080 Network, Inc., Lakeway, TX (US)

(72) Inventors: Christopher Petersen, Lakeway, TX (US); Tim Kuchlein, Lakeway, TX (US)

(73) Assignee: 1080 Network, Inc., Lakeway, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/249,232

(22) Filed: Jun. 25, 2025

(65) Prior Publication Data

US 2025/0384437 A1 Dec. 18, 2025

Related U.S. Application Data

(63) Continuation of application No. 18/343,276, filed on Jun. 28, 2023, now Pat. No. 12,373,827.

(51) Int. Cl.
*G06Q 20/38* (2012.01)
*G06Q 20/40* (2012.01)

(52) U.S. Cl.
CPC ..... *G06Q 20/3829* (2013.01); *G06Q 20/4014* (2013.01); *G06Q 20/4016* (2013.01)

(58) Field of Classification Search
None
See application file for complete search history.

(56) References Cited

U.S. PATENT DOCUMENTS

| | | | | |
|---|---|---|---|---|
| 11,811,752 | B1 | 11/2023 | Petersen et al. | |
| 2005/0171848 | A1 * | 8/2005 | Walker | G06Q 20/00 705/14.38 |
| 2021/0073797 | A1 | 3/2021 | Medwed et al. | |
| 2021/0295305 | A1 | 9/2021 | Sheets et al. | |
| 2022/0058684 | A1 * | 2/2022 | Balsavias | G06Q 30/0208 |

OTHER PUBLICATIONS

Stephanie Salomon, "How to advance your coupon code strategy with Global Savings Group's Dynamic Coupons", Aug. 14, 2018 (Year: 2018).*

* cited by examiner

*Primary Examiner* — Patrick McAtee
*Assistant Examiner* — Timothy Paul Sax
(74) *Attorney, Agent, or Firm* — Alston & Bird LLP

(57) ABSTRACT

Various embodiments of the present disclosure provide techniques for modifying a value of a credential-less exchange in near real time using a plurality of identifier mappings, member interfaces, and exchange modifiers. The techniques may include receiving an exchange request for executing a value-based exchange that is indicative of a universally unique ephemeral key (UUEK) and one or more request attributes. The techniques include identifying an exchange data object based on the UUEK and identifying a user exchange modifier for the exchange request based on the exchange data object and the request attributes. The techniques include generating a modified exchange value for the exchange request based on the user exchange modifier and providing an exchange authorization request to a member platform with the modified exchange value.

20 Claims, 13 Drawing Sheets

518
440
102
PERSISTENT CREDENTIALS 514
MEMBER USER IDENTIFIER 522
KEYS 516
MEMBER INSTRUMENT IDENTIFIER 508
USER REFERENCE 502
INSTRUMENT REFERENCE 520
EUUK 524
PARTNER PARTITION 506
SERVICE PROVIDER PARTITION 504
EXCHANGE IDENTIFIER 510
SYSTEM IDENTIFIERS 512
KEYS 516

NETWORK-LEVEL EXCHANGE MODIFICATION FOR NETWORK-BASED EXCHANGES

CROSS-REFERENCE TO RELATED APPLICATIONS

This application claims the benefit of U.S. Non-Provisional patent application Ser. No. 18/343,276 filed Jun. 28, 2023, and which is incorporated herein by reference in its entirety, including any figures tables, drawings, and appendices.

TECHNOLOGICAL FIELD

Embodiments of the present disclosure generally relate to credential-less exchanges of value between multiple entities in an exchange network.

BACKGROUND

Various embodiments of the present disclosure address technical challenges related to network-based value exchanges given limitations of existing exchange processing techniques and architectures. Existing processes for executing an exchange over a computing network rely on the use of persistent credentials, such as payment credentials (e.g., card numbers, usernames, passwords, bank routing numbers, account numbers, etc.) and their proxies, which expose recipients of the credentials to fraud, regulatory and compliance costs, and reputational risk. Moreover, due to the static nature of traditional credentials, users must accept risk of financial loss, damaged credit scores, identity theft, and other outcomes each time the user provides their credentials to enable a transaction. The inherent insecurity of persistent credentials is conventionally addressed using strict communication protocols, data governance procedures, and authentication schemes, each of which introduce additional technical problems by adding overhead and complicating network-based transactions without solving the root technical problem of data security.

For example, traditional service providers that manage user accounts may limit their exposure using disclaimers that prevent users from providing their credentials to certain third parties. This leads to network congestion as a limited number of approved parties are overloaded by requests across a population. Moreover, approved parties are required to enroll a user by obtaining sensitive, persistent credentials (e.g., username, passwords, routing/transit credentials, etc.) from the user and then subsequently manage a robust number of persistent credentials across a number of enrolled users. This presents a single attack vector for malicious parties to obtain sensitive user information for a population of users. To counter such attacks, traditional transaction processing entities are required to adopt costly, resource intensive, and robust data governance procedures and authentication schemes that are imperfect and still subject to infiltration.

Other techniques for addressing data security include limiting exchange communications, such as those for financial transactions, to strict messaging standards, such as ISO messaging standards, which are inflexible and, by design, unable to provide contextual data, such as object identifiers, for transactions. By doing so, these techniques prevent the application of exchange modifiers to object-level attributes involved in an exchange, among other functionalities, that would otherwise provide seamless network-based exchanges.

For example, traditional exchange networks lack the ability to handle exchange modifications and, therefore, lack the ability to adjudicate exchange modifiers, such as discounts, reward programs, and/or the like, involved in an exchange request. Accordingly, traditional approaches for handling exchange modifiers for value-based exchanges require the individual distribution and handling of digital and paper coupons, which may lead to rampant fraud and delayed reconciliation. For instance, traditional exchange modification techniques require a user to present an exchange modifier to a partner who, in return, modifies an exchange value at the partner's expense. To recover the expense, the partner is then required to generate paper copies of the exchange modifiers and physically transfer the paper copies to a third-party sorting house where the exchange modifiers may be manually sorted (at times by hand) and reconciled. Once reconciled, a report is generated and sent to the provider that generated the exchange modifier who then verifies the use of the exchange modifier and, only if verified, provides a value return to the partner. Thus, traditional techniques include a convoluted process that involves multiple time-consuming operations between a plurality of disparate actors before a value is returned to the partner that accepts an exchange modifier. Accordingly, traditional exchange modifiers are not realized in near real time and instead are programmatic campaigns with little to no control over misuse by bad actors. Ultimately, this lowers the value of exchanges at a partner that accepts exchange modifiers, results in significant time delays to receive a value return after accepting an exchange modifier, increases carbon footprint (e.g., by requiring the generation of paper copies, etc.), increases risk of fraudulent activities, restricts innovation, and prevents traceability of exchange modifiers, among other technical challenges.

Various embodiments of the present disclosure make important contributions to various existing network-based exchange processing techniques by addressing each of these technical challenges.

BRIEF SUMMARY

Various embodiments of the present disclosure disclose a secure intermediary computing platform and computing services that facilitate the credential-less execution of a value-based exchange that leverages UUEK (Universally Unique Ephemeral Key) to eliminate the use of persistent credentials. To do so, the intermediary computing platform may facilitate interactions between one or more member platforms to register a user and/or a user instrument in a value exchange system that is powered by a new, ephemeral data structure referred to herein as a UUEK. Unlike conventional exchange systems, the intermediary computing platform does not receive or rely upon persistent user or instrument credentials to register a user and/or a user's instrument. The elimination of such credentials enables the use of new, more flexible, interfaces, such as application programming interfaces (APIs) described herein, that are leveraged by the intermediary computing platform to communicate with different network members to register a user, a user's instrument, and user exchange modifiers, without exposing user credentials at any step in the process. Once registered, the intermediary computing platform may issue UUEKs to a member platform that may replace traditional, persistent credentials. The issued UUEKs are not reflective of persistent credentials or any other sensitive user or instrument information. Interfaces between a member platforms and the intermediary platform may allow (i) a user to present the issued UUEK (without explicit reference to a persistent credential) from a member platform to an intermediate platform and (ii) the intermediary platform to map the issued UUEK to instrument keys for the same or another member platform and provide the instrument keys to the member platform to authorize a value-based exchange. In this way, network-based transactions may be authorized in a seamless process without exposing sensitive user or instrument information that may be susceptible to network attacks.

By doing so, some of the techniques of the present disclosure enable the use of flexible interfaces, such as APIs, between entities of a value-based exchange. These interfaces may enable requests and/or responses between the entities that (i) allow the transfer of contextual information, such as object identifiers, during the execution of a value-based exchange and (ii) enable the generation of user-specific exchange modifiers for incentivizing and/or deterring user conduct. In this way, the execution of a value-based exchange may be predicated based at least in part on the adjudication of user-specific exchange modifiers as well as object-level details of the value-based exchange. As described herein, this allows for the enforcement of exchange modifiers by an intermediary platform, without risk of exposing sensitive user or financial information. Ultimately, the techniques of the present disclosure enable additional flexibility (e.g., through the use of new interfaces, etc.) and security (e.g., through the elimination of persistent credentials, etc.), while reducing computing power requirements and enabling significantly greater network throughput for exchange processing relative to traditional techniques.

In some embodiments, a computer-implemented method includes receiving, by one or more processors and using a partner interface, an exchange request for executing a value-based exchange, wherein the exchange request is indicative of (i) a universally unique ephemeral key (UUEK) that comprises an exchange identifier and (ii) one or more request attributes; identifying, by the one or more processors, an exchange data object based at least in part on the exchange identifier, wherein the exchange data object comprises a user identifier and an instrument identifier for a service provider instrument of a member platform; identifying, by the one or more processors, a user exchange modifier for the exchange request based at least in part on the user identifier and the one or more request attributes; generating, by the one or more processors, a modified exchange value for the exchange request based at least in part on the user exchange modifier; providing, by the one or more processors and using a service provider interface, an exchange authorization request to the member platform, wherein the exchange authorization request is indicative of the instrument identifier and the modified exchange value for the exchange request; receiving, by the one or more processors and using the service provider interface, an exchange authorization response that is indicative of at least one of an exchange approval or an exchange denial based at least in part on the modified exchange value; and providing, by the one or more processors and using the partner interface, an exchange response based at least in part on the exchange authorization response, wherein the exchange response is indicative of the exchange approval or the exchange denial.

In some embodiments, a computing system includes a memory and one or more processors communicatively coupled to the memory. The one or more processors are configured to receive an exchange request for executing a value-based exchange, wherein the exchange request is indicative of (i) a universally unique ephemeral key (UUEK) that comprises an exchange identifier and (ii) one or more request attributes; identify an exchange data object based at least in part on the exchange identifier, wherein the exchange data object comprises a user identifier and an instrument identifier for a service provider instrument of a member platform; identify a user exchange modifier for the exchange request based at least in part on the user identifier and the one or more request attributes; generate a modified exchange value for the exchange request based at least in part on the user exchange modifier; provide an exchange authorization request to the member platform, wherein the exchange authorization request is indicative of the instrument identifier and the modified exchange value for the exchange request; receive an exchange authorization response that is indicative of at least one of an exchange approval or an exchange denial based at least in part on the modified exchange value; and providing an exchange response based at least in part on the exchange authorization response, wherein the exchange response is indicative of the exchange approval or the exchange denial.

In some embodiments, one or more non-transitory computer-readable storage media includes instructions that, when executed by one or more processors, cause the one or more processors to receive an exchange request for executing a value-based exchange, wherein the exchange request is indicative of (i) a universally unique ephemeral key (UUEK) that comprises an exchange identifier and (ii) one or more request attributes; identify an exchange data object based at least in part on the exchange identifier, wherein the exchange data object comprises a user identifier and an instrument identifier for a service provider instrument of a member platform; identify a user exchange modifier for the exchange request based at least in part on the user identifier and the one or more request attributes; generate a modified exchange value for the exchange request based at least in part on the user exchange modifier; provide an exchange authorization request to the member platform, wherein the exchange authorization request is indicative of the instrument identifier and the modified exchange value for the exchange request; receive an exchange authorization response that is indicative of at least one of an exchange approval or an exchange denial based at least in part on the modified exchange value; and providing an exchange response based at least in part on the exchange authorization response, wherein the exchange response is indicative of the exchange approval or the exchange denial.

BRIEF DESCRIPTION THE DRAWINGS

Having thus described the disclosure in general terms, reference will now be made to the accompanying drawings, which are not necessarily drawn to scale, and wherein:

Figure 6A:
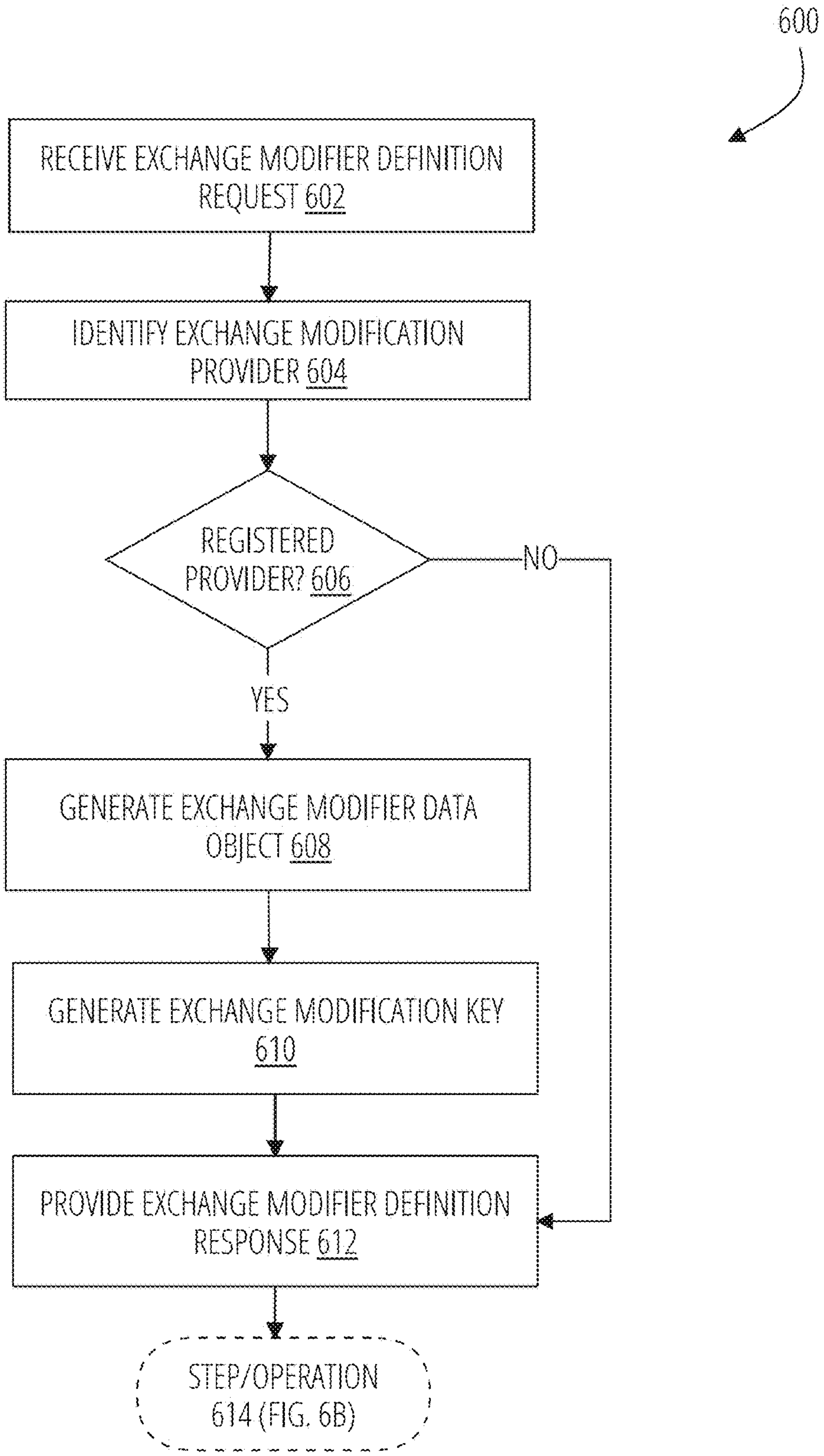
Figure 6B:
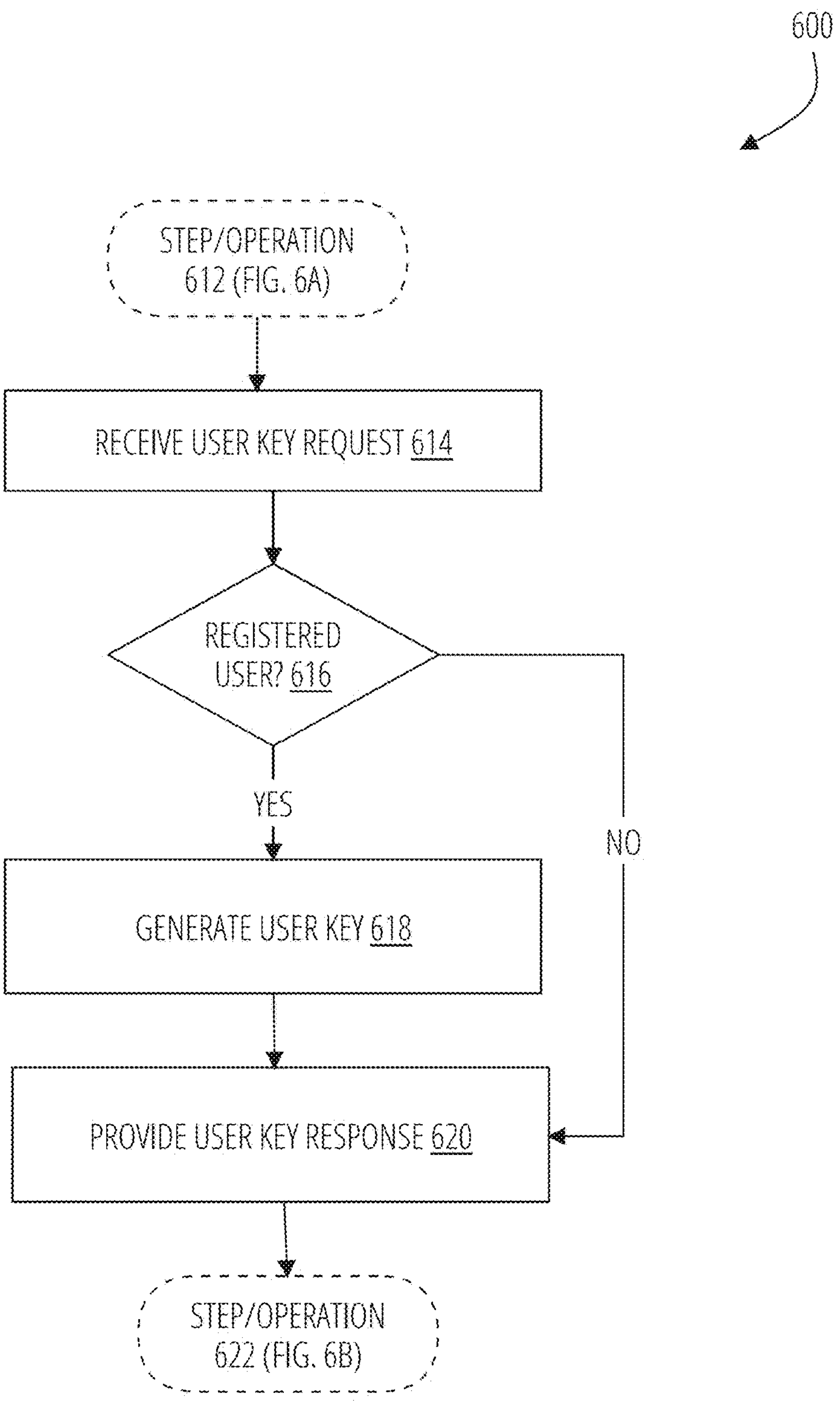
Figure 6C:
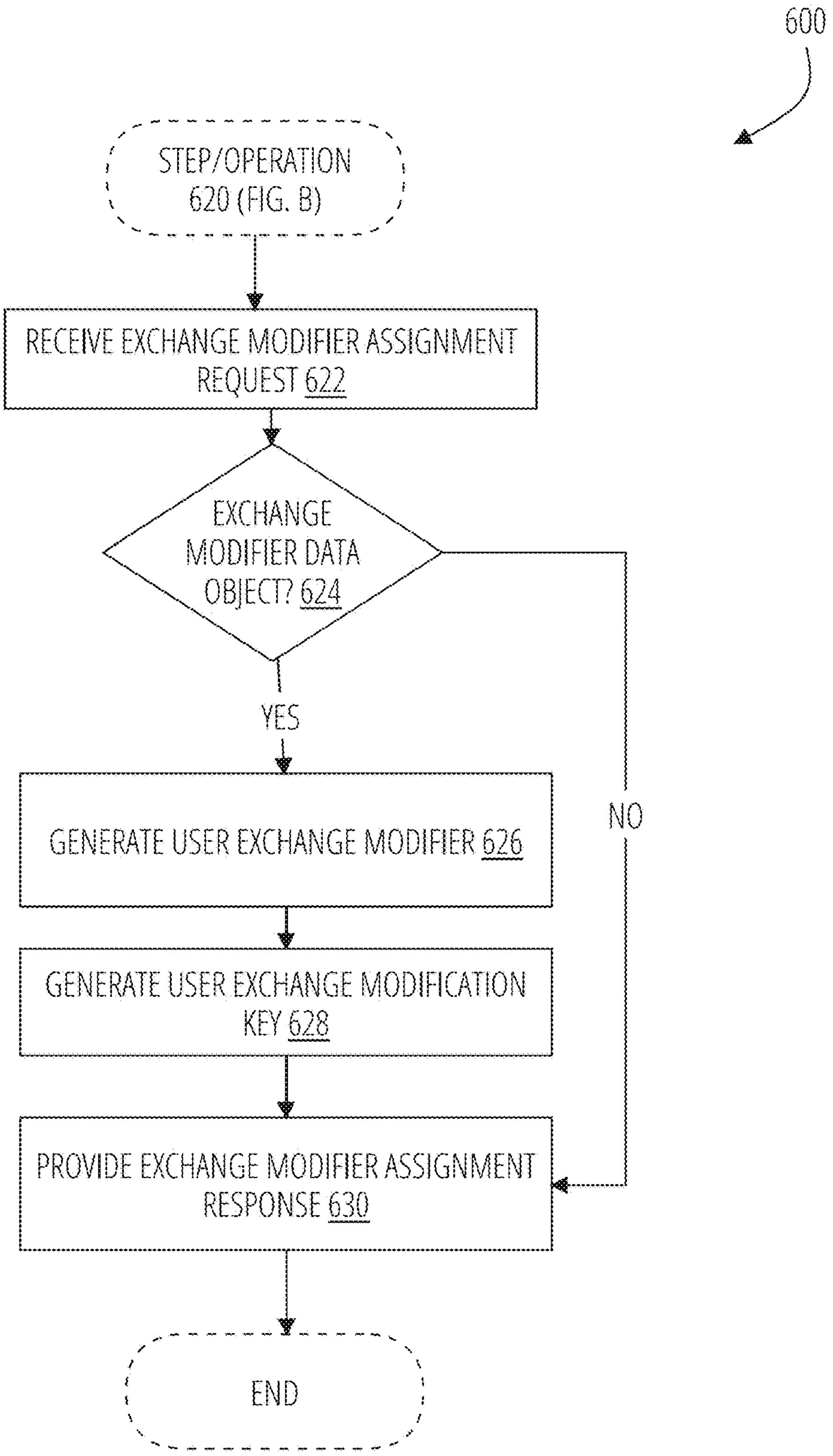
Figure 7A:
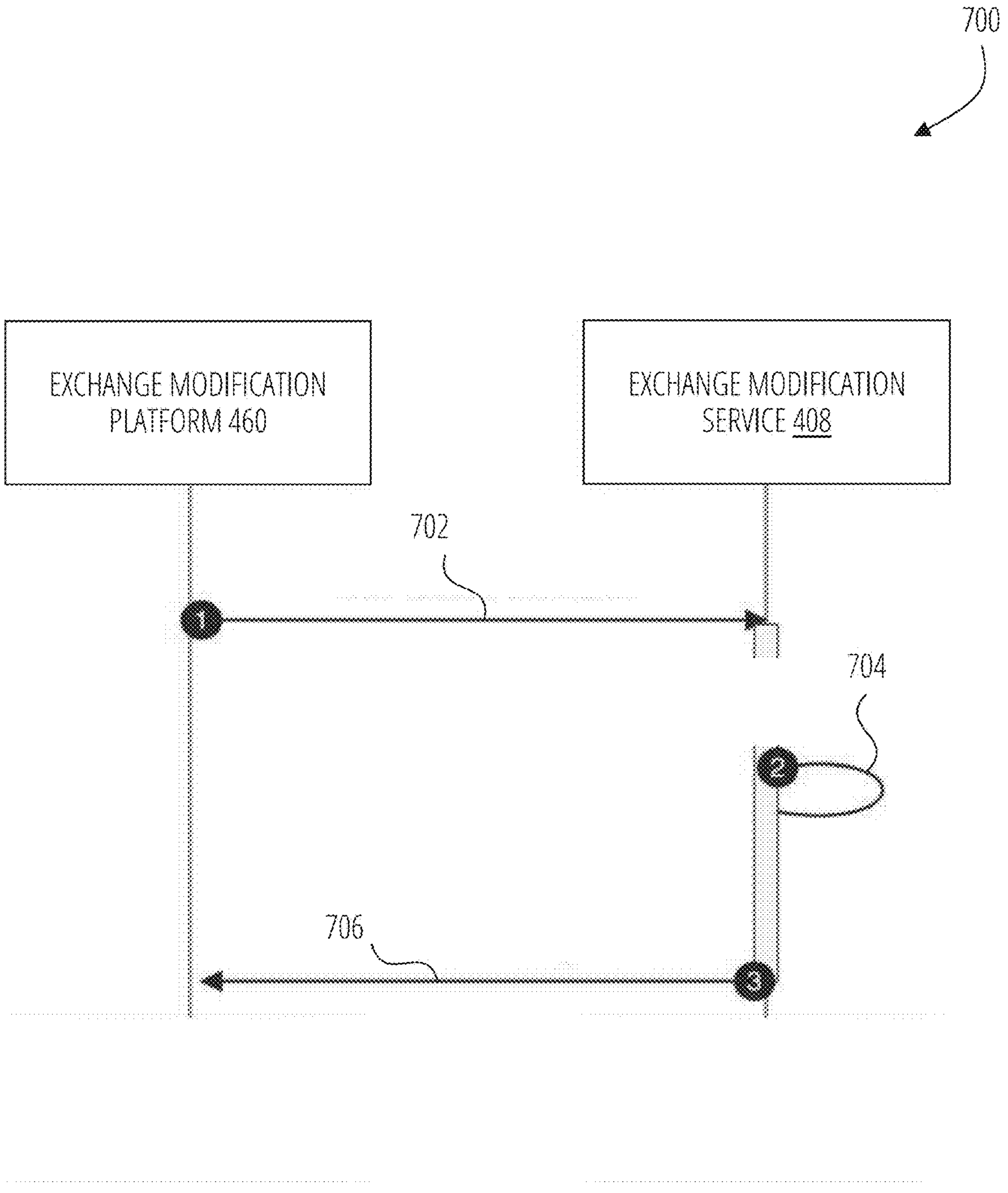
Figure 7B:
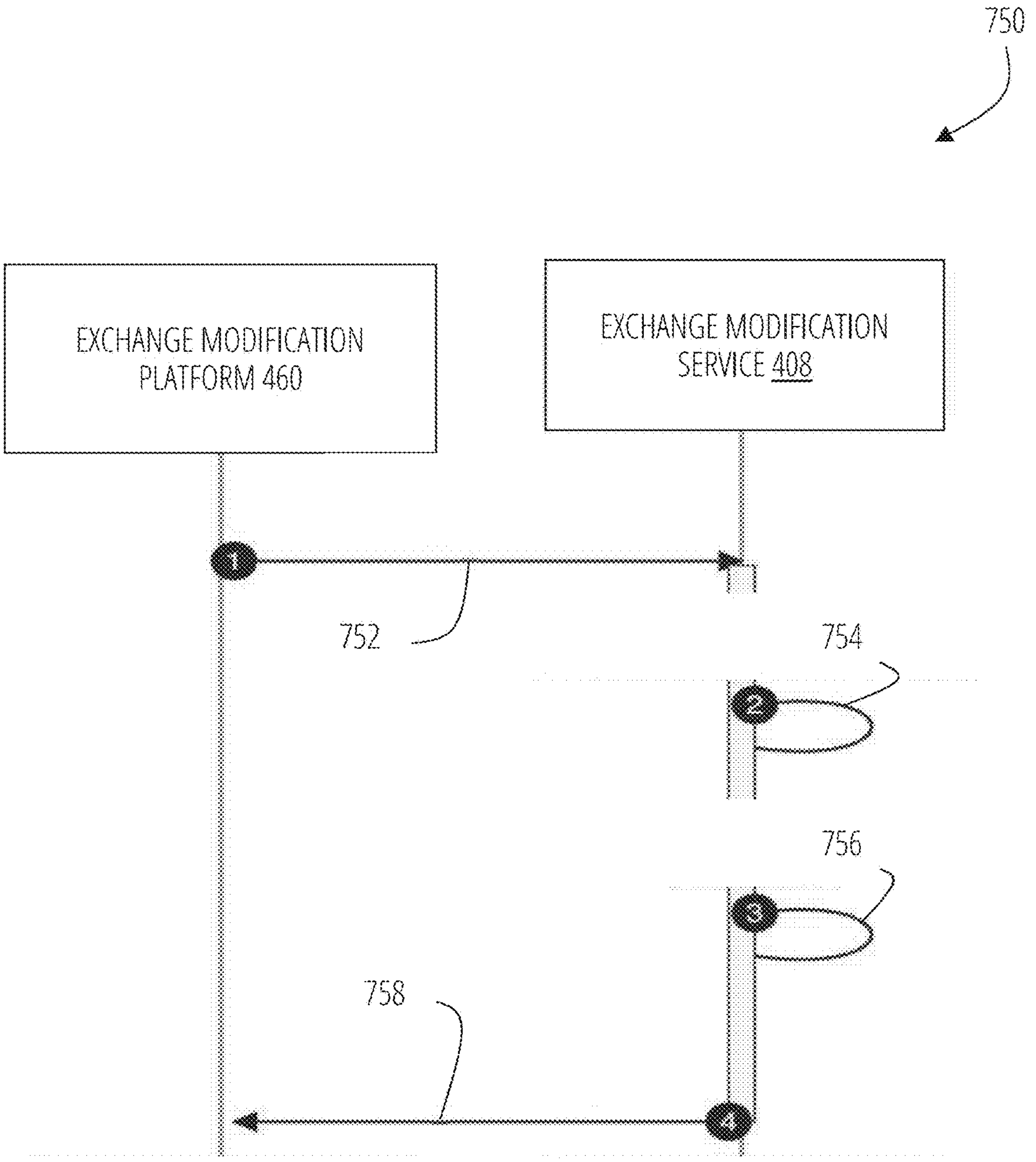
Figure 7C:
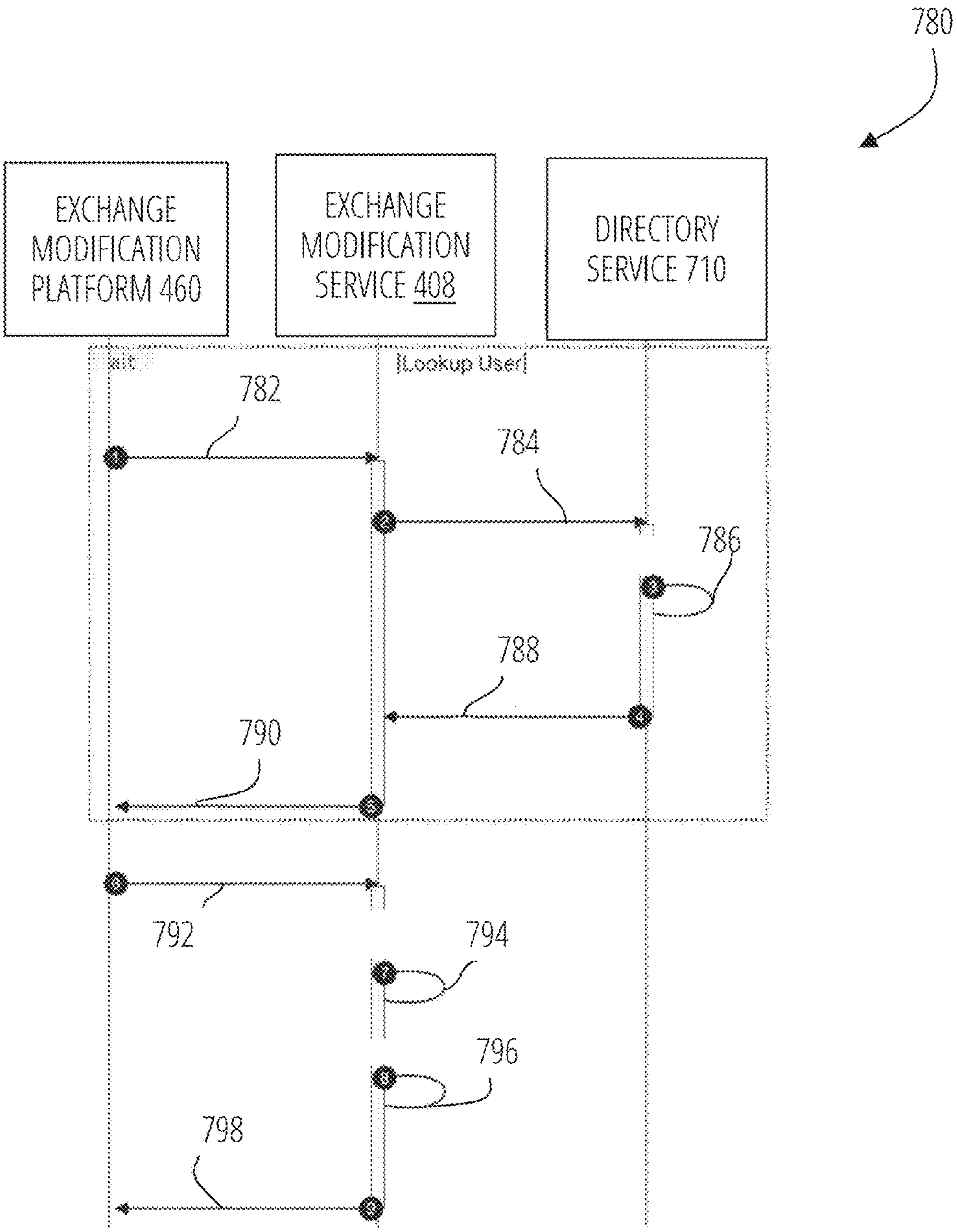
Figure 8:
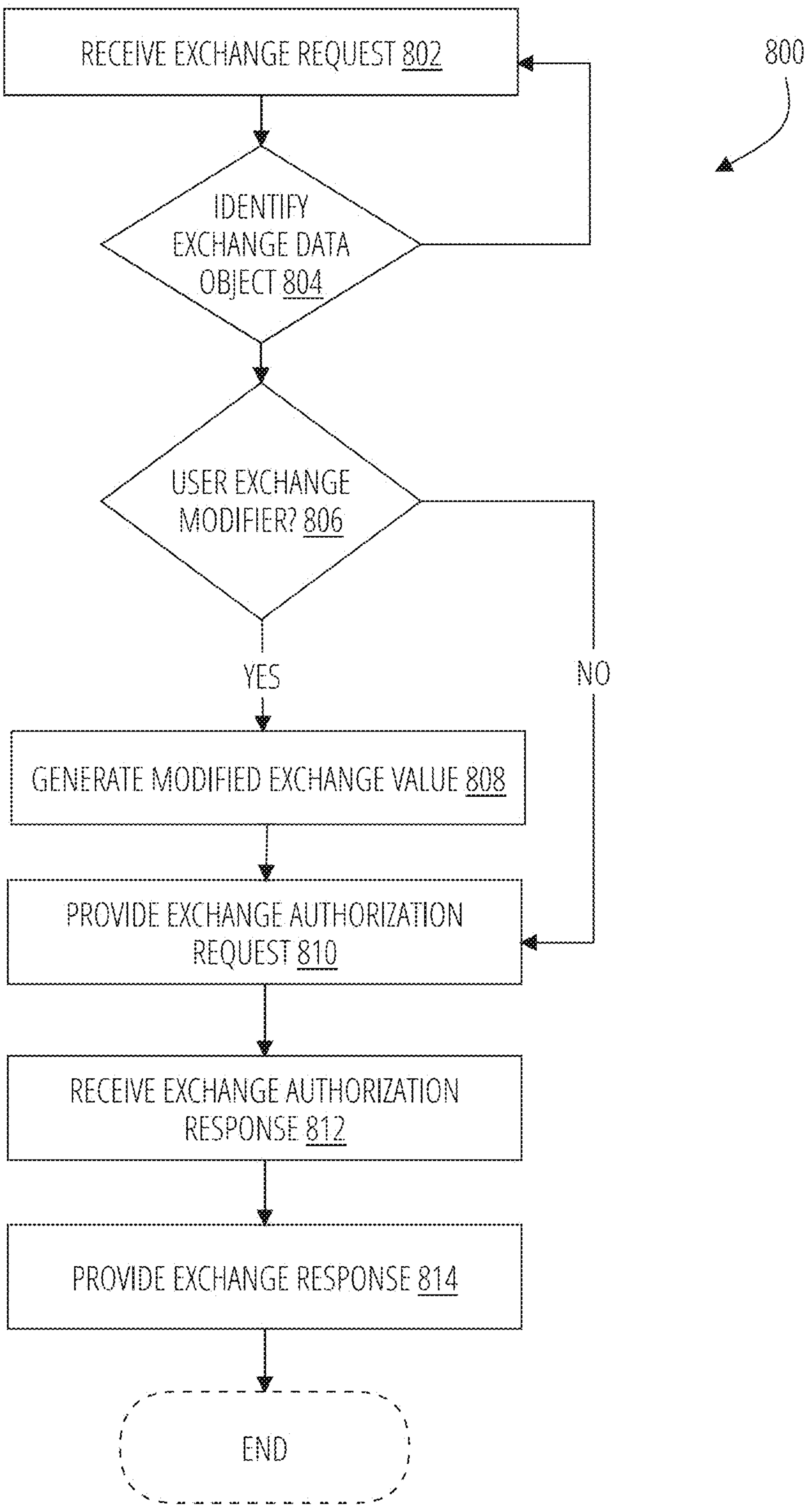
Figure 9:
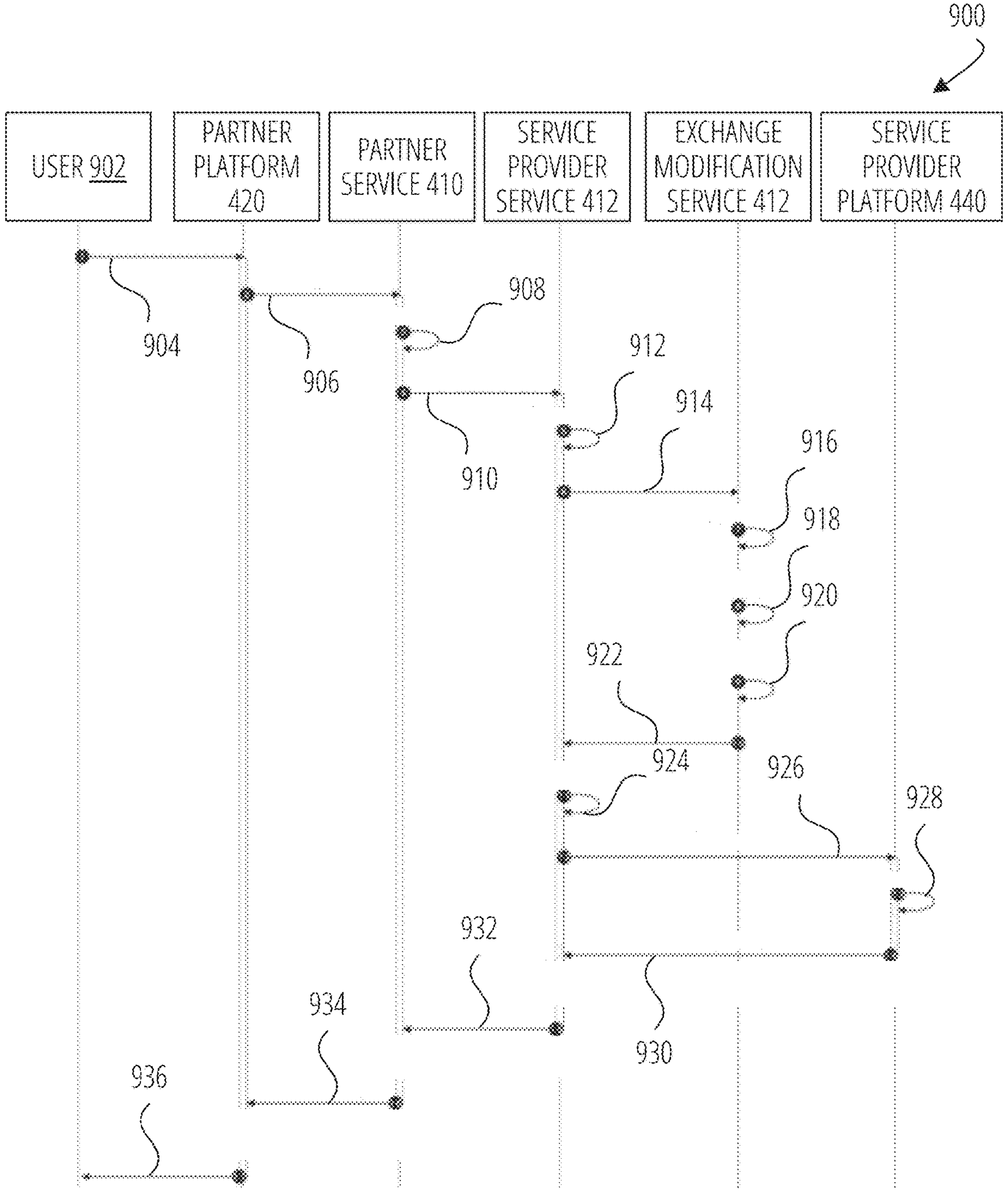

FIGS. 6A-C provide process flows for facilitating a network-based exchange modifier assignment process in accordance with one or more embodiments of the present disclosure;

FIGS. 7A-C provide messaging flows for facilitating a network-based exchange modifier assignment process in accordance with one or more embodiments of the present disclosure;

FIG. 8 provides a process flow for executing a network-based exchange using a UUEK in accordance with one or more embodiments of the present disclosure;

FIG. 9 provides a messaging flow for executing a network-based exchange using a UUEK in accordance with one or more embodiments of the present disclosure.

DETAILED DESCRIPTION OF SOME EXAMPLE EMBODIMENTS

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term “or” is used herein in both the alternative and conjunctive sense, unless otherwise indicated. The terms “illustrative” and “example” are used to be examples with no indication of quality level. Terms such as “computing,” “determining,” “generating,” and/or similar words are used herein interchangeably to refer to the creation, modification, or identification of data. Further, “based at least in part on,” “based at least on,” “based upon,” and/or similar words are used herein interchangeably in an open-ended manner such that they do not necessarily indicate being based at least in part only on or based solely on the referenced element or elements unless so indicated. Like numbers refer to like elements throughout.

I. General Overview and Technical Advantages

Various embodiments of the present disclosure provide technical solutions for managing network-based exchanges. In various embodiments, an exchange platform may be configured to facilitate a credential-less exchange of value between one or more member platforms. These exchanges may be facilitated in near real time, without persistent credentials that may expose members to financial, legal, reputational, or other risks. Accordingly, in various embodiments, client devices may purchase, sell, and/or execute a value-based exchange, in real-time, over any network, without exposing sensitive information susceptible to network-based attacks.

Embodiments of the present disclosure provide improved exchange modification techniques that leverage new interfaces, data transformation, and modification techniques to increase data security, communication flexibility, and modifier traceability and redemption, while reducing computing resource expenditure requirements for safeguarding sensitive data through network communications.

Some techniques of the present disclosure, for example, retrieve and transform data objects into unique data keys recognizable only to approved entities. The data keys may be provided and/or established by leveraging exchange interfaces between an exchange platform and other member platforms in an exchange network. Once established, the data keys may be mapped to sensitive credentials stored within a source platform (e.g., a service provider platform), without requiring the network transmission of the sensitive credentials. Future communications to facilitate a value-based exchange may replace traditional, persistent credentials with data keys to enable a source platform to identify persistent credentials and/or perform one or more actions for a particular instrument associated therewith. In this manner, the exchange platform may facilitate an exchange using keys (and/or other identifiers) that are not, by themselves, traceable to underlying sensitive information. This, in turn, allows the exchange platform to holistically track, facilitate, and distribute network-based communications without exposing a member to network attacks.

Some embodiments of the present disclosure present network-based exchange processing techniques for facilitating credential-less exchanges. To do so, some of the techniques of the present disclosure leverage new data structures, UUEKs, that may replace persistent credentials traditionally used to authorize a value-based exchange. Using the techniques of the present disclosure, a UUEK may be securely issued across member platforms to allow a user to execute a value-based exchange using an identifier that is recognizable to a single party, the exchange platform. The UUEK may be mapped to unique identifiers that may reference sensitive information without directly identifying (and thereby exposing) the sensitive information. A unique identifier, for example, may reference a mapping only interpretable by a source platform, such that the identifiers are unusable by malicious parties unaffiliated with the exchange platform. In this manner, the exchange platform may distribute, track, and facilitate exchanges without exposing member platforms to data security risks. Moreover, the exchange platform may continuously update, modify, and/or redistribute UUEKs to the member platforms to continuously adapt UUEKs in near real time. In this manner, the exchange platform may provide technical improvements to data and network security, while reducing the computing resource requirements (e.g., for securely encrypting persistent credentials) for facilitating value-based exchanges.

Some techniques of the present disclosure may leverage credential-less exchanges of the present disclosure to enable the use of flexible exchange interfaces between members of an exchange network. Unlike traditional exchange interfaces, credential-less exchanges allow for the use of interfaces capable of (i) providing contextual information, such as object-level details, associated with a requested value-based exchange and (ii) generating user-specific exchange modifiers for the value-based exchange. This enables an intermediary computing platform to generate user-specific exchange modifiers and associate the user-specific exchange modifier with a UUEK for use during an exchange powered by the UUEK. During a value-based exchange, the intermediary computing platform may subsequently receive object-level information necessary for applying an exchange modifier with respect to various individual objects of the value-based exchange. In this way, the intermediary computing platform may register different exchange criteria tailored to specific members, objects, and/or the like of an exchange network to apply and resolve exchange modifications, in near real time, that are specifically tailored to an individual user of the exchange network. Exchange modifiers may be tracked and updated in near real time (e.g., daily, as a side effect of an external event, etc.) to continuously refine the exchange modifiers for a value-based exchange with respect to changing circumstances. Ultimately, this enables a network administered solution in which a single computing entity, the intermediary computing platform, may handle exchange modifiers in near real time on behalf of a plurality of members. The network administered solution removes the computing and timing inefficiencies, as well as, the risk of fraudulent behavior associated with traditional exchange modification techniques. For example, using the techniques of the present disclosure, a single update from a member may be applied at a network level in near real time, ensuring absolute compliance with the constantly changing criteria. Moreover, using the techniques of the present disclosure, an exchange modifier may be verified, resolved, applied to an exchange, and then reconciled simultaneously. By handling exchange modification, the techniques of the present disclosure eliminate risks and time constraints traditionally inherent in accepting exchange modifiers, thereby enabling new entrants to an exchange modification system.

Example inventive and technologically advantageous embodiments of the present disclosure include (i) data transformation, mapping, and processing schemes for facilitating the network-based credential-less exchanges, (ii) exchange interfaces and network-based communication schemes for improving network security for cross-platform communications, (iii) ephemeral data structures and data management techniques for distributing the ephemeral data structures to facilitate real-time, secure, and dynamic value-based exchanges, and (iv) real-time exchange modification techniques for applying, tracking, and resolving exchange modifiers in a value-based exchange.

II. Example Definitions

In some embodiments, the term "exchange platform" refers to a computing entity that is configured to facilitate credential-less exchanges of value for one or more members in an exchange network. The exchange platform may include one or more processing devices, memory devices, and/or the like that are physically and/or wirelessly coupled and configured to collectively (and/or individually) perform the one or more computing tasks for facilitating a value system agnostic exchange. In some examples, the exchange platform may include, define, and/or otherwise leverage one or more APIs for facilitating communications (e.g., requests and responses, etc.) between a plurality of members. As described herein, the APIs may be leveraged to facilitate a secure exchange between one or more members in any value system.

In some embodiments, the term "member" refers to an entity that collaborates with the exchange platform to take part in an exchange of value. As examples, a member may include (i) a partner that utilizes the exchange platform to receive value, (ii) a service provider that utilizes the exchange platform to provide value, (iii) a modification provider that utilizes the exchange platform to modify value, and/or (iv) any combination of a partner, service provider, or modification provider. As used herein, a member may be referred to as a partner when it receives value through a value exchange, a service provider when it provides value through a value exchange, or a modification provider when it modifies a value of a value exchange. Thus, the same member may be a partner, a service provider, or a modification provider depending on the role of the member in a value exchange. For example, a member may be a partner that receives value for a value exchange. The same member may be a service provider that provides value in another value exchange. The same member may be a modification provider that modifies a value of another value exchange. In some examples, the same member may be both the partner, the service provider, and/or the modification provider in the same value exchange, such that the member utilizes the exchange platform to provide, modify, and then receive value in a sole member value exchange.

In some embodiments, a member is a partner when it utilizes a service provided by a service provider. A partner may include any value seeking entity in any value system. As an example, in a financial value system, a partner may include a merchant (e.g., retailer, brick-and-mortar establishment, etc.) that may utilize a service provider, such as a financial institution, to access funds for a financial transaction. In addition, or alternatively, in an information value system, a partner may include a news publisher (e.g., a newspaper, media organization, etc.) that may utilize a service provider, such as a news agency (e.g., wire service, news service, etc.) to access information for an information transaction. As will be understood, the techniques of the present disclosure may be applied to any value system and the partner may include any value seeker for any respective value system.

In some embodiments, a member is a service provider when it provides a service for a partner or another service provider. A service provider may include a source of value in any value system. As an example, in a financial value system, a service provider may include a financial institution (e.g., bank, currency exchange platform, credit union, etc.) that may provide access to funds for a financial transaction between one or more entities. In addition, or alternatively, in an information value system, a service provider may include a news agency (e.g., wire service, news service, etc.) that may source information for publication by a news publisher. As will be understood, the techniques of the present disclosure may be applied to any value system and the service provider may include any source of value for any respective value system.

In some embodiments, a member is a modification provider when it provides an exchange modifier on behalf of a partner or service provider. A modification provider, for instance, may manage one or more exchange modifiers that modify an exchange value before a value-based exchange is executed. In some examples, the exchange platform may interact with both a service provider and a modification provider to facilitate a value-based exchange. For instance, as described herein, a modification provider may modify an exchange value of a value-based exchange, the modified exchange value may then be provided to a service provider for authorizing the value-based exchange using a service provider instrument.

In some embodiments, the term "exchange modifier data object" refers to a data entity that defines one or more criteria for modifying an exchange value of a value-based exchange. The exchange modifier data object may include one or more modification identifiers. The modification identifiers, for example, may include an exchange modification identifier, an exchange modification key, a member partition, and/or the like, as described herein. An exchange modifier data object, for example, may correspond to a modification provider. A modification provider, for example, may include an object manufacturer, a coupon and/or reward aggregator, an exchange authorization provider, such as a bank, fintech, loyalty account, etc., and/or any other entity configured to modify an exchange value. The modification provider, for example, may provide value modification mechanisms, such as discounts and/or other incentives (and/or deterrents) for obtaining an object through a value-based exchange. In some examples, the exchange modifier data object may include a member partition that identifies the modification provider.

An exchange modifier data object may define one or more modification parameters for modifying an exchange value. The one or more modification parameters, for example, may define one or more authorized objects and one or more modification mechanisms for modifying a value of the one or more authorized objects. In some examples, the exchange modifier data object may include a status indicator and/or a count attribute. The status indicator may be indicative of a validity (e.g., an expiration, etc.) of the exchange modifier data object. In some examples, the status indicator may be indicative of the usage of the exchange modifier data object. For instance, the status indicator may include a count attribute that is indicative of a number of times that a modification mechanism of the exchange modifier data object has been used. In some examples, the count attribute may include one or more contextual attributes for each use, such as an exchange identifier for each use, and/or the like.

In some embodiments, the exchange modifier data object 424 includes one or more modification parameters and/or one or more object parameters. The one or more modification parameters may be indicative of one or more modification mechanisms for modifying a value of an object and/or one or more modification requirements for applying a modification mechanism. The one or more object parameters may be indicative of one or more authorized objects for which a modification mechanism may be applied.

A modification mechanism, for example, may include a mechanism for reducing and/or increasing a value of an object of a value-based exchange.

For example, a modification mechanism may include modification incentive. A modification incentive may define a reduction amount from an object value of an object. By way of example, a modification incentive may include flat reduction amount (e.g., 5, 10, etc. dollars, euros, etc. off an object value, etc.), a percentage reduction amount (e.g., 5%, 10%, 20%, 50%, etc. off an object value, etc.), an affiliated object amount (e.g., two or more objects for the object value of one, etc.), and/or the like. In addition, or alternatively, the modification incentive may define a return amount that may define an amount returned (e.g., cash back, loyalty points, etc.) from an object value. By way of example, a return amount may include a flat return (e.g., 5, 10, etc. dollars, euros, points, etc. in return for obtaining an object, etc.), a proportional amount (e.g., 5%, 10%, 20%, 50%, 200%, etc., dollars, euros, points, etc. of an object value in return for obtaining an object, etc.), and/or the like.

As another example, a modification mechanism may include a modification deterrent. A modification deterrent may define a penalty amount in addition to an object value of an object. By way of example, a modification deterrent may include flat penalty amount (e.g., 5, 10, etc. dollars, euros, etc. in addition to an object value, etc.), a percentage penalty amount (e.g., 5%, 10%, 20%, 50%, etc. in addition to an object value, etc.), and/or the like.

A modification requirement may include one or more timing, location, member, exchange, historical exchange requirements, and/or the like, for applying a modification mechanism. For instance, a timing requirement may be indicative of a time period (e.g., one or more hours, days, months, etc.) within which a modification mechanism may or may not be used, an expiration time indicative of a time after which a modification mechanism may not be used, and/or the like. A location requirement may be indicative of a geographic location (e.g., coordinates, etc.), a physical location (e.g., a brick and mortar store, etc.), a virtual location (e.g., an online merchant platform, etc.), and/or the like that is indicative of an authorized location from which a modification mechanism may be used. A member requirement may be indicative of one or more partners, service providers, and/or other members of the exchange network for which a modification mechanism may be used. An exchange requirement may be indicative of one or more threshold value-exchange attributes, such as a threshold exchange value, a threshold number of objects, and/or the like of a value-based exchange. A historical exchange requirement may be indicative of an exchange threshold, such as a number of value-based exchanges, and/or the like.

The object parameters may be indicative of one or more objects and/or object attributes that are authorized for using a modification mechanism in accordance with the exchange modifier data object. The object identifier and/or one or more object attributes may identify an object and/or one or more authorized amounts of an object.

For instance, the object parameters may include a plurality of object identifiers. The plurality of object identifiers may be indicative of a plurality of objects that are authorized for using a modification mechanism. In some examples, an object identifier may be a global object identifier. For instance, a global object identifier may be a stock keeping unit (SKU) code. In addition, or alternatively, a global object identifier may be a manufacturer part number (MPN), global trade item number (GTIN), product or service name, international standard book number (ISBN), universal product code (UPC), international article number (EIN), and/or the like. In some examples, an object identifier may include a system object identifier. A system object identifier, for example, may include an identifier (e.g., a table identifier, etc.) that corresponds to a recorded data object that represents an object within an exchange platform. In some embodiments, a system object identifier and a global object identifier are the same.

As another example, the object attributes may be indicative of one or more object attributes that are indicative of an authorized object. The one or more object attributes may be indicative of one or more objects (e.g., with one or more different object identifiers, etc.) that are authorized for using a modification mechanism. By way of example, the object attributes may be indicative of an object category (e.g., food items, etc.), an object manufacturer (e.g., Tillamook, etc.), an object type (e.g., cheese, etc.), and/or the like that is authorized for using a modification mechanism.

In some embodiments, the term "exchange modification definition request" refers to a data entity that defines a request to generate an exchange modifier data object. The exchange modification definition request may be provided to an exchange platform from a member of the exchange network to generate an exchange modifier data object. The exchange modification definition request may be indicative of one or more modification parameters, one or more object parameters, and/or a member partition (as described herein). The member partition, for example, may identify a modification provider that may be responsible for reconciling uses of the exchange modifier data object.

In some embodiments, the term "exchange modification definition response" refers to a data entity that defines a response to an exchange modification definition request. The exchange modification definition response may be indicative of an exchange modification key for the exchange modifier data object. The exchange modification definition request may be provided by an exchange platform to a member of the exchange network in response to an exchange modification definition request.

In some embodiments, the term "exchange modification identifier" refers to a unique identifier for an exchange modifier data object. An exchange modification identifier may include a sequence of numeric, alpha-numeric, any/or any other characters or symbols that are representative of an exchange modifier data object of the exchange platform and/or member platform.

In some embodiments, the term "exchange modification key" refers to a unique identifier for referencing an exchange modification identifier. The exchange modification key, for example, may be generated and/or provided by the exchange platform during a registration process of an exchange modifier data object with the exchange platform. In some examples, the exchange modification key may include a wrapped exchange modification identifier. For example, the exchange modification key may include a string of alphanumeric characters that are formatted according to a key format established by the exchange platform (and/or one or more APIs thereof). The key format, for example, may include a first portion of the characters (e.g., the first six characters) that may be reserved as a partition for identifying an entity (e.g., a member, etc.) associated with the key. For example, for an exchange modification key, the partition may include a service provider partition and/or a partner partition. A second portion of the characters may identify the exchange modification identifier.

In some embodiments, the term "recorded data object" refers to a data object that represents an object that may be involved in a value-based exchange. In some examples, a recorded data object may be an internal representation of an object for an exchange platform. For example, an object may include a distinct unit of a value-based exchange for which value is being transferred. A recorded data object for the object may include a data object that records one or more aspects (e.g., object identifiers, object attributes, etc.) of the object.

For instance, a recorded data object may include an object identifier and/or one or more object attributes for a particular object associated with a value system. The object may be based at least in part on the value system. For instance, in a financial value system, an object may be a tangible or intangible item, product, and/or the like that may be purchased in exchange for a unit of currency. In a healthcare value system, an object may be a healthcare procedure, and/or the like that may be covered by a healthcare policy.

In some examples, an exchange platform may maintain and/or have access to an object datastore that includes a plurality of recorded data objects. As described herein, the object datastore may include a plurality of recorded data objects that are at least partially sourced from one or more members of the exchange network.

In some embodiments, the term "authorized object" refers to an object of a value-based exchange that is authorized for use with a modification mechanism in accordance with an exchange modifier data object. An authorized object, for example, may correspond to an object identifier and/or one or more object attributes that match (e.g., strictly and/or partially) one or more object parameters of an exchange modifier data object. As an example, in a financial value system, an authorized object may be a product or service that is eligible for modification using an exchange modifier data object (e.g., a digital/physical coupon, reward, voucher, etc.). By way of example, a product may be a gallon of milk that may be associated with a SKU code and/or one or more objects attributes, such as "category: dairy," "quantity: 1 gallon," and/or the like. The product may be an authorized object for a value-based exchange in the event that an exchange modifier data object authorizes the SKU code and/or the one or more object attributes "category: dairy," "quantity: 1 gallon," and/or the like.

In some embodiments, the term "user exchange modifier" refers to a data entity that describes a user specific instance of an exchange modifier data object. A user exchange modifier, for example, may include an instance of an exchange modifier data object. The user exchange modifier may be assigned to one or more users associated with the exchange network. For instance, the user exchange modifier may be assigned to an individual user. In such a case, the user exchange modifier may include a data object that is indicative of a user identifier of the individual user and/or a modification identifier corresponding to the exchange modifier data object. In addition, or alternatively, the user exchange modifier may be assigned to a plurality of users. In such a case, the user exchange modifier may include a data object that is indicative of a plurality of user identifiers for the plurality of users and/or a modification identifier corresponding to the exchange modifier data object.

In some examples, the user exchange modifier may include a status indicator and/or a count attribute. The status indicator may be indicative of a validity (e.g., an expiration, etc.) of the user exchange modifier. In some examples, the status indicator may be indicative of the usage of the user exchange modifier. For instance, the status indicator may include a count attribute that is indicative of a number of times that a user exchange modifier has been used. In some examples, the count attribute may include one or more contextual attributes for each use, such as an exchange identifier for each use, and/or the like.

In some embodiments, the term "user key request" refers to a data entity that defines a request to receive a user key for a user associated with an exchange network. The user key request may be provided to an exchange platform from a member of the exchange network to identify whether a user has a registered instrument with the exchange platform. The user key request may be indicative of one or more user attributes that may be correlated with a user data object to identify an individual user.

In some embodiments, the term "user key response" refers to a data entity that defines a response to a user key request. The user key response may be provided by an exchange platform to a member of the exchange network in response to a user key request. In the event that the user key request identifies a registered user, the user key response may be indicative of a federated user key for the user. In the event that the user key request failed to identify a registered user, the user key response may be indicative of a failed user identification.

In some embodiments, the term "exchange modifier assignment request" refers to a data entity that defines a request to generate a user exchange modifier for a user. The exchange modifier assignment request may be provided to an exchange platform from a member of the exchange network to assign an instance of an exchange modifier data object to one or more users. The exchange modifier assignment request may be indicative of an exchange modification key and/or one or more user keys for the users. In addition, or alternatively, the exchange modifier assignment request may be indicative of one or more user-specific modification requirements. The user-specific modification requirements, for example, may include one or more modification requirements that may augment the modification requirements of the exchange modifier data object corresponding to the exchange modification key. In some examples, the exchange platform may generate a user exchange modifier for the exchange modifier data object and the one or more users and augment the user exchange modifier with the user-specific modification requirements.

In some embodiments, the term "exchange modifier assignment response" refers to a data entity that defines a response to an exchange modifier assignment request. The exchange modifier assignment response may be indicative of a user exchange modification key for the user exchange modifier. The exchange modifier assignment response may be provided by an exchange platform to a member of the exchange network in response to an exchange modifier assignment request.

In some embodiments, the term "exchange modifier use request" refers to a data entity that is indicative of a use of an exchange modifier data object and/or instance thereof. The exchange modifier use request may be indicative of an exchange modification key and/or one or more request attributes of an exchange request. In some examples, the exchange modifier use request may be provided by an exchange platform to a member in response to the use of an exchange modifier data object and/or instance thereof. In some examples, the exchange modifier use request may be provided by an exchange platform to a member in response to the use of an exchange modifier data object in a value based exchange that is approved. For instance, the exchange modifier use request may be provided in response to an exchange authorization response that is indicative of an exchange approval.

In some examples, the response attributes may be indicative of a member (e.g., a partner, etc.) from which an exchange request is received. The exchange modifier use request may be provided to a modification provider (e.g., an exchange modification platform thereof) to cause the modification provider to provide a modification amount to the partner in near real time and/or during clearing and settlement time period (e.g., end of day, etc.).

In some embodiments, the term "exchange record" refers to a data entity that provides contextual information for an exchange request. The contextual information may be indicative of one or more aspects of an exchange request, an exchange response, an exchange authorization request, and/or an exchange authorization request. For example, an exchange record may be indicative of the one or more validated objects, invalidated objects, object statuses for each validated and/or invalidated object, and/or any other information associated with the value-based exchange.

In some embodiments, the term "member platform" refers to a computing entity corresponding to a member. The member platform may include a partner computing platform acting on behalf of a partner, a service provider computing platform acting on behalf of a service provider, an exchange modification platform acting on behalf of a modification provider, and/or one or more combinations thereof. In some examples, a member platform may be one or more of a partner platform, a service provider platform, and/or an exchange modification platform. For example, the same member platform may be configured to operate on behalf of a partner for one value exchange, a service provider for another value exchange, and/or a modification provider for another value exchange. In some examples, the same member platform may be configured to operate on behalf of one or more combinations of a partner, a service provider, and/or a modification platform in a single value exchange. It is noted that the term member platform may refer to a partner platform, a service provider platform, a modification platform, and/or one or more combinations thereof and, in some examples, may depend on the role of the member platform in a value exchange (e.g., and/or one or more APIs utilized by the member platform in the value exchange).

In some embodiments, a partner platform is a computing entity that is configured to perform one or more operations on behalf of a partner. A partner platform, for example, may include one or more processing devices, memory devices, and/or the like that are physically and/or wirelessly coupled and configured to collectively (and/or individually) perform the one or more computing tasks for requesting value in a value system agnostic exchange. In some examples, a partner platform may include, define, and/or otherwise leverage one or more APIs for facilitating communications (e.g., requests and responses, etc.) with the exchange platform. In some examples, a partner platform may be configured to host one or more user-facing applications (e.g., a partner application, etc.) for interacting with one or more users.

In some embodiments, a service provider platform is a computing entity that is configured to perform one or more operations on behalf of a service provider. A service provider platform, for example, may include one or more processing devices, memory devices, and/or the like that are physically and/or wirelessly coupled and configured to collectively (and/or individually) perform the one or more computing tasks for providing value in a value system agnostic exchange. In some examples, a service provider platform may include, define, and/or otherwise leverage one or more APIs for facilitating communications (e.g., requests and responses, etc.) with the exchange platform. In some examples, a service provider platform may be configured to facilitate one or more service provider instruments. In some examples, the service provider platform may be configured to host one or more user-facing applications (e.g., a service provider application, etc.) for managing the one or more service provider instruments.

In some embodiments, an exchange modification platform is a computing entity that is configured to perform one or more operations on behalf of a modification provider. An exchange modification platform, for example, may include one or more processing devices, memory devices, and/or the like that are physically and/or wirelessly coupled and configured to collectively (and/or individually) perform the one or more computing tasks for modifying value in a value system agnostic exchange. In some examples, an exchange modification platform may include, define, and/or otherwise leverage one or more APIs for facilitating communications (e.g., requests and responses, etc.) with the exchange platform. In some examples, an exchange modification platform may be configured to facilitate one or more exchange modifiers. In some examples, the exchange modification platform may be configured to host one or more user-facing applications (e.g., a modification applications, etc.) for managing the one or more exchange modifiers.

In some embodiments, the term "exchange interfaces" refers to a set of instructions for facilitating communications between the exchange platform and one or more member platforms and/or internal services. An exchange interface may include an API, file based interface, a message queue based interface, and/or the like. For instance, an exchange interface may include an API including, as examples, one or more simple object access protocol (SOAP) APIs, one or more remote procedure call (RPC) APIs, one or more websocket APIs, one or more representational state transfer (REST) APIs, and/or the like. In some embodiments, an exchange interface may include one or more RPC APIs, such as one or more gRPC APIs.

The exchange platform may include, define, and/or otherwise leverage one or more different exchange interfaces for facilitating communication with one or more external platforms, such as one or more member platforms (e.g., a partner platform, service provider platform, etc.). Each API may include a plurality of communication instructions, message definitions, and/or the like for exchanging requests and/or responses between the exchange platform and an entity that is taking part in a value exchange. By way of example, an exchange interface may include a partner API for facilitating communication with a partner platform and/or a service provider API for facilitating communication with a service provider platform.

In some embodiments, the term "partner interface" refers to an exchange interface for facilitating one or more communications between a partner platform and the exchange platform. The partner interface may define one or more communication instructions, message definitions, and/or the like for facilitating one or more request messages and/or response messages between a partner platform and the exchange platform. The partner interface, for example, may include an API that defines (i) requests to the exchange platform from a computing entity acting as a partner platform and/or (ii) requests from the exchange platform to the partner platform. For example, the partner interface may define one or more registration messages, session messages, transaction messages, and/or the like for facilitating an exchange of value for the partner. In some embodiments, the partner interface defines one or more identifiers for securely identifying one or more portions of a value exchange.

In some embodiments, the term "service provider interface" refers to an exchange interface for facilitating one or more communications between a service provider platform and the exchange platform. The service provider interface may define one or more communication instructions, message definitions, and/or the like for facilitating one or more request messages and/or response messages between a service provider platform and the exchange platform. The service provider interface, for example, may include an API that defines (i) requests to the exchange platform from a computing entity acting as a service provider platform and/or (ii) requests from the exchange platform to the service provider platform. The service provider interface, for example, may define one or more registration messages, session messages, transaction messages, and/or the like for facilitating an exchange of value using a service provider instrument. In some embodiments, the service provider interface defines one or more identifiers for securely identifying one or more portions of a value exchange.

In some embodiments, the term "exchange modification interface" refers to an exchange interface for facilitating one or more communications between an exchange modification platform and an exchange platform. The exchange modification interface may define one or more communication instructions, message definitions, and/or the like for facilitating one or more request messages and/or response messages between an exchange modification platform and the exchange platform. The exchange modification interface 426, for example, may include an API that defines (i) requests to the exchange platform from a computing entity acting as an exchange modification platform and/or (ii) requests from the exchange platform to the exchange modification interface. For example, the exchange modification interface may define one or more registration messages, exchange messages, exchange modifier definition messages, exchange modifier assignment messages, exchange modifier use messages, and/or the like for registering and/or facilitating the use of an exchange modifier. In some embodiments, the exchange modification interface defines one or more identifiers (e.g., exchange modification identifiers, exchange modification keys, etc.) for securely identifying one or more portions of a value exchange.

In some embodiments, the term "entity partition" refers to a unique identifier for a computing entity. An entity partition may include a unique number, alpha-numeric, and/or the like that represents a particular computing entity. An entity partition, for example, may include a member partition that represents a member platform, a service provider partition that represents a service provider platform, a partner partition that represents a partner platform, and/or the like.

In some embodiments, the term "service provider partition" refers to a unique identifier for a service provider and/or service provider platform of a service provider. The service provider partition may include a sequence of numeric, alpha-numeric, any/or any other characters or symbols that are representative of a service provider that is associated (e.g., onboarded, registered, etc.) with the exchange platform. The exchange platform, for example, may include a plurality of service provider partitions that respectively identify a service provider platform that is affiliated with (e.g., onboarded with, registered with, etc.) the exchange platform. Each service provider partition may represent a service provider platform that has configured one or more exchange platform software development kits (SDKs), and/or like for implementing a service provider interface of the exchange platform.

In some embodiments, a "partner partition" refers to a unique identifier for a partner and/or a partner platform of a partner. The partner partition may include a sequence of numeric, alpha-numeric, any/or any other characters or symbols that are representative of a partner that is associated with the exchange platform. The exchange platform, for example, may include a plurality of partner partitions that respectively identify a partner platform that is affiliated with (e.g., onboarded with, registered with, etc.) the exchange platform. Each partner partition may represent a partner platform that has configured one or more exchange SDKs, and/or the like for implementing a partner interface of the exchange platform.

In some embodiments, the term "user-facing application" refers to a computer program hosted by a computing entity for facilitating one or more user interactions. A user-facing application may include software (e.g., computer readable instructions, etc.) designed to perform one or more computing tasks for a computing entity, such as a member platform. For instance, a user-facing application may facilitate communication between a member and a user. As examples, the user-facing application may be configured to present one or more user interfaces for interacting with a user on behalf of a member. In some examples, the user-facing application may be configured to receive user input (e.g., via one or more user interfaces) to receive information from a user.

In some embodiments, a user-facing application is a partner application that is hosted by the partner platform (e.g., a member platform acting as a partner for a particular exchange, etc.) to facilitate functions for a partner. A partner application may include software (e.g., computer readable instructions, etc.) designed to perform one or more computing tasks for a partner. For instance, a partner application may be configured to present one or more user interfaces for interacting (e.g., browsing, purchasing, reviewing, etc.) with one or more products offered by a retail-based partner, one or more units of information offered by an information-based partner, and/or the like. In some examples, the partner application may be configured to receive user input (e.g., via one or more user interfaces) to receive information from a user.

In some embodiments, a user-facing application is a service provider application that is hosted by the service provider platform (e.g., a member platform acting as a service provider for a particular exchange, etc.) to facilitate functions for the service provider. A service provider application may include software (e.g., computer readable instructions, etc.) designed to perform one or more computing tasks for a service provider. For instance, a service provider application may be configured to present one or more user interfaces for interacting (e.g., reviewing, managing, auditing, enrolling, etc.) with one or more service provider instruments facilitated by the service provider. By way of example, in a financial value system, the service provider application may enable access to a bank account, brokerage account, line of credit, and/or the like, to manage funds, assets, and/or the like, handled by the respective accounts. In some examples, the service provider application may be configured to receive user input (e.g., via the one or more user interfaces) to receive information, authorizations, and/or the like from a user.

In some embodiments, the term "instrument data object" refers to a data entity that represents a service provider instrument. The instrument data object may include one or more instrument identifiers and/or one or more instrument attributes. In some examples, the one or more instrument identifiers and/or one or more instrument attributes may be based at least in part on a type of instrument data object. By way of example, a service provider instrument may be represented in a member platform as a member instrument data object. In addition, or alternatively, the service provider instrument may be independently represented by a system instrument data object in an exchange platform. In some examples, the member instrument data object and the system instrument data object may include one or more of the same one or more instrument identifiers and/or one or more instrument attributes. By way of example, a member platform may register a plurality of service provider instruments with an exchange platform. During registration, the member platform may provide one or more of the instrument identifiers and/or instrument attributes and, in some examples, the exchange platform may return another identifier.

In some embodiments, the member instrument data object is an internal representation of a service provider instrument within a member platform. The member instrument data object may include one or more instrument identifiers, such as a member instrument identifier, an instrument key from the exchange platform, and/or a user identifier. The user identifier, for example, may include a member user identifier. In addition, or alternatively, the member instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a (i) currency associated with the service provider instrument, (ii) an asset availability (e.g., a balance, coverage, etc.) of the service provider instrument, (iii) one or more previous transactions with the service provider instrument, and/or the like.

In some embodiments, the system instrument data object is an external representation of a service provider instrument within the exchange platform. The system instrument data object may include one or more instrument identifiers, such as an instrument reference for a member platform, a system instrument identifier, and/or a user identifier. The user identifier, for example, may include a system user identifier. In addition, or alternatively, the system instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a currency associated with the service provider instrument.

In some embodiments, the term "instrument identifier" refers to any representation of a service provider instrument. The instrument identifier may include an instrument identifier, instrument reference, instrument key, and/or the like, as described herein.

In some embodiments, the term "member instrument identifier" refers to a unique identifier for representing a service provider instrument within a member platform. The member instrument identifier, for example, may include a sequence of numeric, alpha-numeric, any/or any other characters or symbols that represent a service provider instrument to a service provider platform.

In some embodiments, the term "instrument reference" refers to a unique identifier for referencing a member instrument identifier. The instrument reference, for example, may be generated and/or provided by a member platform to an exchange platform to allow the exchange platform to reference an instrument maintained at the member platform. In some examples, the instrument reference is the same value as the member instrument identifier. In some examples, the instrument reference is a different value that is mapped to the member instrument identifier.

In some embodiments, the term "system instrument identifier" refers to a unique identifier for representing a service provider instrument within an exchange platform. The system instrument identifier, for example, may include a sequence of numeric, alpha-numeric, any/or any other characters or symbols that represent a service provider instrument to an exchange platform. In some examples, the system instrument identifier may include a UUID.

In some embodiments, the term "instrument key" refers to a unique identifier for referencing a system instrument identifier. The instrument key, for example, may be generated and/or provided by the exchange platform during a registration process of an instrument with the exchange platform. In some examples, the instrument key may include a wrapped system instrument identifier. For example, the instrument key may include a string of alpha-numeric characters that are formatted according to a key format established by the exchange platform (and/or one or more APIs thereof). The key format may include any number of characters, such as fifty characters or more. In some examples, the characters may be case sensitive. A first portion of the characters (e.g., the first six characters) may be reserved as a partition for identifying an entity associated with the key. For an instrument key, the partition may include a service provider partition. A second portion of the characters may identify the system instrument identifier. The key formats described herein may include one or more different portions, each of which may be arranged in any order.

In some embodiments, the term "instrument representation" refers to a unique identifier for representing a service provider instrument to a user. The instrument representation, for example, may include a sequence of numeric, alpha-numeric, any/or any other characters or symbols that are outwardly representative of a service provider instrument. The format and/or value of an instrument representation may be based at least in part on the type of service provider and/or service provider instrument. For instance, in a financial value system, an instrument reference may include a portion (e.g., the last four digits, etc.) of persistent credentials, such as an account number (e.g., debit account, credit account, etc.), a financial account name, and/or the like. As another example, in an information value system, an instrument reference may include a portion (e.g., one or more digits, alpha-numeric characters, etc.) of persistent credentials, such as a subscription account, and/or the like. For instance, the instrument representation may include a derivative of persistent credentials that may only allow entities with prior knowledge of the persistent credentials to identify the persistent credentials using the instrument representation. As another example, the instrument representation may include an instrument nickname that is assigned and thereafter recognized by a user.

In some embodiments, the term "user data object" refers to a data entity that represents a user that interacts with a member platform and/or the exchange platform. A user, for example, may include an entity (e.g., person, organization, group, etc.) that engages in an exchange of value governed by the exchange platform. In some examples, the user may indirectly cooperate with the exchange platform by creating a user account with a registered service provider, registering (and/or giving permission to register) a service provider instrument, and/or the like. In some examples, the exchange platform may act on the user's behalf without the user directly engaging with the exchange platform. For example, the exchange platform may act as a hidden intermediary between a user-facing application and a user's service provider instrument.

In some embodiments, a user data object includes one or more user identifiers and/or one or more user attributes. In some examples, the one or more user identifiers and/or one or more user attributes may be based at least in part on a type of user data object. By way of example, a user may be represented in a member platform as a member user data object. In addition, or alternatively, the user may be independently represented by a system user data object in an exchange platform. In some examples, the member user data object and the system user data object may include one or more of the same one or more user identifiers and/or user attributes. By way of example, a member platform may register a plurality of users with an exchange platform. During registration, the member platform may provide one or more of the user identifiers and/or user attributes and, in some examples, the exchange platform may return another identifier.

In some embodiments, the member user data object is an internal representation of a user within a member platform. The member user data object may include one or more user identifiers, such as a member user identifier, a user key from the exchange platform, and/or the like. In addition, or alternatively, the member user data object may include one or more user attributes. The one or more user attributes may be indicative of one or more contextual characteristics for a user. In some examples, the user attributes may be indicative of one or more identifiable characteristics for a user. By way of example, the user attributes may be indicative of a user's first name, last name, email, physical address (e.g., one or more of a street, locality, region, postal code, country, etc.), birthday (e.g., a birth date, an age band, etc.), phone number, and/or the like. In some examples, the user attributes may include encrypted, hashed, and/or otherwise secured representations of the identifiable characteristics for a user. For instance, the user attributes may include one or more hashed identifiers for the user and/or the like.

In some embodiments, the system user data object is an external representation of a member's user within the exchange platform. The system user data object may include one or more user identifiers, such as a user reference for a member platform, a system user identifier, and/or the like. In addition, or alternatively, the system user data object may include one or more user attributes, such as those described herein. By way of example, a member platform may register a user with the exchange platform. During registration, the member platform may provide the user reference for the user and/or the one or more user attributes. In some examples, the user attributes may include hashed and/or encrypted identifiers for the user.

In some embodiments, the term "user identifier" refers to a unique identifier for a user involved in a value-based exchange. A user identifier may include a sequence of numeric, alpha-numeric, any/or any other characters or symbols that are representative of a user of the exchange platform and/or member platform. In some examples, a user identifier may include a user reference, a user key, a system user identifier, a member user identifier, and/or the like.

In some embodiments, the term "system user identifier" refers to a unique identifier for representing a user within an exchange platform. The system user identifier, for example, may include a sequence of numeric, alpha-numeric, any/or any other characters or symbols that represent a user to an exchange platform. In some examples, the system user identifier may include a UUID specific to a particular user.

In some embodiments, the term "member user identifier" refers to a unique identifier for representing a user within a member platform. The member user identifier, for example, may include a sequence of numeric, alpha-numeric, any/or any other characters or symbols that represent a user to a service provider platform.

In some embodiments, the term "user reference" refers to a unique identifier for referencing a member user identifier. The user reference, for example, may be generated and/or provided by a member platform to an exchange platform to allow the exchange platform to reference a user associated with the member platform. In some examples, the user reference is the same value as the member user identifier. In some examples, the user reference is a different value that is mapped to the member user identifier.

In some embodiments, the term "user key" refers to a unique identifier for referencing a system user identifier. The user key, for example, may be generated and/or provided by the exchange platform during a registration process of a user with the exchange platform. In some examples, the user key may include a wrapped system user identifier. For example, the user key may include a string of alpha-numeric characters that are formatted according to a key format established by the exchange platform (and/or one or more APIs thereof). The key format, for example, may include a first portion of the characters (e.g., the first six characters) that may be reserved as a partition for identifying an entity (e.g., a member, etc.) associated with the key. For example, for a user key, the partition may include a service provider partition and/or a partner partition. A second portion of the characters may identify the system user identifier.

In some embodiments, the term "exchange data object" refers to a data entity that represents an authorized value exchange between one or more members associated with the exchange platform. In some examples, the exchange data object may include one or more identifiers and/or one or more exchange attributes. For example, the one or more identifiers and/or one or more exchange attributes may be based at least in part on a type of exchange data object. By way of example, an exchange may be represented in a member platform as a member exchange data object. In addition, or alternatively, the exchange may be independently represented by a system exchange data object in an exchange platform. In some examples, the member exchange data object and the system exchange data object may include one or more of the same one or more identifiers and/or exchange attributes. By way of example, using some of the techniques of the present disclosure, the exchange platform may issue one or more unique identifiers to a member platform that may be used to authorize a value exchange.

In some embodiments, the system exchange data object is an internal representation of a value exchange that is intermediated using the exchange platform. In some examples, the system exchange data object may include one or more different identifiers and/or exchange attributes depending on the role of the system exchange data object in a value-based exchange.

For example, a system exchange data object may include a service provider-specific exchange data object that corresponds to a service provider platform. The service provider-specific exchange data object may include one or more identifiers, such as an exchange identifier, a system user identifier, a system instrument identifier, a UUEK, and/or the like. In addition, or alternatively, the service provider-specific exchange data object may include one or more exchange attributes, such as an expiration date, a currency (e.g., for a financial value system, etc.), and/or the like.

In addition, or alternatively, the system exchange data object may include a partner-specific exchange data object that corresponds to a partner platform. The partner-specific exchange data object may include one or more identifiers, such as an exchange identifier, an instrument key, a UUEK, a member instrument reference (e.g., a partner-specific instrument reference, etc.), and/or the like. In addition, or alternatively, the partner-specific exchange data object may include one or more exchange attributes, such as an expiration date, a currency (e.g., for a financial value system, etc.), an instrument type, a previous UUEK identifier, and/or the like. In some embodiments, the member exchange data object is an external representation of a value exchange that is intermediated using the exchange platform. The member exchange data object may include one or more identifiers, such as a member exchange identifier, a member instrument identifier, a UUEK from the exchange platform, and/or the like.

In some embodiments, the term "exchange identifier" refers to a unique identifier for an exchange of value using the exchange platform. The exchange identifier may include a sequence of numeric, alpha-numeric, any/or any other characters or symbols that are representative of at least a user and/or a service provider instrument. In some examples, the unique exchange identifier may include a universally unique identifier (UUID) that may be mapped (e.g., through a series of identifiers, etc.) to a user, a service provider instrument, and/or a member registered with the exchange platform. In some examples, the exchange identifier may be randomly generated using one or more UUID generators. For instance, the exchange identifier may include a randomized sixteen bytes of information generated in accordance with one or more UUID formatting standards, such as UUID v4, and/or the like. Therefore, while the exchange identifier may be leveraged by the exchange platform and/or a member platform for one or more functions, the same exchange identifier will be useless to external parties without a prior association between the exchange identifier and one or more other identifiers. In some examples, the exchange identifier may be externally represented by a UUEK.

In some embodiments, an "universally unique ephemeral key" or "UUEK" refers to an external representation of an exchange identifier that may be issued (e.g., in place of the service provider exchange identifier and/or a partner exchange identifier) to an external entity, such as a user, partner, and/or service provider, to initiate a transaction using the exchange platform. To do so, the UUEK may be generated and issued by the exchange platform to the external entity. Each UUEK may include a plurality of values (e.g., up to fifty characters and/or more that may be case sensitive) that represent one or more aspects of a transaction. For example, the plurality of values may be indicative of an exchange identifier, a partition (e.g., identifying the recipient of the UUEK, etc.), an identifier type, and/or one or more flags. By way of example, a UUEK may include a partner-specific UUEK and/or a service provider-specific UUEK. The partner-specific UUEK may be correlated to a partner-specific exchange data object, whereas a service provider-specific UUEK may be correlated to a service provider-specific exchange data object, as described herein.

By way of example, a UUEK may be generated in accordance with a key format. The key format may include a plurality of characters including, for example, fifty characters or more that may be case sensitive. A first portion of the characters (e.g., the first six characters) may be reserved as a partition for identifying a recipient of the UUEK. The partition, for example, may include a partner partition, a service provider partition, and/or any other member partition. By way of example, a UUEK may be issued in response to a request from an authorized member, such as an affiliated partner and/or service provider.

In addition, or alternatively, at least one character (e.g., a seventh character) of the key format may identify a format of the UUEK. At least another character (e.g., an eighth character) may identify a type of UUEK. In some examples, a second portion of the characters may identify an exchange identifier (e.g., a group of twenty-two characters following the eighth character). A third portion of characters may be reserved (e.g., a group of twenty characters following the first portion of characters). An example representation is provided below:

```
ppppppFiGGGGGGGGGGGGGGGGGGGGGGrrrrrrrrrrrrrrrrrrrr
```

where p represents a partition character, F represents a format character, i represents an identifier type character, G represents an exchange identifier, and r represents a reserved character. The key format allows for 9.8×10 to the 84 unique permutations, which is more than the number of atoms in the known observable universe. This enables the generation and distribution of new UUEKs on-demand without compromising the security of underlying data to which the UUEKs may be mapped, such as identifiers for a user, an instrument, and/or any other potentially sensitive information. The key formats described herein may include one or more different portions, each of which may be arranged in any order.

In some embodiments, the term "session identifier" refers to a unique identifier for identifying a series of related message exchanges between the exchange platform and an external platform.

In some embodiments, the term "matching code" refers to a session-unique identifier for authorizing an enrollment session between one or more entities. The matching code, for example, may include a sequence of numeric, alphanumeric, and/or the like characters that may be provided to multiple entities to ensure that each of the entities is involved in the same communication sequence. By way of example, a matching code may include a sequence of eight characters that may be generated by the exchange platform, provided to a service provider platform, and then received from a partner platform to ensure that the exchange platform, the service provider platform, and the partner platform are each interacting with the same end user (e.g., by comparing a received matching code to a generated matching code as described herein).

III. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams, flowchart illustrations, messaging flows, and other representations of data, operations, and messaging schemes. It should be understood that each block of the block, arrow, and/or the like of the diagrams, flowchart illustrations, etc. may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments may produce specifically-configured machines performing the steps or operations specified in the representations of the present disclosure. Accordingly, the representations of the present disclosure support various combinations of embodiments for performing the specified instructions, operations, or steps.

IV. Example System Architecture

Figure 1:
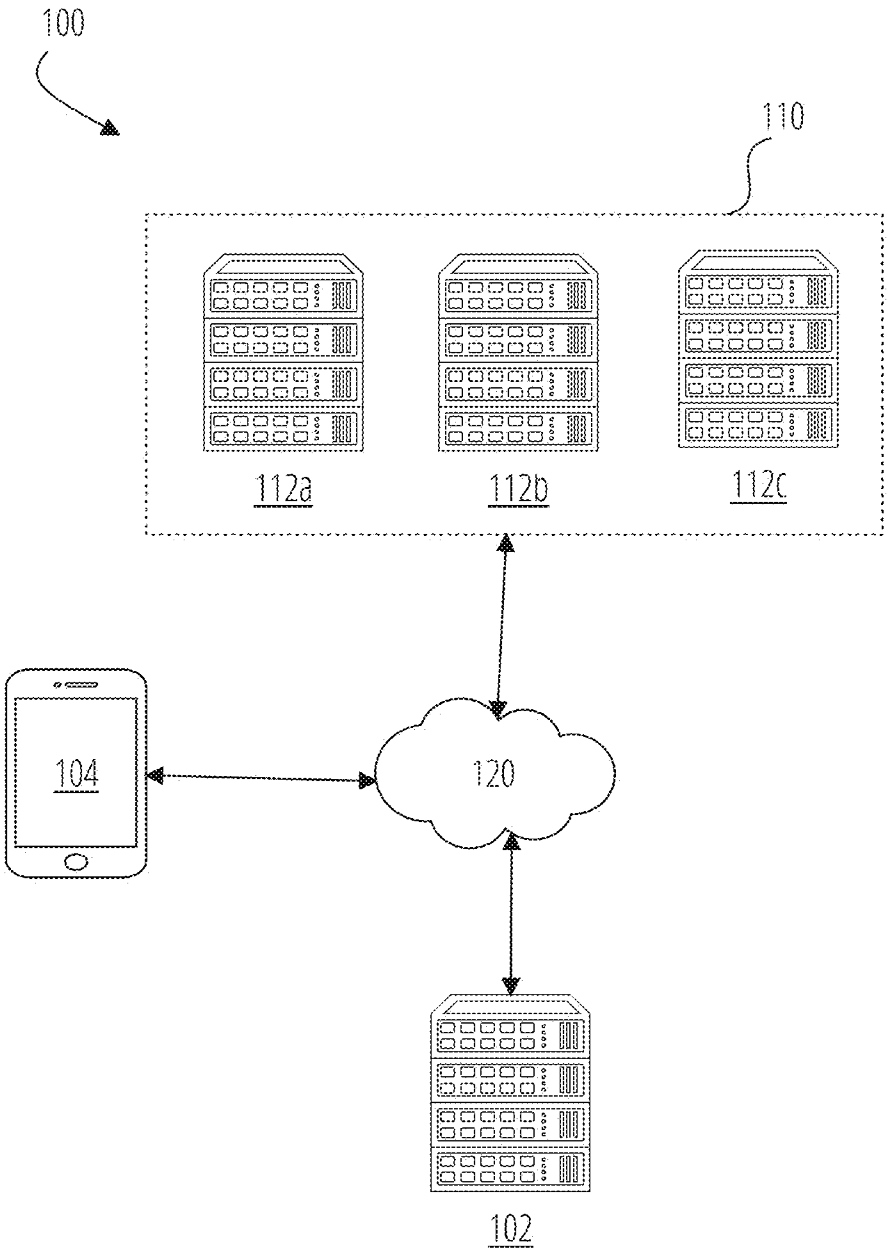
FIG. 1 is an example diagram of a computing ecosystem in accordance with one or more embodiments of the present disclosure.

FIG. 1 provides an illustration of a computing ecosystem 100 that may be used in conjunction with various embodiments of the present disclosure. As shown in FIG. 1, the architecture may include an exchange platform 102, one or more client devices 104, a network of member platforms 110, one or more networks 120, and/or the like. The network of member platforms 110 may include a first member platform 112*a*, a second member platform 112*b*, a third member platform 112*c*, and/or the like that are affiliated (e.g., registered, etc.) with the exchange platform 102. For example, as described herein, the network of member platforms 110 may include a partner platform, a service provider platform, and/or an exchange modification platform. In some examples, the partner platform may include a first member platform 112*a*, the service provider platform may include a second member platform 112*b* that is different from the first member platform 112*a*, and/or an exchange modification platform may include a third member platform 112*c* that is different from the first member platform 112*a* and/or the second member platform 112*b*. In some examples, one or more of the partner platform, the service provider platform, and/or the exchange modification platform may be embodied by a single member platform.

In some embodiments, the network of member platforms 110 are configured for one or more different services. For example, a service provider platform (e.g., second member platform 112*b*) may manage one or more service provider instruments that provide value for executing a value-based exchange. An exchange modification platform (e.g., third member platform 112*c*) may manage one or more exchange modifiers that modify an exchange value before a value-based exchange is executed. In some examples, the exchange platform 102 may interact with both a service provider platform (e.g., second member platform 112*b*) and an exchange modification platform (e.g., third member platform 112*c*) to facilitate a value-based exchange. For instance, as described herein, an exchange modification platform (e.g., third member platform 112*c*) may modify an exchange value of a value-based exchange, the modified exchange value may then be provided to a service provider platform (e.g., second member platform 112*b*) for authorizing the value-based exchange using a service provider instrument.

Each of the components of the computing ecosystem 100 may be in electronic communication with, for example, one another over the same or different wireless or wired networks 120 including, for example, a wired or wireless Personal Area Network (PAN), Local Area Network (LAN), Metropolitan Area Network (MAN), Wide Area Network (WAN), or the like. The network 120, for example, may include any network connection including any type of network and/or across any geographic boundary (e.g., inter-country connections involving one or more sovereign entities, etc.). Additionally, while FIG. 1 illustrates certain systems as separate, standalone entities, the various embodiments are not limited to this particular architecture.

Although not explicitly illustrated, the exchange platform 102 may be a client device 104 and/or may be a part of the network of member platforms 110. In addition, or alternatively, the member platforms 112*a-c* may be a client device 104 and/or a part of the exchange platform 102. In some embodiments, each of the exchange platform 102 and/or the member platforms 112*a-c* may include the same computing platform.

a. Example Computing Platform

Figure 2:
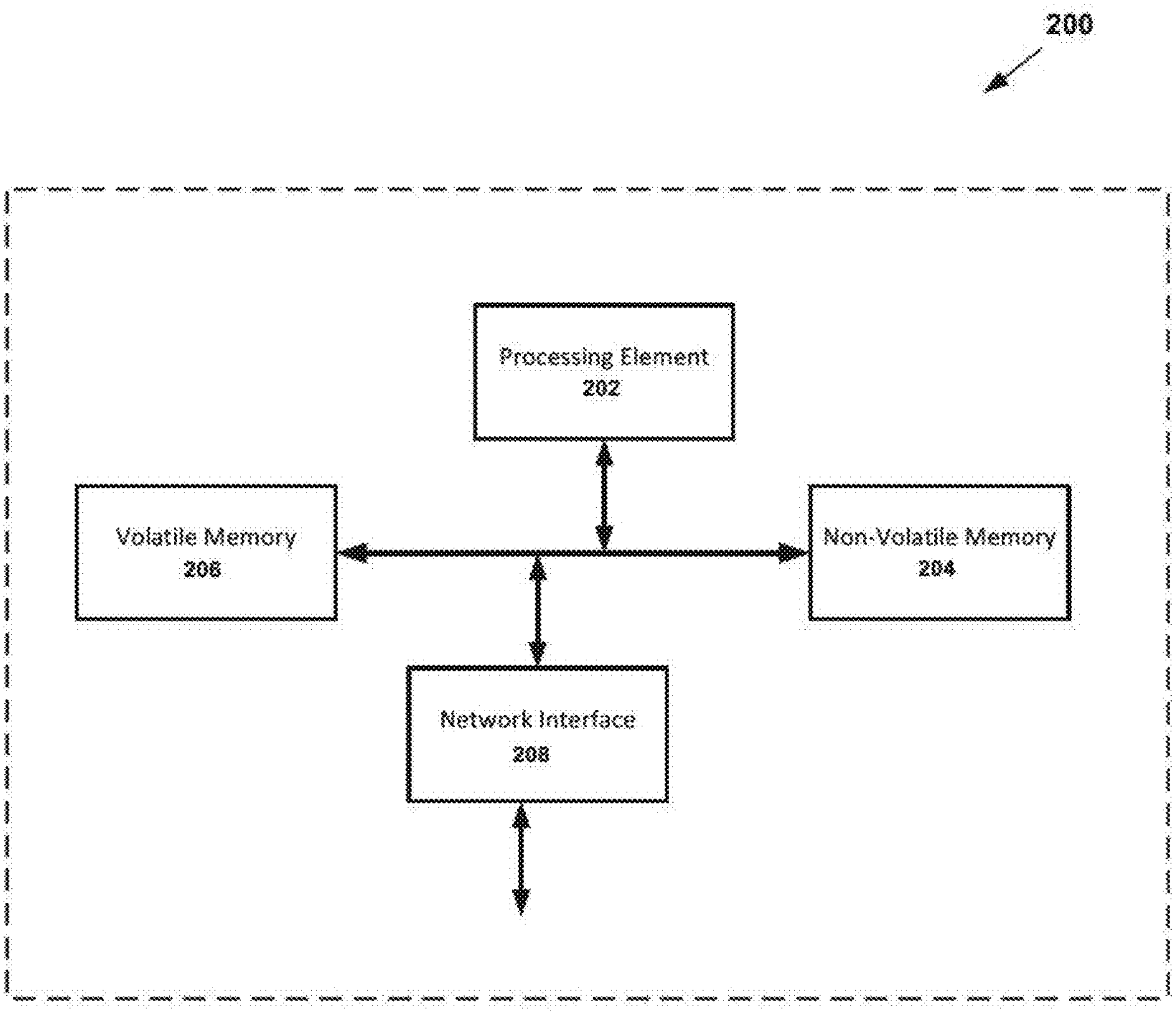
FIG. 2 is an example schematic of a computing platform in accordance with one or more embodiments of the present disclosure.

FIG. 2 is an example schematic of a computing platform 200 in accordance with one or more embodiments of the present disclosure. A computing platform 200, such as the exchange platform 102, the member platforms 112*a-c*, and/or the like of FIG. 1, may include, or be in communication with, one or more processing elements 202 (also referred to as processors, processing circuitry, and/or similar terms used herein interchangeably) that communicate with other elements within the computing platform 200 via a bus, for example. As will be understood, the processing element 202 may be embodied in a number of different ways.

For example, the processing element 202 may be embodied as one or more complex programmable logic devices (CPLDs), microprocessors, multi-core processors, co-processing entities, application-specific instruction-set processors (ASIPs), microcontrollers, and/or controllers. Further, the processing element 202 may be embodied as one or more other processing devices or circuitry. The term circuitry may refer to an entirely hardware embodiment or a combination of hardware and computer program products. Thus, the processing element 202 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 202 may be configured for a particular use or configured to execute instructions stored in volatile or non-volatile media or otherwise accessible to the processing element 202. As such, whether configured by hardware or computer program products, or by a combination thereof, the processing element 202 may be capable of performing steps or operations according to embodiments of the present disclosure when configured accordingly.

In some embodiments, the computing platform 200 includes, or is in communication with, non-volatile memory 204 (also referred to as non-volatile storage, media, memory storage, memory circuitry, and/or similar terms used herein interchangeably). In some examples, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile memory 204 may store data, databases, database instances, database management systems, files, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the computing platform 200 includes, or is in communication with, volatile memory 206 (also referred to as volatile storage, media, memory storage, memory circuitry, and/or similar terms used herein interchangeably). In some examples, the volatile memory 206 may also include one or more volatile storage or memory media, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile memory 206 may be used to store at least portions of the databases, database instances, database management systems, data, applications, programs, program modules, scripts, source code, object code, byte code, compiled code, interpreted code, machine code, executable instructions, and/or the like being executed by, for example, the processing element 202. Thus, the databases, database instances, database management systems, data, applications, programs, program modules, scripts, source code, object code, byte code, compiled code, interpreted code, machine code, executable instructions, and/or the like may be used to control certain aspects of the step/operation of the computing platform 200 with the assistance of the processing element 202 and operating system.

As indicated, in one embodiment, the computing platform 200 may also include one or more network interfaces 208 for communicating with various computing entities (e.g., one or more components of FIG. 1), such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing platform 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing platform 200 may include, or be in communication with, one or more input elements, such as a keyboard input, a mouse input, a touch screen/display input, motion input, movement input, audio input, pointing device input, joystick input, keypad input, and/or the like. The computing platform 200 may also include, or be in communication with, one or more output elements (not shown), such as audio output, video output, screen/display output, motion output, movement output, and/or the like.

As indicated, the computing platform 200 may be an example of one or more of the components of FIG. 1, such as the exchange platform 102 and/or the member platforms 112*a-c*.

b. Example Client Device

Figure 3:
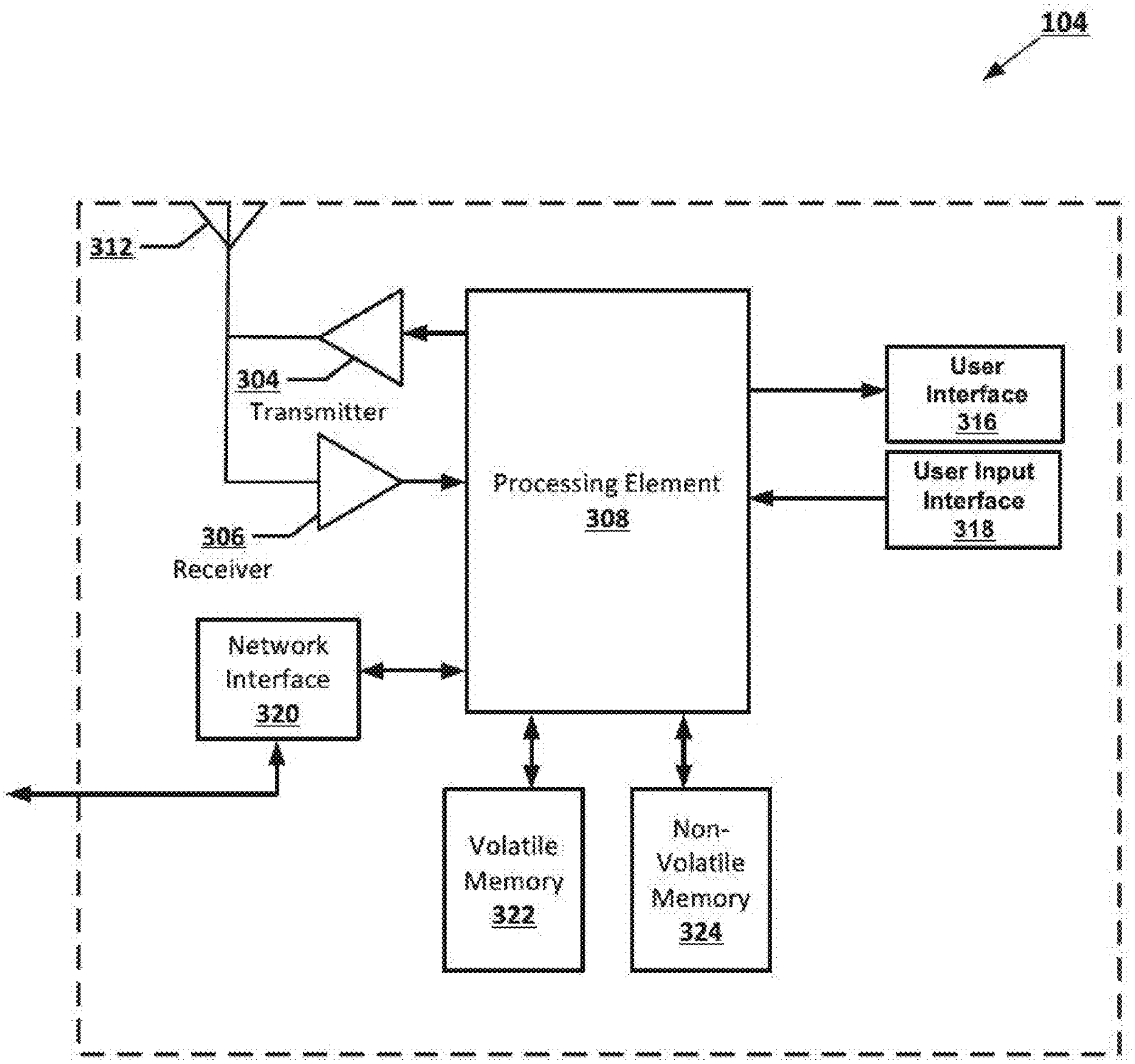
FIG. 3 is an example schematic of a client device in accordance with one or more embodiments of the present disclosure.

FIG. 3 is an example schematic of a client device 104 in accordance with one or more embodiments of the present disclosure. Client devices 104 may be operated by various entities, and an example computing ecosystem may include one or more client devices 104. For example, a client device 104 may be associated with, owned by, operated by, and/or the like by one or more end users. In various embodiments, an end user of a client device 104 may wish to engage in a value exchange between a partner and a service provider. As described herein, the user may do so by interacting leverage one or functionalities provided by an exchange platform through user input with the client device 104.

For example, a client device 104 may be a personal computing device, smartphone, tablet, laptop, personal digital assistant, and/or the like. In various embodiments, the computing platform 200 may communicate with and manage value exchanges for one or more client devices 104. As shown in FIG. 3, the client device 104 may include an antenna 312, a transmitter 304 (e.g., radio), a receiver 306 (e.g., radio), and a processing element 308 (e.g., CPLDs, microprocessors, multi-core processors, co-processing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the client device 104 may be capable of operating with one or more air interface standards, communication protocols, modulation types, and access types. More particularly, the client device 104 may operate in accordance with any of a number of wireless communication standards and protocols, such as those described above with regard to the computing platform 200. In a particular embodiment, the client device 104 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client device 104 may operate in accordance with multiple wired communication standards and protocols, such as those described above with regard to the computing platform 200 via a network interface 320.

Via these communication standards and protocols, the client device 104 may communicate with a computing platform 200 using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client device 104 may also download changes, add-ons, and updates, for instance, to its firmware, software (e.g., including executable instructions, applications, program modules), and operating system.

In some embodiments, the client device 104 includes location determining aspects, devices, modules, functionalities, and/or similar words used herein interchangeably. For example, the client device 104 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client device 104 in connection with a variety of other systems, including cellular towers, Wi-Fi access points, and/or the like. Similarly, the client device 104 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

In some embodiments, the client device 104 may include a user interface 316 (e.g., a display screen, a speaker, a tactile mechanization, etc. coupled to a processing element 308) and/or a user input interface 318 (e.g., a touch screen, a microphone, etc. coupled to a processing element 308). For example, the user interface 316 may be a present one or more application screens presented by one or more computing platforms described herein. The user input interface 318 may include any of a number of devices or interfaces allowing the client device 104 to receive data, such as a keypad (hard or soft), a touch display, voice/speech or motion interfaces, or other input device. In examples including a keypad, the keypad may include (or cause display of) the conventional numeric (0-9) and related keys (#, *), and other keys used for operating the client device 104 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client device 104 may also include volatile memory 322 and/or non-volatile memory 324, which may be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store databases, database instances, database management systems, data, applications, programs, program modules, scripts, source code, object code, byte code, compiled code, interpreted code, machine code, executable instructions, and/or the like to implement the functions of the client device 104. As indicated, this may include a partner application, service provider application, and/or the like that is resident on the client device 104 and/or accessible through a browser or other user interface for communicating with a computing platform 200.

In some embodiments, the client device 104 may include one or more components or functionality that are the same or similar to those of a computing platform 200, as described in greater detail above. As will be recognized, these architectures and descriptions are provided for example purposes only and are not limited to the various embodiments.

In various embodiments, the client device 104 may be embodied as an artificial intelligence (AI) computing entity, such as an Amazon Echo, Amazon Echo Dot, Amazon Show, Google Home, and/or the like. Accordingly, the client device 104 may be configured to provide and/or receive information/data from an end user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

c. Example Networks

In some embodiments, any two or more of the illustrative components of the computing ecosystem 100 of FIG. 1 may be configured to communicate with one another via respective communicative couplings to one or more networks 120. The networks 120 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 120 may have any suitable communication range associated therewith and may include, for example, global networks (e.g., the Internet), MANS, WANS, LANs, or PANs. In addition, the networks 120 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

d. Example Value Exchange System

Figure 4:
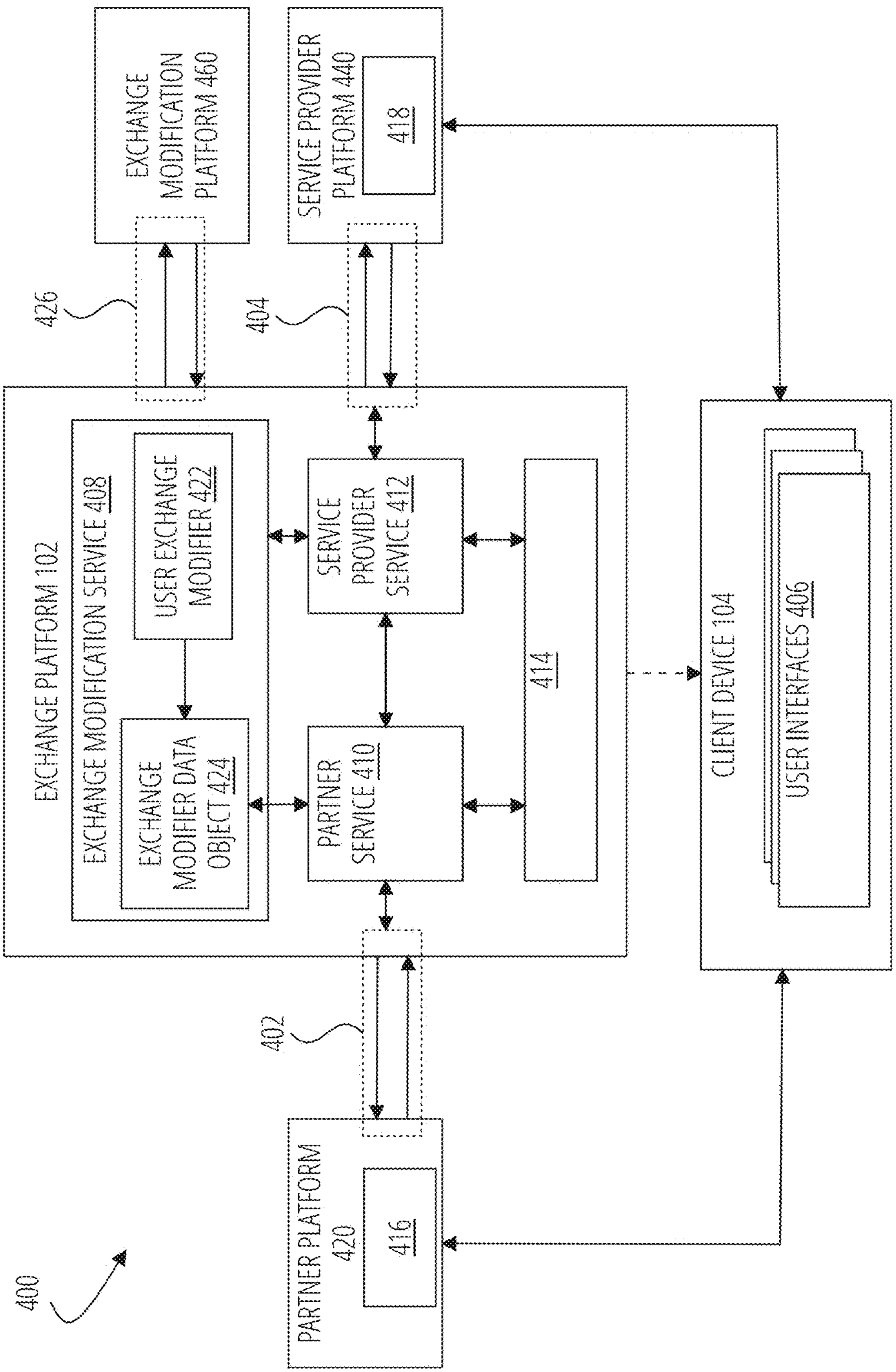
FIG. 4 is an example block diagram of an example credential-less value exchange system in accordance with one or more embodiments of the present disclosure.

FIG. 4 is an example block diagram of an example network-based exchange system 400 in accordance with one or more embodiments of the present disclosure. The network-based exchange system 400 includes a new computing ecosystem and computing platforms that provide an end-to-end value exchange solution to replace traditional exchange processing systems. As described herein, the network-based exchange system 400 may be value system agnostic and may be applied to any value-based exchange including, as examples, information-based exchanges, financial-based exchanges, reputation-based exchanges, healthcare-based exchanges, benefit-based exchanges, and/or the like. In any value system, the network-based exchange system 400 may leverage an intermediary entity and one or more defined communication interfaces to facilitate a network-based exchange between a value seeking entity (e.g., a partner), a value providing entity (e.g., a first service provider), and/or a value modification entity (e.g., a second service provider) that may be associated with one or more member platforms of the network-based exchange system 400.

As depicted, the network-based exchange system 400 may include an exchange platform 102, a partner platform 420, a service provider platform 440, and/or an exchange modification platform 460 that may be configured to communicate through one or more exchange interfaces. The partner platform 420, service provider platform 440, and/or the exchange modification platform 460 may include one or more member platforms 112*a-c* from the network of member platforms 110. For instance, the partner platform 420, service provider platform 440, and/or the exchange modification platform 460 may include a single member platform. In addition, or alternatively, the partner platform 420, the service provider platform 440, and/or the exchange modification platform 460 may include one or more different member platforms (e.g., member platforms 112*a*, 112*b*, 112*c*). In some examples, a user may interact with one or more of the platforms through a client device 104.

In some embodiments, the exchange platform 102 is a computing entity that is configured to facilitate a credential-less exchange of value for one or more members in a network. The exchange platform 102 may include one or more processing devices, memory devices, and/or the like that are physically and/or wirelessly coupled and configured to collectively (and/or individually) perform the one or more computing tasks for facilitating a value system agnostic exchange. In some examples, the exchange platform 102 may include, define, and/or otherwise leverage one or more exchange interfaces for facilitating communications (e.g., requests, responses, etc.) between a plurality of members. As described herein, the interfaces may be leveraged to facilitate a secure exchange between one or more members in any value system.

In some embodiments, a member is an entity that collaborates with the exchange platform 102 to take part in an exchange of value. As examples, a member may include (i) a partner that utilizes the exchange platform 102 to receive value, (ii) a service provider that utilizes the exchange platform 102 to provide value, (iii) a modification provider that utilizes the exchange platform 102 to modify value, and/or (iv) any combination of a partner, service provider, or modification provider. As used herein, a member may be referred to as a partner when it receives value through a value exchange, a service provider when it provides value through a value exchange, or a modification provider when it modifies a value of a value exchange. Thus, the same member may be a partner, a service provider, or a modification provider depending on the role of the member in a value exchange. For example, a member may be a partner that receives value for a value exchange. The same member may be a service provider that provides value in another value exchange. The same member may be a modification provider that modifies a value of another value exchange. In some examples, the same member may be both the partner, the service provider, and/or the modification provider in the same value exchange, such that the member utilizes the exchange platform 102 to provide, modify, and then receive value in a sole member value exchange.

In some embodiments, a member is a partner when it utilizes a service provided by a service provider. A partner may include any value seeking entity in any value system. As an example, in a financial value system, a partner may include a merchant (e.g., retailer, brick-and-mortar establishment, etc.) that may utilize a service provider, such as a financial institution, to access funds for a financial transaction. In addition, or alternatively, in an information value system, a partner may include a news publisher (e.g., a newspaper, media organization, etc.) that may utilize a service provider, such as a news agency (e.g., wire service, news service, etc.) to access information for an information transaction. As will be understood, the techniques of the present disclosure may be applied to any value system and the partner may include any value seeker for any respective value system.

In some embodiments, a member is a service provider when it provides a service for a partner or another service provider. A service provider may include a source of value in any value system. As an example, in a financial value system, a service provider may include a financial institution (e.g., bank, currency exchange platform 102, credit union, etc.) that may provide access to funds for a financial transaction between one or more entities. In addition, or alternatively, in an information value system, a service provider may include a news agency (e.g., wire service, news service, etc.) that may source information for publication by a news publisher. As will be understood, the techniques of the present disclosure may be applied to any value system and the service provider may include any source of value for any respective value system.

In some embodiments, a member is a modification provider when it provides an exchange modifier on behalf of a partner or service provider. A modification provider, for instance, may manage one or more exchange modifiers that modify an exchange value before a value-based exchange is executed. In some examples, the exchange platform 102 may interact with both a service provider and a modification provider to facilitate a value-based exchange. For instance, as described herein, a modification provider may modify an exchange value of a value-based exchange, the modified exchange value may then be provided to a service provider for authorizing the value-based exchange using a service provider instrument.

In some embodiments, a service provider instrument is a mechanism leveraged by a service provider for providing value on behalf of a particular user. The service provider instrument may depend on the value system and/or service provider. In some examples, the service provider instrument may include an account with the service provider. For example, in a financial value system, a service provider instrument may include a bank account (e.g., checking, saving, etc.), brokerage account, line of credit, and/or the like. In an information value system, the service provider instrument may include a subscriber account, and/or the like. In a healthcare value system, the service provider instrument may include a health care benefits account, and/or the like.

A service provider and a partner may communicate through one or more respective member platforms that are respectively associated with the entities. As one example, a partner may be associated with a partner platform 420 and a service provider may be associated with a service provider platform 440 and/or an exchange modification platform 460.

In some embodiments, a member platform is a computing entity corresponding to a member associated with the exchange platform 102. The member platform may include a partner platform 420 acting on behalf of a partner, a service provider platform 440 acting on behalf of an exchange authorization provider, an exchange modification platform 460 acting on behalf of a modification provider, and/or one or more combinations thereof. In some examples, a member platform may be one or more of the partner platform 420, the service provider platform 440, and/or the exchange modification platform 460. For example, the same member platform may be configured to operate on behalf of a partner for one value exchange, a service provider for another value exchange, and/or a modification provider for another value exchange. In some examples, the same member platform may be configured to operate on behalf of one or more combinations of a partner, a service provider, and/or a modification platform in a single value exchange. It is noted that the term member platform may refer to a partner platform 420, a service provider platform 440, a modification platform 460, and/or one or more combinations thereof and, in some examples, may depend on the role of the member platform in a value exchange (e.g., and/or one or more APIs utilized by the member platform in the value exchange).

In some embodiments, the partner platform 420 is a computing entity that is configured to perform one or more operations on behalf of a partner. The partner platform 420, for example, may include one or more processing devices, memory devices, and/or the like that are physically and/or wirelessly coupled and configured to collectively (and/or individually) perform the one or more computing tasks for requesting value in a value system agnostic exchange. In some examples, the partner platform 420 may include, define, and/or otherwise leverage one or more exchange interfaces for facilitating communications (e.g., requests, responses, etc.) with the exchange platform 102. In some examples, the partner platform 420 may be configured to host one or more user-facing applications (e.g., a partner application, etc.) for interacting with one or more users.

The partner platform 420, for example in a financial value system, may host an online marketplace for the partner that allows a user to interact (e.g., search, browse, purchase, return, etc.) with one or more products or services offered by the partner. In the event of a product purchase, the partner platform 420 may cooperate with one or more service providers to access funds for the purchase. Traditionally, access to funds from a service provider is facilitated using a card number, account number, and/or another financial credential that may expose a user to malicious parties. To address network security and data privacy concerns with traditional financial systems (and/or other value-based systems), the partner platform 420 may register with the exchange platform 102 by configuring one or more software development kits (SDKs), APIs, and/or the like for facilitating communications with the exchange platform 102. For example, the partner platform 420 may include, define, and/or otherwise leverage one or more partner interface 402 for facilitating communications (e.g., requests, responses, etc.) with the exchange platform 102.

In some embodiments, the service provider platform 440 is a computing entity that is configured to perform one or more operations on behalf of a service provider. A service provider platform 440, for example, may include one or more processing devices, memory devices, and/or the like that are physically and/or wirelessly coupled and configured to collectively (and/or individually) perform the one or more computing tasks for providing value in a value system agnostic exchange. In some examples, a service provider platform 440 may include, implement, and/or otherwise leverage one or more interfaces for facilitating communications (e.g., requests, responses, etc.) with the exchange platform 102. In some examples, a service provider platform 440 may be configured to facilitate one or more service provider instruments. In some examples, the service provider platform 440 may be configured to host one or more user-facing applications (e.g., a service provider applications, etc.) for managing the one or more service provider instruments.

In some examples, the service provider platform 440, for example in a financial value system, may maintain one or more financial assets (e.g., lines of credit, bank accounts, etc.) that allow a user to fund an exchange for purchasing a product from a partner. In the event of a product purchase, the service provider platform 440 may cooperate with partner platform 420 to authorize an exchange and/or otherwise provide access to funds for the purchase. Traditionally, access to funds from the service provider is facilitated by presenting a card number, account number, and/or another financial credential to the service provider platform 440 which may expose a user, service provider, or partner to malicious parties, especially when provided over an unsecure network (e.g., public network, and/or the like). To address network security and data privacy concerns with traditional financial systems (and/or other value-based systems), the service provider platform 440 may register with the exchange platform 102 by configuring one or more software development kits (SDKs), APIs, and/or the like for facilitating communications with the exchange platform 102. For example, the service provider platform 440 may include, implement, and/or otherwise leverage one or more service provider interfaces 404 for facilitating communications (e.g., requests, responses, etc.) with the exchange platform 102.

As described herein, a service provider interface 404 may enable the exchange platform 102 to identify and request the use of a service provider instrument for facilitating a transaction. For example, the service provider platform 440 may be configured to facilitate one or more service provider instruments. In some examples, a service provider instrument may include a virtual instrument (e.g., virtual account, line of credit, etc.) hosted by a service provider platform 440. For instance, the service provider platform 440 may be configured to maintain a plurality of instrument data objects indicative of a plurality of service provider instruments for a plurality of affiliated entities.

In some embodiments, an instrument data object is a data entity that represents a service provider instrument. The instrument data object may include one or more instrument identifiers and/or one or more instrument attributes. In some examples, the one or more instrument identifiers and/or one or more instrument attributes may be based at least in part on a type of instrument data object. By way of example, a service provider instrument may be represented in a member platform (e.g., the service provider platform 440) as a member instrument data object. In addition, or alternatively, the service provider instrument may be independently represented by a system instrument data object in an exchange platform 102. In some examples, the member instrument data object and the system instrument data object may include one or more of the same one or more instrument identifiers and/or one or more instrument attributes. By way of example, a member platform may register a plurality of service provider instruments with the exchange platform 102 (e.g., using a service provider interface 404). During registration, the member platform (e.g., service provider platform 440) may provide one or more of the instrument identifiers and/or instrument attributes and, in some examples, the exchange platform 102 may return another identifier.

In some embodiments, the member instrument data object is an internal representation of a service provider instrument within a member platform, such as the service provider platform 440. The member instrument data object may include one or more instrument identifiers, such as a member instrument identifier, an instrument key from the exchange platform 102, and/or a user identifier. The user identifier, for example, may include a member user identifier, as described herein. In addition, or alternatively, the member instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a (i) currency associated with the service provider instrument, (ii) an asset availability (e.g., a balance, coverage, etc.) of the service provider instrument, (iii) one or more previous transactions with the service provider instrument, and/or the like.

In some embodiments, the system instrument data object is an external representation of a service provider instrument within the exchange platform 102. The system instrument data object may include one or more instrument identifiers, such as an instrument reference for a member platform, a system instrument identifier, and/or a user identifier. The user identifier, for example, may include a system user identifier, as described herein. In addition, or alternatively, the system instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a currency associated with the service provider instrument.

In some embodiments, the exchange modification platform 460 is a computing entity that is configured to perform one or more operations on behalf of a modification provider. An exchange modification platform 460, for example, may include one or more processing devices, memory devices, and/or the like that are physically and/or wirelessly coupled and configured to collectively (and/or individually) perform the one or more computing tasks for modifying value in a value system agnostic exchange. In some examples, an exchange modification platform 460 may include, define, and/or otherwise leverage one or more APIs for facilitating communications (e.g., requests and responses, etc.) with the exchange platform 102. In some examples, an exchange modification platform 460 may be configured to facilitate one or more exchange modifier data objects 424. In some examples, the exchange modification platform 460 may be configured to host one or more user-facing applications (e.g., a modification applications, etc.) for managing the one or more exchange modifier data objects 424.

In some examples, the exchange modification platform 460, for example in a financial value system, may maintain one or more financial incentive programs (e.g., coupons, discounts, rewards accounts, etc.) that allow a user to modify the value of exchange for purchasing a product from a partner. In the event of a product purchase, the exchange modification platform 460 may cooperate with the partner platform 420 and the service provider platform 440 to decrease the value of the exchange (e.g., by applying a discount, etc.) and/or increase the value of the exchange (e.g., by applying a penalty, etc.) on behalf of a user. To address network security and data privacy concerns with traditional exchange modification systems (and/or other value-based systems), the exchange modification platform 460 may register with the exchange platform 102 by configuring one or more software development kits (SDKs), APIs, and/or the like for facilitating communications with the exchange platform 102. For example, the exchange modification platform 460 may include, implement, and/or otherwise leverage one or more exchange modification interfaces 426 for facilitating communications (e.g., requests, responses, etc.) with the exchange platform 102. Through the exchange modification interfaces 426, the exchange modification platform 460 may configure and/or handle the use of one or more exchange modifier data objects 424 and/or user exchange modifiers 422 as described herein.

In some embodiments, an exchange modifier data object 424 refers to a data entity that defines one or more criteria for modifying an exchange value of a value-based exchange. The exchange modifier data object 424 may include one or more modification identifiers. The modification identifiers, for example, may include an exchange modification identifier (e.g., a table identifier internal to the exchange platform 102), an exchange modification key (e.g., an external representation of the exchange modification identifier, etc), a member partition (e.g., a unique identifier for the exchange modification platform 460), and/or the like. An exchange modifier data object 424, for example, may correspond to a modification provider (e.g., associated with the exchange modification platform 460). A modification provider, for example, may include an object manufacturer, a coupon and/or reward aggregator, an exchange authorization provider, such as a bank, fintech, loyalty account, etc., and/or any other entity configured to modify an exchange value. The modification provider, for example, may provide value modification mechanisms, such as discounts and/or other incentives (and/or deterrents) for obtaining an object through a value-based exchange. In some examples, the exchange modifier data object 424 may include a member partition that identifies the exchange modification platform 460.

In some embodiments, an exchange modification identifier is a unique identifier for an exchange modifier data object 424. An exchange modification identifier may include a sequence of numeric, alpha-numeric, any/or any other characters or symbols that are representative of an exchange modifier data object 424 of the exchange platform and/or member platform.

In some embodiments, an exchange modification key is a unique identifier for referencing an exchange modification identifier. The exchange modification key, for example, may be generated and/or provided by the exchange platform 102 during a registration process of an exchange modifier data object 424 with the exchange platform 102. In some examples, the exchange modification key may include a wrapped exchange modification identifier. For example, the exchange modification key may include a string of alpha-numeric characters that are formatted according to a key format established by the exchange platform 102 (and/or one or more APIs thereof). The key format, for example, may include a first portion of the characters (e.g., the first six characters) that may be reserved as a partition for identifying an entity (e.g., a member, etc.) associated with the key. For example, for an exchange modification key, the partition may include a service provider partition and/or a partner partition. A second portion of the characters may identify the exchange modification identifier.

An exchange modifier data object 424 may define one or more modification parameters for modifying an exchange value of a value based exchange. The one or more modification parameters, for example, may define one or more authorized objects and one or more modification mechanisms for modifying a value of the one or more authorized objects. In some examples, the exchange modifier data object 424 may include a status indicator and/or a count attribute. The status indicator may be indicative of a validity (e.g., an expiration, etc.) of the exchange modifier data object 424. In some examples, the status indicator may be indicative of the usage of the exchange modifier data object 424. For instance, the status indicator may include a count attribute that is indicative of a number of times that a modification mechanism of the exchange modifier data object 424 has been used. In some examples, the count attribute may include one or more contextual attributes for each use, such as an exchange identifier for each use, and/or the like.

In some embodiments, the exchange modifier data object 424 includes one or more modification parameters and/or one or more object parameters. The one or more modification parameters may be indicative of one or more modification mechanisms for modifying a value of an object and/or one or more modification requirements for applying a modification mechanism. The one or more object parameters may be indicative of one or more authorized objects for which a modification mechanism may be applied.

A modification mechanism, for example, may include a mechanism for reducing and/or increasing a value of an object of a value-based exchange.

For example, a modification mechanism may include modification incentive. A modification incentive may define a reduction amount from an object value of an object. By way of example, a modification incentive may include flat reduction amount (e.g., 5, 10, etc. dollars, euros, etc. off an object value, etc.), a percentage reduction amount (e.g., 5%, 10%, 20%, 50%, etc. off an object value, etc.), an affiliated object amount (e.g., two or more objects for the object value of one, etc.), and/or the like. In addition, or alternatively, the modification incentive may define a return amount that may define an amount returned (e.g., cash back, loyalty points, etc.) from an object value. By way of example, a return amount may include a flat return (e.g., 5, 10, etc. dollars, euros, points, etc. in return for obtaining an object, etc.), a proportional amount (e.g., 5%, 10%, 20%, 50%, 200%, etc., dollars, euros, points, etc. of an object value in return for obtaining an object, etc.), and/or the like.

As another example, a modification mechanism may include a modification deterrent. A modification deterrent may define a penalty amount in addition to an object value of an object. By way of example, a modification deterrent may include flat penalty amount (e.g., 5, 10, etc. dollars, euros, etc. in addition to an object value, etc.), a percentage penalty amount (e.g., 5%, 10%, 20%, 50%, etc. in addition to an object value, etc.), and/or the like.

A modification requirement may include one or more timing, location, member, exchange, historical exchange requirements, and/or the like, for applying a modification mechanism. For instance, a timing requirement may be indicative of a time period (e.g., one or more hours, days, months, etc.) within which a modification mechanism may or may not be used, an expiration time indicative of a time after which a modification mechanism may not be used, and/or the like. A location requirement may be indicative of a geographic location (e.g., coordinates, etc.), a physical location (e.g., a brick and mortar store, etc.), a virtual location (e.g., an online merchant platform, etc.), and/or the like that is indicative of an authorized location from which a modification mechanism may be used. A member requirement may be indicative of one or more partners, service providers, and/or other members of the exchange network for which a modification mechanism may be used. An exchange requirement may be indicative of one or more threshold value-exchange attributes, such as a threshold exchange value, a threshold number of objects, and/or the like, of a value-based exchange. A historical exchange requirement may be indicative of an exchange threshold, such as a number of value-based exchanges, and/or the like.

The object parameters may be indicative of one or more objects and/or object attributes that are authorized for using a modification mechanism in accordance with the exchange modifier data object 424. The object identifier and/or one or more object attributes may identify an object and/or one or more authorized amounts of an object.

For instance, the object parameters may include a plurality of object identifiers. The plurality of object identifiers may be indicative of a plurality of objects that are authorized for using a modification mechanism. In some examples, an object identifier may be a global object identifier. For instance, a global object identifier may be a stock keeping unit (SKU) code. In addition, or alternatively, a global object identifier may be a manufacturer part number (MPN), global trade item number (GTIN), product or service name, international standard book number (ISBN), universal product code (UPC), international article number (EIN), and/or the like. In some examples, an object identifier may include a system object identifier. A system object identifier, for example, may include an identifier (e.g., a table identifier, etc.) that corresponds to a recorded data object that represents an object within an exchange platform. In some embodiments, a system object identifier and a global object identifier are the same.

As another example, the object attributes may be indicative of one or more object attributes that are indicative of an authorized object. The one or more object attributes may be indicative of one or more objects (e.g., with one or more different object identifiers, etc.) that are authorized for using a modification mechanism. By way of example, the object attributes may be indicative of an object category (e.g., food items, etc.), an object manufacturer (e.g., Tillamook, etc.), an object type (e.g., cheese, etc.), and/or the like that is authorized for using a modification mechanism.

In some embodiments, a recorded data object is a data object that represents an object that may be involved in a value-based exchange. In some examples, a recorded data object may be an internal representation of an object for an exchange platform. For example, an object may include a distinct unit of a value-based exchange for which value is being transferred. A recorded data object for the object may include a data object that records one or more aspects (e.g., object identifiers, object attributes, etc.) of the object.

For instance, a recorded data object may include an object identifier and/or one or more object attributes for a particular object associated with a value system. The object may be based at least in part on the value system. For instance, in a financial value system, an object may be a tangible or intangible item, product, and/or the like that may be purchased in exchange for a unit of currency. In a healthcare value system, an object may be a healthcare procedure, and/or the like that may be covered by a healthcare policy.

In some examples, an exchange platform may maintain and/or have access to an object datastore that includes a plurality of recorded data objects. As described herein, the object datastore may include a plurality of recorded data objects that are at least partially sourced from one or more members of the exchange network.

In some embodiments, an object attribute is a data entity that describes a characteristic of an object. An object attribute may include an object-based attribute and/or an exchange-based attribute.

For instance, an object-based attribute may include a spatial attribute, a count attribute, a value attribute, a source attribute, a composition attribute, a categorical attribute, and/or any other attribute that is descriptive of an object characteristic. A spatial attribute, for example, may be indicative of one or more dimensions (e.g., height, width, weight, etc.) of an object, value attribute may be indicative of a value (e.g., price, etc.) of the object, a composition attribute may be indicative of one or more ingredients, components, etc. of the object, a categorical attribute may be indicative of one or more categories (e.g., food items, restricted substances, etc.) of the object, and/or the like. By way of example, one or more categorical attributes may be indicative whether an object is associated with (i) one or more general store categories, such as vegetables, fruits, dairy, meat, grains, seeds, alcohol, tobacco, in-store consumable, hot food, pharmacy, pet feed, and non-food, (ii) one or more medical categories, such as a dental, eyecare, general health, etc., (iii) one or more informational categories, such as international sources, domestic sources, etc. and/or the like. In some examples, a composition attribute may be indicative of one or more components of an object, such as a percentage by volume of alcohol within an object, one or more ingredients, such as meat, dairy-derived, peanut-derived, tree nut-derived, soy-derived, and/or the like.

In some examples, an object-based attribute may be based at least in part on the value system. For instance, in at least a financial-based value system, an object-based attribute may include one or more line item attributes, one or more line item adjustments, and/or the like. Line item attributes may include a sequence, a line item group, a product code, an item name, an item source (e.g., provider, manufacturer, etc.,), a description, a quantity, a mass (e.g., gram, kilogram, etc.,), one or more spatial dimensions (e.g., length, width, height, volume, etc.,), a unit amount, a unit tax amount, a line amount (e.g., amount of the line item), a line tax amount, and/or the like. Line item adjustments may include an adjustment type (e.g., manufactures discount, a store discount, a return, a payment cash, a payment gift card, payment other, and/or the like), an item, product, or service code, an item description, an item quantity, a unit-item, an item mass (e.g., gram, kilogram, etc.), a unit amount, a unit tax amount, a line amount (e.g., amount of the line item), a line tax amount, and/or the like.

In some examples, the one or more exchange-based attributes may be indicative of one or more aggregated exchange features. For instance, an exchange-based attribute may include a count attribute that is descriptive of a number of value-based exchanges that involve a particular object. The count attribute, for example, may be indicative of a number of units of a particular object that are obtained through a plurality of value-based exchanges. For example, as described herein, the exchange platform may increment a count attribute for an object each time an object is referenced in a value-based exchange. In some examples, the exchange platform may increment a count attribute for an object each time the object is authorized for obtaining. In some examples, a recorded data object may include a plurality of count attributes that respectively identify a number of units of an object that are obtained, authorized for obtaining, requested for obtaining, and/or for which an exchange modifier was used.

In some examples, the one or more exchange-based attributes may include exchange-specific features. For instance, an exchange-based feature may include a source attribute that is descriptive of a location (e.g., retailer, brick and mortar store, healthcare center, informational source, etc.) from which an object is obtained (e.g., purchased, etc.) through a value-based exchange. The location, for example, may include a virtual and/or physical location. In some examples, the location may depend on the value system. For instance, in a financial value system, the source attribute may identify a retailer, a particular brick and mortar store of a retailer, an online platform, and/or the like. In a healthcare value system, the source attribute may be a virtual and/or physical medical center, and/or the like. In an information value system, the source attribute may be an informational source, and/or the like.

In some examples, a recorded data object and/or a count attribute may be source specific. For instance, a different recorded data object and/or count attribute may be maintained for each source from which an object may be obtained. In addition, or alternatively, a recorded data object and/or a count attribute may be source agnostic.

In some embodiments, a user exchange modifier 422 refers to a data entity that describes a user specific instance of an exchange modifier data object 424. A user exchange modifier 422, for example, may include an instance of an exchange modifier data object 424. The user exchange modifier 422 may be assigned to one or more users associated with the exchange network. For instance, the user exchange modifier 422 may be assigned to an individual user. In such a case, the user exchange modifier 422 may include a data object that is indicative of a user identifier of the individual user and/or a modification identifier corresponding to the exchange modifier data object 424. In addition, or alternatively, the user exchange modifier 422 may be assigned to a plurality of users. In such a case, the user exchange modifier 422 may include a data object that is indicative of a plurality of user identifiers for the plurality of users and/or a modification identifier corresponding to the exchange modifier data object 424.

In some examples, the user exchange modifier 422 may include a status indicator and/or a count attribute. The status indicator may be indicative of a validity (e.g., an expiration, etc.) of the user exchange modifier 422. In some examples, the status indicator may be indicative of the usage of the user exchange modifier 422. For instance, the status indicator may include a count attribute that is indicative of a number of times that a user exchange modifier 422 has been used. In some examples, the count attribute may include one or more contextual attributes for each use, such as an exchange identifier for each use, and/or the like.

As described herein, the exchange platform 102 (e.g., the exchange modification service 408, etc.) may modify an object value for one or more objects referenced by an exchange request using the exchange modifier data object 424 (and/or a user exchange modifier 422 derivative to the exchange modifier data object 424) and one or more recorded data objects.

In some examples, a member platform, such as the partner platform 420, service provider platform 440, and/or exchange modification platform 460 may be associated with a user-facing application for facilitating one or more interactions with a user and/or other affiliated entity (e.g., through the client device 104).

In some embodiments, the user-facing application is a computer program hosted by a computing entity for facilitating one or more user interactions. A user-facing application may include software (e.g., computer readable instructions, etc.) designed to perform one or more computing tasks for a computing entity, such as a member platform. For instance, a user-facing application may facilitate communication between a member and a user. As examples, the user-facing application may be configured to present one or more user interfaces 406 (e.g., via a client device 104) for interacting with a user on behalf of a member. In some examples, the user-facing application may be configured to receive user input (e.g., via the one or more user interfaces 406) to receive information from a user.

In some embodiments, a user-facing application is a partner application 416 that is hosted by the partner platform (e.g., a member platform acting as a partner for a particular exchange, etc.) to facilitate functions for a partner. A partner application may include software (e.g., computer readable instructions, etc.) designed to perform one or more computing tasks for a partner. In some examples, the partner application 416 may be configured with one or more devices (e.g., point of sale terminals, etc.) from a standalone partner establishment (e.g., a brick and mortar bank, etc.). For instance, a partner application 416 may be configured to present one or more user interfaces 406 for interacting (e.g., browsing, purchasing, reviewing, etc.) with one or more products offered by a retail-based partner, one or more units of information offered by an information-based partner, and/or the like. In some examples, the partner application 416 may be configured to receive user input (e.g., via one or more user interfaces 406) to receive information from a user.

In some embodiments, the service provider platform 440 is configured to host one or more service provider applications 418 for managing one or more service provider instruments. For example, a user-facing application may be a service provider application 418 that is hosted by the service provider platform 440 (e.g., a member platform acting as a service provider for a particular exchange, etc.) to facilitate functions for the service provider. In some examples, the service provider application 418 may be configured with one or more devices from a standalone service provider establishment (e.g., a brick and mortar bank, etc.). A service provider application 418 may include software (e.g., computer readable instructions, etc.) designed to perform one or more computing tasks for a service provider. For instance, a service provider application 418 may be configured to present one or more user interfaces for interacting (e.g., reviewing, managing, auditing, enrolling, etc.) with one or more service provider instruments facilitated by the service provider. By way of example, in a financial value system, the service provider application 418 may enable access to a bank account, brokerage account, line of credit, and/or the like, to manage funds, assets, and/or the like, handled by the respective accounts. In some examples, the service provider application 418 may be configured to receive user input (e.g., via the one or more user interfaces 406) to receive information, authorizations, and/or the like from a user.

In some embodiments, the exchange platform 102 facilitates communication between the partner platform 420, the service provider platform 440, and/or the exchange modification platform 460 using one or more exchange interfaces.

In some embodiments, an exchange interface is a set of instructions for facilitating communications between the exchange platform 102 and one or more member platforms and/or internal services. An exchange interface may include an API, file based interface, a message queue based interface, and/or the like. For instance, an exchange interface may include an API including, as examples, one or more simple object access protocol (SOAP) APIs, one or more remote procedure call (RPC) APIs, one or more websocket APIs, one or more representational state transfer (REST) APIs, and/or the like. In some embodiments, an exchange interface may include one or more RPC APIs, such as one or more gRPC APIs.

The exchange platform 102 may include, define, and/or otherwise leverage one or more different exchange interfaces for facilitating communication with one or more external platforms, such as one or more member platforms (e.g., a partner platform 420, service provider platform 440, exchange modification platform 460, etc.). Each interface may include a plurality of communication instructions, message definitions, and/or the like for exchanging requests and/or responses between the exchange platform 102 and an entity that is taking part in a value exchange. By way of example, an exchange interface may include a partner interface 402 for facilitating communication with a partner platform 420, a service provider interface 404 for facilitating communication with a service provider platform 440, and/or an exchange modification interface 426 for facilitating communication with an exchange modification platform 460.

In some embodiments, the partner interface 402 is an exchange interface for facilitating one or more communications between a partner platform 420 and the exchange platform 102. The partner interface 402 may define one or more communication instructions, message definitions, and/or the like for facilitating one or more request messages and/or response messages between a partner platform 420 and the exchange platform 102. The partner interface 402, for example, may include an API that defines (i) requests to the exchange platform 102 from a computing entity acting as a partner platform 420 and/or (ii) requests from the exchange platform 102 to the partner platform 420. For example, the partner interface 402 may define one or more registration messages, session messages, transaction messages, and/or the like for facilitating an exchange of value for the partner. In some embodiments, the partner interface 402 defines one or more identifiers for securely identifying one or more portions of a value exchange.

In some embodiments, the service provider interface 404 is an exchange interface for facilitating one or more communications between a service provider platform 440 and the exchange platform 102. The service provider interface 404 may define one or more communication instructions, message definitions, and/or the like for facilitating one or more request messages and/or response messages between a service provider platform 440 and the exchange platform 102. The service provider interface 404, for example, may include an API that defines (i) requests to the exchange platform 102 from a computing entity acting as a service provider platform 440 and/or (ii) requests from the exchange platform 102 to the service provider platform 44-. The service provider interface 404, for example, may define one or more registration messages, session messages, transaction messages, and/or the like for facilitating an exchange of value using a service provider instrument. In some embodiments, the service provider interface 404 defines one or more identifiers for securely identifying one or more portions of a value exchange.

In some embodiments, the exchange modification interface 426 is an exchange interface for facilitating one or more communications between an exchange modification platform 460 and the exchange platform 102. The exchange modification interface 426 may define one or more communication instructions, message definitions, and/or the like for facilitating one or more request messages and/or response messages between an exchange modification platform 460 and the exchange platform 102. The exchange modification interface 426, for example, may include an API that defines (i) requests to the exchange platform 102 from a computing entity acting as an exchange modification platform 460 and/or (ii) requests from the exchange platform 102 to the exchange modification interface 426. For example, the exchange modification interface 426 may define one or more registration messages, exchange messages, exchange modifier definition messages, exchange modifier assignment messages, exchange modifier use messages, and/or the like for registering and/or facilitating the use of an exchange modifier. In some embodiments, the exchange modification interface 426 defines one or more identifiers (e.g., exchange modification identifiers, exchange modification keys, etc.) for securely identifying one or more portions of a value exchange.

The exchange platform 102 may facilitate communications between a network of member platforms. The network of members, for example, may include a plurality of entities that have been onboarded with the exchange platform 102 by, for example, registering with the exchange platform 102, configuring a respective interface for communicating with the exchange platform 102, and/or the like. In some examples, the exchange platform 102 may execute one or more individual services for interacting with each onboarded entity. The individual services, for example, may include one or more partner services 410, service provider services 412, exchange modification service 408, and/or other auxiliary services, such as a directory service (e.g., for maintaining identifier catalogs, and/or the like), and/or the like. A directory service, for example, may be used in some implementations to identify one or more identifiers (e.g., user identifiers, exchange identifiers, etc.) and/or keys (e.g., user kcys, etc.).

In some embodiments, the exchange platform 102 instantiates a separate partner-specific service, the partner service 410, for each of the network of members. In addition, or alternatively, for example in a multi-tenant environment, the partner service 410 may be instantiated for one or more partners from the network of members. The partner service 410 may be configured to execute one or more exchange operations for resolving exchange requests from a partner platform 420. In some embodiments, the exchange platform 102 instantiates a separate service provider-specific service, the service provider service 412, for each of the network of members. In addition, or alternatively, for example in a multi-tenant environment, the service provider service 412 may be instantiated for one or more service providers from the network of members. The service provider service 412 may be configured to execute one or more exchange operations for acquiring and resolving an exchange request from a partner platform 420. In some embodiments, the exchange platform 102 instantiates a separate modification provider-specific service, the exchange modification service 408, for each of the network of members. In addition, or alternatively, for example in a multi-tenant environment, the exchange modification service 408 may be instantiated for one or more modification providers from the network of members. The exchange modification service 408 may be configured to execute one or more exchange operations for managing and/or applying an exchange modifier to a value-based exchange. The exchange operations may include any of the steps and/or operations described herein.

In some embodiments, the partner service 410, the service provider service 412, the exchange modification service 408, and/or one or more other services, such as a directory service, and/or the like, may interact, through one or more local communication mechanisms, with each other and/or one or more other components of the exchange platform 102 to perform an exchange operation. For example, the exchange modification service 408 may be configured to perform one or more exchange modification operations of the present disclosure to modify an exchange value in near real time. In this manner, an exchange platform 102 may pre-process objects of an exchange request on behalf of a member platform to implement an exchange modifier.

Through the performance of one or more exchange operations, the partner service 410, the service provider service 412, and/or the exchange modification service 408 may generate and leverage a plurality of non-traditional identifiers for referencing one or more aspects of a user, a service provider instrument, a value exchange, and/or an exchange modifier. At least some of these identifiers may include universally unique identifiers, such as a UUEK, that may be leveraged to provide a credential-less value exchange. Each identifier may be at least temporarily stored in a platform data vault 414. The platform data vault 414 may include any type of memory device as described herein. In some examples, each service and/or one or more sets of services may be associated with an individual portion of the platform data vault 414.

As described herein, one or more identifiers may by stored in association with each other to form identifier mappings that may be leveraged by the exchange platform 102 (and/or one or more services thereof) to reference a user, service provider instrument, exchange modifier data object, and/or any other aspect of a value exchange from communications between the partner platform 420, the service provider platform 440, and/or any other member platform without including user credentials. An example of the non-traditional identifiers will now further be described with reference to FIG. 5.

c. Example Data Structures

Figure 5:
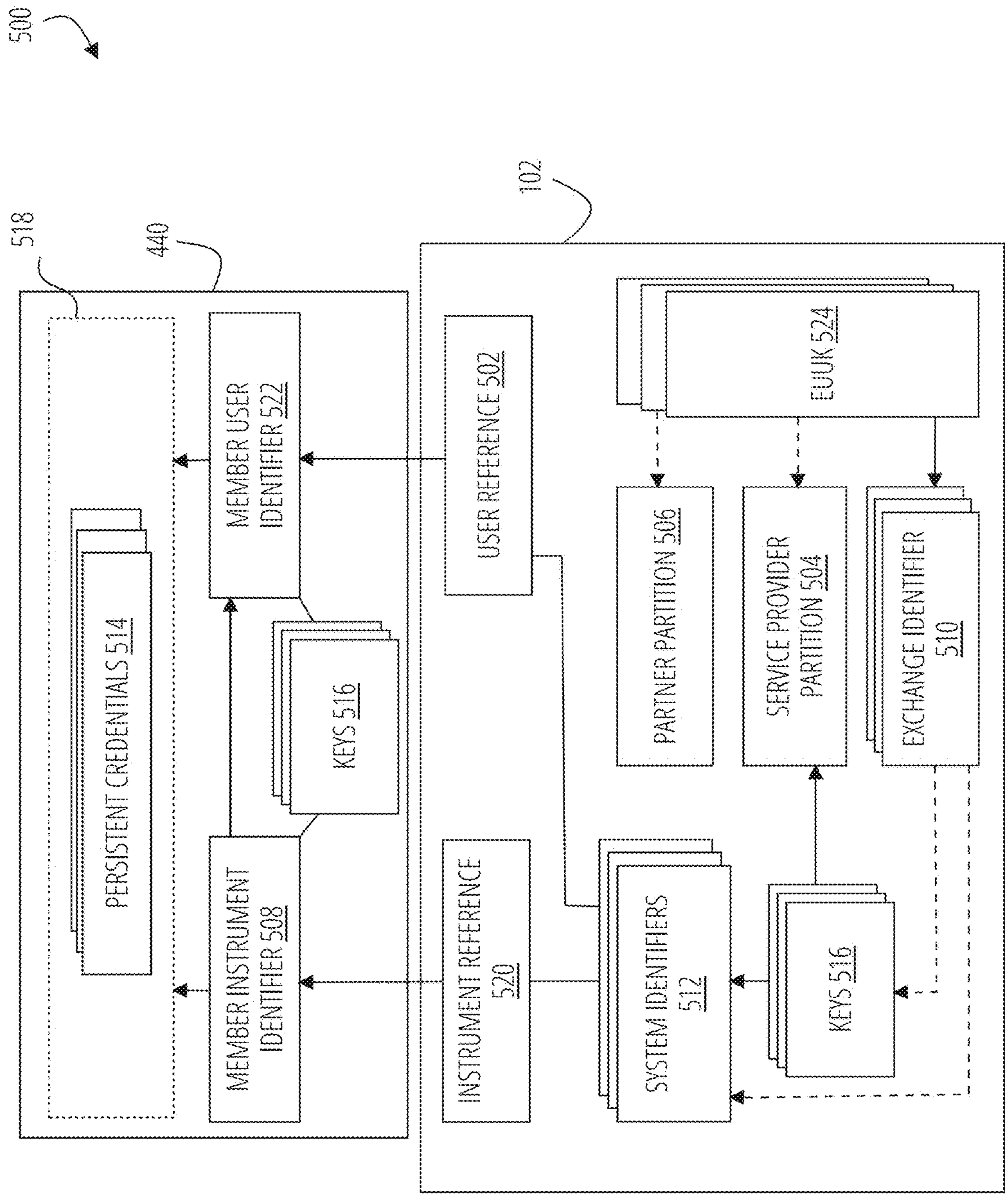
FIG. 5 is an example data diagram for facilitating a credential-less exchange of value in accordance with one or more embodiments of the present disclosure.

FIG. 5 is an example data diagram 500 for facilitating a credential-less exchange of value in accordance with one or more embodiments of the present disclosure. The data diagram 500 illustrates a plurality of related identifiers of different types. As depicted, each identifier may be associated with at least one related identifier to form identifier mappings within one or more platforms, such as the exchange platform 102 and/or a service provider platform 440. The identifier mappings empower communications between the exchange platform 102 and the service provider platform 440 that reference a service provider instrument 518 without exposing persistent credentials 514 (e.g., username, password, card number, etc.) associated with the service provider instrument 518 that are susceptible to fraud, misuse, and exploitation by malicious parties. As illustrated, using some of the techniques of the present disclosure, the persistent credentials 514 may never have to be communicated outside of a service provider platform 440. The data diagram 500 illustrates just some of the plurality of identifiers that may be generated, stored, and/or leveraged by the various embodiments of the present disclosure. It will be understood that the illustrated identifiers are not an exhaustive list and may include other, non-illustrated identifiers. Each of the identifiers may be labeled as an identifier, reference, key, and/or other similar terms. These terms are used herein interchangeably to refer to a unit of information for identifying data structures, entities, and/or any other component described herein.

As illustrated, some of the plurality of related identifiers in various embodiments of the present disclosure may include, as examples, (i) one or more user references 502 that may be mapped to member user identifiers 522 of the service provider platform 440, (ii) one or more service provider partitions 504 corresponding to a network of onboarded service provider platforms, such the service provider platform 440 and the exchange modification platform 460, (iii) one or more partner partitions 506 corresponding to a network of onboarded partner platforms, (iv) one or more instrument references 520 that may be mapped to member instrument identifiers 508 of the service provider platform 440, (v) one or more keys 516 and/or system identifiers 512 that may be associated with the user references 502 and/or instrument references 520, (vi) one or more exchange identifiers 510 that may be mapped to either the system identifiers 512 and/or the keys 516, and/or (vii) one or more UUEKs 524 that may be mapped to the exchange identifiers 510 and/or at least one of a partner partition 506 and/or the service provider partition 504.

In some examples, the service provider platform 440 may store one or more identifiers that may be mapped to a service provider instrument 518 and/or one or more identifier of the exchange platform 102 to enable the service provider platform 440 to reference a service provider instrument 518 based at least in part on identifiers that, by themselves, are not indicative of any aspect of the service provider instrument 518, including the persistent credentials 514 thereof.

By way of example, the service provider platform 440 may store, maintain, and/or otherwise access one or more keys 516 that map to (e.g., is a duplicate of, derivative of, etc.) one or more system identifiers 512 of the exchange platform 102. The keys 516, for example, may include the system identifiers 512 as a portion of the keys 516. The keys 516 may be mapped to member instrument identifiers 508 and/or member user identifiers 522 that may internally reference a user and/or service provider instrument 518 of the service provider platform. The keys 516, for example, may be provided during a registration process between the service provider platform 440 and/or the exchange platform 102.

As another example, the exchange platform 102 may store, maintain, and/or otherwise access one or more references, such as the instrument reference 520 and/or the user reference 502 that map to (e.g., is a duplicate of, derivative of, etc.) one or more member identifiers, such as the member instrument identifier 508 and/or the member user identifier 522 of the service provider platform 440. The references, for example, may be provided during a registration process between the service provider platform 440 and/or the exchange platform 102.

In some embodiments, the exchange platform 102 references each member platform of a network of member platforms using one or more entity partitions. In some embodiments, an entity partition is a unique identifier for a computing entity. An entity partition may include a unique number, alpha-numeric, and/or the like that represents a particular computing entity. An entity partition, for example, may include a member partition that represents a member platform, a service provider partition 504 that represents the service provider platform 440, a partner partition 506 that represents a partner platform 420, and/or the like.

In some embodiments, the service provider partition 504 is a unique identifier for a service provider and/or service provider platform 440 of a service provider. The service provider partition 504 may include a sequence of numeric, alpha-numeric, any/or any other characters or symbols that are representative of a service provider that is associated (e.g., onboarded, registered, etc.) with the exchange platform 102. The exchange platform 102, for example, may include a plurality of service provider partitions that respectively identify a service provider platform 440 that is affiliated with (e.g., onboarded with, registered with, etc.) the exchange platform 102. Each service provider partition 504 may represent a service provider platform 440 that has configured one or more exchange platform software development kits (SDKs), and/or like for implementing a service provider interface of the exchange platform 102.

In some embodiments, the partner partition 506 is a unique identifier for a partner and/or a partner platform of a partner. The partner partition 506 may include a sequence of numeric, alpha-numeric, any/or any other characters or symbols that are representative of a partner that is associated with the exchange platform 102. The exchange platform 102, for example, may include a plurality of partner partitions that respectively identify a partner platform that is affiliated with (e.g., onboarded with, registered with, etc.) the exchange platform 102. Each partner partition 506 may represent a partner platform that has configured one or more exchange SDKs, and/or the like for implementing a partner interface of the exchange platform 102.

In some embodiments, the entity partitions are generated to identify a member when the member platform is onboarded with the exchange platform 102. In some examples, after onboarding with the exchange platform, the member platforms may leverage one or more exchange interfaces to register one or more service provider instruments with the exchange platform 102. A service provider instrument 518 may be registered with the exchange platform 102 by exchanging one or more instrument identifiers with the exchange platform 102.

In some embodiments, an instrument identifier includes any representation of the service provider instrument 518 that identifies the service provider instrument without the exposing persistent credentials 514 of the service provider instrument 518. The instrument identifier may include a member instrument identifier 508, a system instrument identifier, an instrument reference 520, instrument key, and/or the like, as described herein.

In some embodiments, a member instrument identifier 508 is a unique identifier for representing a service provider instrument 518 within a member platform, such as the service provider platform 440. The member instrument identifier 508, for example, may include a sequence of numeric, alpha-numeric, any/or any other characters or symbols that represent a service provider instrument 518 to the service provider platform 440. In some examples, the member instrument identifier 508 may include a table identifier for a member instrument data object.

In some embodiments, the instrument reference 520 is a unique identifier for referencing a member instrument identifier 508. The instrument reference 520, for example, may be generated and/or provided by a member platform to the exchange platform 102 to allow the exchange platform 102 to reference the service provider instrument 518 maintained at the member platform. In some examples, the instrument reference 520 is the same value as the member instrument identifier 508. In some examples, the instrument reference 520 is a different value that is mapped to the member instrument identifier 508.

In some embodiments, a system instrument identifier is a unique identifier for representing a service provider instrument 518 within the exchange platform 102. The system instrument identifier, for example, may include a sequence of numeric, alpha-numeric, any/or any other characters or symbols that represent the service provider instrument 518 to the exchange platform 102 without exposing the persistent credentials 514 of the service provider instrument 518. In some examples, the system instrument identifier may include a UUID. In some examples, the system instrument identifier may include at least one of the system identifiers 512.

In some embodiments, the instrument key is a unique identifier for referencing a system instrument identifier. The instrument key, for example, may be generated and/or provided by the exchange platform 102 during a registration process of the service provider instrument 518 with the exchange platform 102. In some examples, the instrument key may include a wrapped system instrument identifier. For example, the instrument key may include a string of alphanumeric characters that are formatted according to a key format established by the exchange platform 102 (and/or one or more APIs thereof). The key format may include any number of characters, such as fifty characters or more. In some examples, the characters may be case sensitive. A first portion of the characters (e.g., the first six characters) may be reserved as a partition for identifying an entity associated with the key. For an instrument key, for example, the partition may include the service provider partition 504. A second portion of the characters may identify the system instrument identifier. In some examples, the instrument key may include at least one of the keys 516. The key formats described herein may include one or more different portions, each of which may be arranged in any order.

In some embodiments, after onboarding with the exchange platform 102, a member platform may leverage one or more exchange interfaces to register one or more users with the exchange platform 102. A user may be registered with the exchange platform 102 by exchanging one or more user identifiers with the exchange platform 102. The user identifiers, for example, may be leveraged to generate, maintain, and/or update one or more user data objects reflective of a user of a member platform and/or the exchange platform 102.

In some embodiments, a user data object is a data entity that represents a user that interacts with a member platform and/or the exchange platform 102. A user, for example, may include an entity (e.g., person, organization, group, etc.) that engages in an exchange of value governed by the exchange platform 102. In some examples, the user may indirectly cooperate with the exchange platform 102 by creating a user account with a registered service provider, registering (and/or giving permission to register) a service provider instrument 518, and/or the like. In some examples, the exchange platform 102 may act on the user's behalf without the user directly engaging with the exchange platform 102. For example, the exchange platform 102 may act as a hidden intermediary between a user-facing application and a user's service provider instrument 518.

In some embodiments, a user data object includes one or more user identifiers and/or one or more user attributes. In some examples, the one or more user identifiers and/or one or more user attributes may be based at least in part on a type of user data object. By way of example, a user may be represented in a member platform as a member user data object. In addition, or alternatively, the user may be independently represented by a system user data object in an exchange platform. In some examples, the member user data object and the system user data object may include one or more of the same one or more user identifiers and/or user attributes. By way of example, a member platform may register a plurality of users with the exchange platform 102. During registration, the member platform may provide one or more of the user identifiers and/or user attributes and, in some examples, the exchange platform 102 may return another identifier.

In some embodiments, a member user data object is an internal representation of a user within a member platform, such as the service provider platform 440. The member instrument data object may include one or more user identifiers, such as a member user identifier 522, a user key from the exchange platform 102, and/or the like. In addition, or alternatively, the member user data object may include one or more user attributes. The one or more user attributes may be indicative of one or more contextual characteristics for a user. In some examples, the user attributes may be indicative of one or more identifiable characteristics for a user. By way of example, the user attributes may be indicative of a user's first name, last name, email, physical address (e.g., one or more of a street, locality, region, postal code, country, etc.), birthday (e.g., a birth date, an age band, etc.), phone number, and/or the like. In some examples, the user attributes may include encrypted, hashed, and/or otherwise secured representations of the identifiable characteristics for a user. For instance, the user attributes may include one or more hashed identifiers for the user and/or the like.

In some embodiments, the system user data object is an external representation of a member's user within the exchange platform 102. The system user data object may include one or more user identifiers, such as a user reference 502 for a member platform, a system user identifier, and/or the like. In addition, or alternatively, the system user data object may include one or more user attributes, such as those described herein. By way of example, a member platform may register a user with the exchange platform 102. During registration, the member platform may provide the user reference 502 for the user and/or the one or more user attributes. In some examples, the user attributes may include hashed and/or encrypted identifiers for the user.

In some embodiments, a user identifier includes a unique identifier for a user involved in a value-based exchange. A user identifier may include a sequence of numeric, alpha-numeric, any/or any other characters or symbols that are representative of a user of the exchange platform 102 and/or a member platform. In some examples, a user identifier may include a user reference 502, a user key, a system user identifier, a member user identifier, and/or the like.

In some embodiments, a system user identifier is a unique identifier for representing a user within the exchange platform 102. The system user identifier, for example, may include a sequence of numeric, alpha-numeric, any/or any other characters or symbols that represent a user to the exchange platform 102. In some examples, the system user identifier may include a UUID specific to a particular user. In some examples, the system user identifier may include at least one of the system identifiers 512.

In some embodiments, a member user identifier 522 is a unique identifier for representing a user within a member platform. The member user identifier, for example, may include a sequence of numeric, alpha-numeric, any/or any other characters or symbols that represent a user to the service provider platform 440.

In some embodiments, a user reference 502 may be a unique identifier for referencing a member user identifier 522. The user reference 502, for example, may be generated and/or provided by a member platform to an exchange platform 102 to allow the exchange platform 102 to reference a user associated with the member platform. In some examples, the user reference 502 is the same value as the member user identifier 522. In some examples, the user reference 502 is a different value that is mapped to the member user identifier 522.

In some embodiments, a user key is a unique identifier for referencing a system user identifier. The user key, for example, may be generated and/or provided by the exchange platform 102 during a registration process of a user with the exchange platform 102. In some examples, the user key may include a wrapped system user identifier. For example, the user key may include a string of alpha-numeric characters that are formatted according to a key format established by the exchange platform (and/or one or more APIs thereof). The key format, for example, may include a first portion of the characters (e.g., the first six characters) that may be reserved as a partition for identifying an entity (e.g., a member, etc.) associated with the key. For example, for a user key, the partition may include a service provider partition 504 and/or a partner partition. A second portion of the characters may identify the system user identifier.

As illustrated by FIG. 5, the keys 516, such as the user and instrument keys described herein, may be shared across the exchange platform 102 and the service provider platform 440. In addition, in some examples, references, such as the instrument reference 520 and user reference 502, may be shared across entities. These identifiers, and the mapping schemes described herein, allow the exchange platform 102 to reference a service provider instrument 518 without knowledge of persistent credentials 514 (e.g., card numbers, etc.) of the service provider instrument 518. As described herein, one or more of the keys 516 and/or references may be provided to the service provider platform 440 individually, or in any combination. In some examples, each of the keys 516 and the references may be provided to the service provider platform 440 in a redundant process that allows the service provider platform to verify that a communication is provided by the exchange platform 102 (e.g., an entity with access to the specific set of keys and references, etc.).

In some embodiments, persistent credentials 514 for a service provider instrument 518 include sensitive user and/or instrument credentials, such as a card number, account number, subscription number, and/or the like, that may expose a user, member, and/or intermediary entity to risk. The persistent credentials 514 may be generated, accessed, and/or otherwise provided by a service provider platform 440 to a user when a user applies for, is authorized for, and/or otherwise is enabled to open a new service provider instrument 518. Traditionally, persistent credentials 514 are then used by the user to initiate value exchanges using the service provider instrument. By doing so, the user is forced to expose sensitive credentials that are tied directly to the service provider instrument 518 each time the service provider instrument 518 is used. The keys 516, references, and identifier mapping scheme of the present disclosure overcome these technical deficiencies.

In some examples, each of the identifiers are interpretable to a computing platform, such as the exchange platform 102 and/or service provider platform 440, but not the user. To enable the user to select a service provider instrument 518 while maintaining the enhanced security features of the present disclosure, in some examples, the identifiers of FIG. 5 may be further enhanced with instrument representations.

In some embodiments, an instrument representation (not depicted by FIG. 5) is a unique identifier for representing a service provider instrument 518 to a user, without exposing the persistent credentials 514 of the service provider instrument 518. The instrument representation, for example, may include a sequence of numeric, alpha-numeric, any/or any other characters or symbols that are outwardly representative of a service provider instrument 518 only to entities with previous knowledge of service provider instrument 518. The format and/or value of an instrument representation may be based at least in part on the type of service provider and/or service provider instrument 518. For instance, in a financial value system, an instrument representation may include a portion (e.g., the last four digits, etc.) of the persistent credentials 514, such as a card number (e.g., debit card, credit card, etc.), a financial account number, and/or the like. As another example, in an information value system, an instrument representation may include a portion (e.g., one or more digits, alpha-numeric characters, etc.) of persistent credentials 514, such as a subscription account, and/or the like. For instance, the instrument representation may include a derivative of persistent credentials 514 that may only allow entities with prior knowledge of the persistent credentials 514 to identify the persistent credentials 514 using the instrument representation. As another example, the instrument representation may include an instrument nickname that is assigned by and thereafter recognized by a user.

In some embodiments, the instrument representation may be provided (e.g., during a registration process) the exchange platform 102 in place of the persistent credentials 514. In this manner, the exchange platform 102 may represent the service provider instrument 518 using the instrument representation without knowledge of the persistent credentials 514 from which the instrument representation may be derived. For example, unlike traditional network-based exchange platforms, the exchange platform 102 may not require the persistent credentials 514 corresponding to a service provider instrument 518 to implement various computing tasks of the present disclosure. This, in turn, allows the exchange platform 102 to operate more flexibly, while storing previously unrecorded contextual data, lowering operational computing costs, and improving user and platform safeguards from infiltration attacks by malicious computing entities.

In some embodiments, the identifier mapping scheme is supplemented by unique ephemeral keys that are issued to member platforms to facilitate secure, near real time value exchanges. For example, the exchange platform 102 may facilitate additional layers of network and data security by implementing one or more exchange identifiers 510 for representing aspects of a value-based exchange. Some examples of exchange identifiers 510 may include a service provider-specific exchange identifier and/or the partner-specific exchange identifier. A service provider-specific exchange identifier may include an ephemeral, unique exchange identifier that temporarily represents the service provider instrument 518 and the service provider platform 440. The service provider-specific exchange identifier, for example, may be mapped to the system identifiers 512 for the service provider instrument 518. A partner-specific exchange identifier may include an ephemeral, unique exchange identifier that temporarily represents the service provider instrument 518 and a partner platform. The partner-specific exchange identifier, for example, may be mapped to the keys 516 for the service provider instrument 518 which may be used to identify the service provider platform 440. In some examples, such mapping may be defined by exchange data objects.

In some embodiments, an exchange data object is a data entity that represents an authorized value exchange between one or more members associated with the exchange platform 102. In some examples, the exchange data object may include one or more identifiers and/or one or more exchange attributes. For example, the one or more identifiers and/or one or more exchange attributes may be based at least in part on a type of exchange data object. By way of example, an exchange may be represented in a member platform as a member exchange data object. In addition, or alternatively, the exchange may be independently represented by a system exchange data object in the exchange platform 102. In some examples, the member exchange data object and the system exchange data object may include one or more of the same one or more identifiers and/or exchange attributes. By way of example, using some of the techniques of the present disclosure, the exchange platform 102 may issue one or more unique identifiers to a member platform that may be used to authorize a value exchange.

In some embodiments, the system exchange data object is an internal representation of a value exchange that is intermediated using the exchange platform 102. In some examples, the system exchange data object may include one or more different identifiers and/or exchange attributes depending on the role of the system exchange data object in a value-based exchange.

For example, a system exchange data object may include a service provider-specific exchange data object that corresponds to the service provider platform 440. The service provider-specific exchange data object may include one or more identifiers, such as an exchange identifier 510, system identifiers 512, such as the system user identifier and/or the system instrument identifier, a UUEK 524, and/or the like. In addition, or alternatively, the service provider-specific exchange data object may include one or more exchange attributes, such as an expiration date, a currency (e.g., for a financial value system, etc.), and/or the like.

In addition, or alternatively, the system exchange data object may include a partner-specific exchange data object that corresponds to a partner platform. The partner-specific exchange data object may include one or more identifiers, such as an exchange identifier 510, one or more keys 516, such as an instrument key, a UUEK 524, a member instrument reference (e.g., a partner-specific instrument reference, etc.), and/or the like. In addition, or alternatively, the partner-specific exchange data object may include one or more exchange attributes, such as an expiration date, a currency (e.g., for a financial value system, etc.), an instrument type, and/or the like.

In some embodiments, a member exchange data object is an external representation of a value exchange that is intermediated using the exchange platform 102. The member exchange data object may include one or more identifiers, such as a member exchange identifier, a member instrument identifier 508, a UUEK 524 from the exchange platform 102, and/or the like.

In some embodiments, an exchange identifier 510 is a unique identifier for an exchange of value using the exchange platform 102. The exchange identifier 510 may include a sequence of numeric, alpha-numeric, any/or any other characters or symbols that are representative of at least a user and/or a service provider instrument 518. In some examples, the exchange identifier 510 may include a universally unique identifier (UUID) that may be mapped (e.g., through a series of identifiers, etc.) to a user, a service provider instrument 518, and/or a member registered with the exchange platform 102. In some examples, the exchange identifier 510 may be generated using one or more UUID generators. For instance, the exchange identifier 510 may include sixteen bytes of information generated in accordance with one or more UUID formatting standards, such as UUID v4, and/or the like. Therefore, while the exchange identifier 510 may be leveraged by the exchange platform 102 and/or a member platform for one or more functions, the same exchange identifier 510 will be useless to external parties without a prior association between the exchange identifier 510 and one or more other identifiers. In addition to the prior identifier associations, the exchange identifier 510 may be associated with the exchange platform 102. Thus, even if the exchange identifier 510 is identified by an adverse party, the adverse party would still be required to impersonate the exchange platform 102 in order to use the exchange identifier 510. Moreover, the adverse party would need to update settlement accounts to accounts owned by the adverse party, among a number of other tasks before the exchange identifier 510 may be used adversely. Each of these tasks increase the amount of work necessary to overcome the layers of enhanced security added by the exchange identifier 510. When paired with the ephemeral nature of the exchange identifier 510, these tasks may become prohibitively expensive.

In some examples, the exchange identifier 510 may be externally represented by a UUEK 524. By way of example, to facilitate credential-less exchanges, the exchange platform 102 may issue one or more UUEKs 524 to one or more member platforms. As described herein, the UUEKs 524 may eliminate the reliance on traditional, persistent credentials 514 by identifying aspects of a value exchange through previously mapped data entities.

In some embodiments, a UUEK 524 is an external representation of an exchange identifier 510 that may be issued (e.g., in place of the exchange identifier 510) to an external entity, such as a user, partner platform, and/or service provider platform, and/or the like, to initiate a value-based exchange using the exchange platform 102. To do so, the UUEK 524 may be generated and issued by the exchange platform 102 to the external entity. Each UUEK 524 may include a plurality of values (e.g., up to fifty characters and/or more that may or may not be case sensitive) that represent one or more aspects of a value-based exchange. For example, the plurality of values may be indicative of an exchange identifier 510, a partition (e.g., identifying the recipient of the UUEK 524, etc.), an identifier type, and/or one or more flags. By way of example, a UUEK 524 may include a partner-specific UUEK and/or a service provider-specific UUEK. The partner-specific UUEK may be correlated to a partner-specific exchange data object and may include a partner partition 506, whereas a service provider-specific UUEK may be correlated to a service provider-specific exchange data object and may include a service provider partition 504, as described herein By way of example, a UUEK 524 may be generated in accordance with a key format. The key format may include a plurality of characters including, for example, fifty characters or more that may or may not be case sensitive. A first portion of the characters (e.g., the first six characters) may be reserved as a partition for identifying a recipient of the UUEK 524. The partition, for example, may include a partner partition 506, a service provider partition 504, and/or any other member partition. By way of example, a UUEK 524 may be issued in response to a request from an authorized member, such as an affiliated partner and/or service provider.

In addition, or alternatively, at least one character (e.g., a seventh character) of the key format may identify a format of the UUEK 524. At least another character (e.g., an eighth character) may identify a type of UUEK 524. In some examples, a second portion of the characters may identify an exchange identifier 510 (e.g., a group of twenty-two characters following the eighth character). A third portion of characters may be reserved (e.g., a group of twenty characters following the first portion of characters). An example representation is provided below:

```
ppppppFiGGGGGGGGGGGGGGGGGGGGGGrrrrrrrrrrrrrrrrrrrr
```

where p represents partition characters, F represents a format character, i represents an identifier type character, G represents the exchange identifier 510, and r represents reserved characters. The key format allows for 9.8×10 to the 84 unique permutations, which is more than the number of atoms in the known observable universe. This enables the generation and distribution of new UUEKs 524 on-demand without compromising the security of underlying data to which the UUEKs 524 may be mapped, such as identifiers for a user, an instrument, and/or any other potentially sensitive information.

As described herein, the unique sequences of identifiers and mapping schemes between the identifiers may facilitate a credential-less value exchange system for enrolled and/or unenrolled entities. In some examples, one or more of the identifiers may be generated through a registration or enrollment process configured to establish a cross-entity relationship between a user, partner, and service provider entities. The identifiers of FIG. 5 may be used to enable communication interfaces that act as a transportation vehicle for object-level attributes and exchange modifiers based at least in part on the object-level attributes. The object-level attributes, for example, may be leveraged to establish one or more user exchange modifiers in a network-based exchange modifier assignment process that is described herein with reference to FIGS. 6A-C and 7A-C.

V. Example System Operations

FIGS. 6A-C provide a process flow for facilitating a network-based exchange modifier assignment process 600 in accordance with one or more embodiments of the present disclosure. The process flow depicts a network-based process 600 for leveraging some of the communication techniques of the present disclosure to securely administer exchange modifiers to a value-based exchange at a granular, object level. The process 600 may be leveraged to overcome various limitations, such as lack of flexibility, security, and/or the like, of traditional exchange systems that expose sensitive and persistent credentials to multiple third parties, as described herein. The process 600 may be implemented by one or more computing devices, entities, and/or systems described herein. For example, via the various steps/operations of the process 600, the exchange platform may leverage the communication techniques to overcome the various limitations with traditional mechanisms of exchange by eliminating reliance on traditional exchange modifiers to provide greater flexibility and control over value-based exchange modifications.

FIGS. 6A-C illustrates an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

FIG. 6A is a flowchart showing an example of a first stage of a network-based exchange modifier assignment process 600 for generating user-specific exchange modifier without exposing static credentials associated with a user, a service provider instrument, and/or an exchange modifier. The flowchart depicts communication techniques to overcome various limitations of traditional exchange modification systems by circumventing traditional systems' reliance on sensitive user credentials and third party validation services. The communication techniques may be implemented by one or more computing devices, entities, and/or systems described herein, such as the exchange platform to establish an exchange modifier.

In some examples, the process 600 begins after an enrollment and/or registration process, in which a user and/or member platform may receive a UUEK for facilitating a credential-less exchange of value. For example, as described herein, one or more registration processes may be previously performed between one or more service provider platforms and the exchange platform to register a plurality of service provider instruments with the exchange platform. Thereafter, the exchange platform may generate and issue UUEKs to registered service provider platforms for initiating a value-based exchange using a registered service provider instrument without referencing persistent credentials for the service provider instruments. In addition, or alternatively, an enrollment process may be performed to enroll a registered service provider instrument maintained by a service provider platform with a partner platform. In some examples, the exchange platform may facilitate the enrollment process and, in response to a successful enrollment, generate and issue a UUEK to the partner platform for initiating a future value-based exchange.

In the event that a user wishes to perform a value-based exchange with a partner platform at which the user has an enrolled partner account, the partner platform may look up the enrolled partner account and identify an issued UUEK for the user from the partner account for use in authorizing the value-based exchange. In the event that the user wishes to perform a value-based exchange with a partner platform at which the user does not have an enrolled partner account, the user may present a previously issued UUEK (e.g., issued to a service provider platform, etc.) to the partner platform (e.g., through a partner application, etc.) and the partner platform may use the UUEK for authorizing the value-based exchange. For example, the partner platform may issue an exchange request with the UUEK to the exchange platform to initiate the value-based exchange.

In some embodiments, the process 600 includes, at step/operation 602, receiving an exchange modifier definition request. For example, the exchange platform (e.g., an exchange modification service, etc. thereof) may receive, using an exchange modification interface, an exchange modifier definition request. The exchange modifier definition request may be indicative of one or more modification parameters, one or more object parameters, and/or a member partition. The member partition, for example, may include a unique identifier corresponding to an exchange modification platform.

In some embodiments, the exchange modification definition request is a data entity that defines a request to generate an exchange modifier data object. The exchange modification definition request may be provided to an exchange platform from a member of the exchange network to generate an exchange modifier data object. The exchange modification definition request may be indicative of one or more modification parameters, one or more object parameters, and/or a member partition (as described herein). The member partition, for example, may identify a modification provider that may be responsible for reconciling uses of the exchange modifier data object.

In some embodiments, the process 600 includes, at step/operation 604, identifying a modification provider. For example, the exchange platform (e.g., exchange modification service, etc. thereof) may identify the modification provider based at least in part on the member partition.

At step/operation 606, in the event that the member partition corresponds to a registered modification provider, the exchange platform may proceed to step/operation 608. In the event that the member partition does not correspond to a modification provider, the exchange platform may proceed to step/operation 612.

In some embodiments, the process 600 includes, at step/operation 608, generating an exchange modifier data object. For example, in response to identifying the modification provider, the exchange platform (e.g., exchange modification service, etc. thereof) may generate the exchange modifier data object based at least in part on the one or more modification parameters and the one or more object parameters of the exchange modification request. In some examples, the exchange platform may generate one or more modification identifiers, such that the exchange modifier data object includes the one or more modification identifiers, as described herein. The exchange modifier data object, for example, may include an exchange modification identifier.

In some embodiments, the process 600 includes, at step/operation 610, generating an exchange modification key. For example, the exchange platform (e.g., exchange modification service, etc. thereof) may generate the exchange modification key based at least in part on the member partition and the exchange modification identifier, as described herein.

In some embodiments, the process 600 includes, at step/operation 612, providing an exchange modifier definition response. For example, the exchange platform (e.g., exchange modification service, etc. thereof) may provide, using the exchange modifier interface, the exchange modifier definition response.

In some embodiments, the exchange modification definition response is a data entity that defines a response to an exchange modification definition request. The exchange modification definition response may be indicative of an exchange modification key for the exchange modifier data object. In addition, or alternatively, the exchange modification definition response may be indicative of a failure to identify the modification provider (e.g., inoperable member partition, etc.). The exchange modification definition request may be provided by an exchange platform to a member of the exchange network in response to an exchange modification definition request.

In the event that a member platform is identified based at least in part on the member partition, for example, the exchange modifier definition response may be indicative of the exchange modification key. In some examples, the member platform may be configured to store the exchange modification key. As described with reference to FIG. 6B, the exchange modification key may later be used in communications with the exchange platform to reference the exchange modifier data object, without directly identifying the exchange modifier data object and/or any aspect thereof.

Next, the exchange modifier assignment process 600 may proceed to a second stage, in which a user is identified for the exchange modifier data without exposing sensitive user information, as described in further detail with reference to FIG. 6B.

Referring now to FIG. 6B, FIG. 6B is a flowchart showing an example of a second stage of an exchange modifier assignment process 600 for identifying a user associated with the exchange platform without exposing static credentials associated with the user and/or a service provider instrument associated with the user. The flowchart depicts communication techniques to overcome various limitations of traditional exchange modifier assignment systems by circumventing traditional systems' reliance on instrument references, such as a card number, and/or the like, provided by a user. The communication techniques may be implemented by one or more computing devices, entities, and/or systems described herein, such as the exchange platform for providing untraceable user keys for referencing users.

In some embodiments, the process 600 includes, at step/operation 614, receiving a user key request. For example, the exchange platform (e.g., exchange modification service, etc. thereof) may receive, using the exchange modifier interface, the user key request. The user key request, for example, may be indicative of one or more user attributes.

In some embodiments, the user key request is a data entity that defines a request to receive a user key for a user associated with an exchange network. The user key request may be provided to an exchange platform from a member of the exchange network to identify whether a user has a registered instrument with the exchange platform. The user key request may be indicative of one or more user attributes that may be correlated with a user data object to identify an individual user, as described herein.

In some embodiments, the process 600 includes, at step/operation 616, determining whether the user is registered with the exchange platform. For example, the exchange platform (e.g., exchange modification service, etc. thereof) may determine whether the user is registered with the exchange platform based at least in part on the presence of a user identifier that corresponds to the user attributes. For example, the exchange platform (e.g., service provider service, etc. thereof) may identify a user data object based at least in part on the one or more user attributes. The user data object, for example, may include a system user identifier corresponding to the one or more user attributes.

In the event that a user data object is identified with one or more matching user attributes, the process 600 may proceed to step/operation 618. Otherwise, the process 600 may proceed to step/operation 620.

In some embodiments, the process 600 includes, at step/operation 618, generating a user key. For example, the exchange platform (e.g., exchange modification service, etc. thereof) may generate the user key based at least in part on the user identifier and/or a member partition. The user key, for example, may include the user identifier wrapped by the member partition, as described herein.

In some embodiments, the process 600 includes, at step/operation 620, providing a user key response. For example, the exchange platform (e.g., exchange modification service, etc. thereof) may provide, using the exchange modifier interface, the user key response.

In some embodiments, the user key response is a data entity that defines a response to a user key request. The user key response may be provided by an exchange platform to a member of the exchange network in response to a user key request. In the event that the user key request identifies a registered user, the user key response may be indicative of a federated user key for the user. In the event that the user key request failed to identify a registered user, the user key response may be indicative of a failed user identification.

Next, the exchange modifier assignment process 600 may proceed to a third stage, in which an instance of an exchange modifier data object is assigned to an identified user, without exposing sensitive user information, as described in further detail with reference to FIG. 6C.

Referring now to FIG. 6C, FIG. 6C is a flowchart showing an example of a third stage of an exchange modifier assignment process 600 for assigning an exchange modifier data object to a user associated with the exchange platform without exposing static credentials associated with the user and/or a service provider instrument associated with the user. The flowchart depicts communication techniques to overcome various limitations of traditional exchange modifier assignment systems by circumventing traditional systems' reliance on instrument references, such as a card number, and/or the like, provided by a user. The communication techniques may be implemented by one or more computing devices, entities, and/or systems described herein, such as the exchange platform for generating user-specific user exchange modifiers using secure identifier mappings.

In some embodiments, the process 600 includes, at step/operation 622, receiving an exchange modifier assignment request. For example, the exchange platform (e.g., exchange modification service, etc. thereof) may receive, using the exchange modifier interface, the exchange modifier assignment request. For example, the exchange platform may receive an exchange modifier assignment request that is indicative of a user key and an exchange modification key.

In some embodiments, an exchange modifier assignment request is a data entity that defines a request to generate a user exchange modifier for a user. The exchange modifier assignment request may be provided to an exchange platform from a member of the exchange network to assign an instance of an exchange modifier data object to one or more users. The exchange modifier assignment request may be indicative of an exchange modification key and/or one or more user keys for the users. In addition, or alternatively, the exchange modifier assignment request may be indicative of one or more user-specific modification requirements. The user-specific modification requirements, for example, may include one or more modification requirements that may augment the modification requirements of the exchange modifier data object corresponding to the exchange modification key. In some examples, the exchange platform may generate one or more user exchange modifiers for the exchange modifier data object and the one or more users and augment the one or more user exchange modifiers with the user-specific modification requirements.

In some embodiments, the process 600 includes, at step/operation 624, determining whether an exchange modifier data object is registered with the exchange platform. For example, the exchange platform (e.g., exchange modification service, etc. thereof) may determine whether an exchange modifier data object is registered with the exchange platform that corresponds to the exchange modification key. The exchange platform, for example, may identify an exchange modifier data object based at least in part on the exchange modification key. In the event that an exchange modifier data object is identified with a matching exchange modification key, the process 600 may proceed to step/operation 626. Otherwise, the process 600 may proceed to step/operation 630.

In some embodiments, the process 600 includes, at step/operation 626, generating one or more user exchange modifiers. For example, in response to identifying the exchange modifier data object, the exchange platform (e.g., exchange modification service, etc. thereof) may generate one or more user exchange modifier based at least in part on the exchange modifier data object and one or more user keys. In some examples, the user exchange modifier may include a user exchange modification identifier. The user exchange modification identifier may include a user identifier, an exchange modification identifier, and/or one or more combinations thereof. In addition, or alternatively, the user exchange modification identifier may include a sequence of numeric, alpha-numeric, any/or any other characters or symbols that are representative of a user exchange modifier for a user.

In some embodiments, the process 600 includes, at step/operation 628, generating one or more user exchange modification keys. For example, the exchange platform (e.g., exchange modification service, etc. thereof) may generate one or more user exchange modification keys for the one or more exchange modifiers. For instance, the exchange platform may generate a user exchange modification key based at least in part on the member partition and/or the user exchange modification identifier. The user exchange modification key, for example, may be a unique identifier for referencing a user exchange modification identifier. In some examples, the user exchange modification key may include a wrapped user exchange modification identifier. For example, the user exchange modification key may include a string of alpha-numeric characters that are formatted according to a key format established by the exchange platform (and/or one or more APIs thereof). The key format, for example, may include a first portion of the characters (e.g., the first six characters) that may be reserved as a partition for identifying an entity (e.g., a member, etc.) associated with the key. For example, for a user exchange modification key, the partition may include a service provider partition and/or a partner partition. A second portion of the characters may identify the user exchange modification identifier.

In some embodiments, the process 600 includes, at step/operation 630, providing an exchange modifier assignment response. For example, the exchange platform (e.g., exchange modification service, etc. thereof) may provide, using the exchange modifier interface, an exchange modifier assignment response. In the event that the exchange modifier data object is identified, the exchange modifier assignment response may be indicative of the user exchange modification key.

In some embodiments, the exchange modifier assignment response is a data entity that defines a response to an exchange modifier assignment request. The exchange modifier assignment response may be indicative of a user exchange modification key for the user exchange modifier. The exchange modifier assignment response may be provided by an exchange platform to a member of the exchange network in response to an exchange modifier assignment request. In addition, or alternatively, in the event that the exchange modifier assignment request failed to identify a registered exchange modifier data object and/or user, the exchange modifier assignment response may be indicative of a failed request.

FIGS. 7A-C provide message flow diagrams illustrating steps/operations for establishing a user exchange modifier in relation to FIGS. 6A-C. As will be recognized, these may be executed and carried out with the corresponding steps/operations of FIGS. 6A-C. In general, the steps/operations for establishing an exchange modifier data object as illustrated in FIGS. 7A-B may be applicable and/or be related to the step/operations of FIG. 6A. For example, the steps/operations illustrated in FIGS. 7A-B may correspond to and/or be related to certain operations of the first stage of the exchange modifier assignment process 600 for generating an exchange modifier data object.

FIG. 7A depicts one example process 700 for establishing an exchange modifier data object. At step/operation 702, an exchange modification platform 460 may register with the exchange platform. For instance, in order to be able to create an exchange modifier data object, the exchange modification platform 460 may create an account with the exchange platform. In some examples, the exchange modification platform 460 may fund the account to directly compensate for the redemption of an exchange modifier data object. At step/operation 704, the exchange platform (e.g., an exchange modification service 408, etc.) may generate a member data object for the exchange modification platform 460. At step/operation 706, the exchange platform (e.g., the exchange modification service 408, etc.) may return an account key. For instance, the account key may include a member partition corresponding to the exchange modification platform 460.

Turning to FIG. 7B, FIG. 7B depicts example process 750 for establishing an exchange modifier data object. At step/operation 752, the exchange modification platform 460 may provide an exchange modification definition request to the exchange platform (e.g., the exchange modification service 408, etc.). The exchange modification definition request may be indicative of an object group and/or an exchange definition.

The object group, for example, may include a cohort of objects that are specified by individual object identifiers and/or object attributes. In some examples, an exchange modifier data object may reference an object group rather than including a plurality object parameters, as described herein. The object group may include a list of object identifiers, a list of object identifier filters, and/or a combination thereof. The object identifier filters, for example, may use regular expression matching to determine if an object identifier corresponds to an authorized object.

An exchange definition may include a set of configuration defaults that apply to exchange modifier data objects and all derivatives of the exchange modifier data object, such as user exchange modifiers. The exchange definition, for example, may be indicative of one or more modification parameters and/or object parameters for the exchange modifier data object. In some examples, the object parameters may reference an object group.

At step/operation 754, the exchange platform (e.g., the exchange modification service 408, etc.) may optionally ensure that a member data object exists for the exchange modification platform 460. In the event that the member data object does exist, at step/operation 756, the exchange platform (e.g., the exchange modification service 408, etc.) may generate an exchange modifier data object and/or object group based at least in part in the exchange modification definition request. At step/operation 758, the exchange platform (e.g., the exchange modification service 408, etc.) may provide an exchange modification definition response to the exchange modification platform 460. The exchange modification definition response may include an exchange modification key for the exchange modifier data object.

Turning to FIG. 7C, after the process 700 and/or 750, the exchange modifier assignment process 600 may proceed to a second and third stage. The second and third stage of the exchange modifier assignment process 600 is depicted by example process 780 of FIG. 7C. The example process 780 includes establishing a user exchange modifier for an exchange modifier data object.

At step/operation 782, the exchange modification platform 460 provides a user key request to the exchange platform (e.g., exchange modification service 408, etc.). At step/operation 784, the exchange platform (e.g., exchange modification service 408, etc.) may call another service of the platform (e.g., a directory service 710, etc.) to request the user key. At step/operation 786, the directory service 710 may look up the user, for example, by using one or more user attributes provided in the user key request. At step/operation 788, the directory service 710 may generate and/or identify a federated user key for the user and return the federated user key to the exchange modification service 408. At step/operation 790, the exchange modification service 408 may return the federated key (e.g., via a user key response, etc.) to the exchange modification platform 460.

At step/operation 792, the exchange modification platform 460 provides an exchange modifier assignment request to the exchange platform (e.g., exchange modification service 408, etc.). At step/operation 794, the exchange platform (e.g., exchange modification service 408, etc.) may identify an exchange modifier data object based at least in part on the exchange modifier assignment request. At step/operation 796, the exchange platform (e.g., exchange modification service 408, etc.) may generate a user exchange modifier. At step/operation 798, the exchange platform (e.g., exchange modification service 408, etc.) may return a user exchange modifier key (e.g., via an exchange modifier assignment response).

FIG. 8 provides a process flow for executing a network-based exchange using a UUEK in accordance with one or more embodiments of the present disclosure. The process flow depicts a network-based process 800 for leveraging a UUEK, a user exchange modifier, and/or recorded data objects to modify an exchange value for a value-based exchange in near real time. The process 800 may be leveraged to overcome various limitations of traditional exchange systems that are unable to handle exchange modifications in near real time, as described herein. The process 800 may be implemented by one or more computing devices, entities, and/or systems described herein. For example, via the various steps/operations of the process 800, the exchange platform may leverage the exchange modification techniques to overcome the various limitations with traditional mechanisms of exchange by enabling more flexible and secure entity to entity network communications.

FIG. 8 illustrates an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence.

In some examples, the process 800 begins after the exchange modifier assignment process 600 of FIGS. 6A-C, where the exchange platform generates a user exchange modifier on behalf of a modification provider. For example, as described herein, one or more exchange modifier assignment processes may be previously performed between one or more member platforms and the exchange platform to generate a plurality of user exchange modifiers that may be used with a UUEK to modify an exchange value of a value-based exchange on behalf of a member platform, such as an exchange modification platform.

In some embodiments, the process 800 includes, at step/operation 802, receiving an exchange request. For example, the exchange platform (e.g., a partner service, service provider service, etc. thereof) may receive an exchange request for executing a value-based exchange using a UUEK. The exchange platform may receive, through a member interface, the exchange request from a member platform. In some examples, the member platform may be a partner platform. The exchange request, for example, may be received, using a partner interface, from a partner platform different from a service provider platform that is associated with a service provider instrument.

In some embodiments, the exchange request is a data entity that defines a request to perform an exchange of value. An exchange request may be provided to an exchange platform from a member of the exchange network. The exchange request may include a UUEK and/or one or more request attributes. The one or more request attributes may include one or more object identifiers, object attributes, and/or the like.

For example, the one or more request attributes may include a plurality of object identifiers corresponding to a plurality of objects associated with the value-based exchange. In addition, or alternatively, the one or more request attributes may include one or more object attributes for the plurality of objects. For example, the one or more object attributes may include one or more object-based attributes, such as one or more line item attributes, one or more exchange-based attributes, such as a quantity of the object, a location of the object, and/or the like. For instance, an exchange request may be indicative of the exchange location from which an object is being obtained.

In some examples, the request attributes may be indicative of one or more characteristics of the value-based exchange. For example, the request attributes may be indicative of an exchange value. The exchange value, for example, may include a summation of one or more line items in a financial exchange including one or more modifiers, such as taxes, discounts, and/or the like.

In some embodiments, the process 800 includes, at step/operation 804, identifying an exchange identifier. For example, the exchange platform (e.g., a partner service, service provider service, etc. thereof) may identify the exchange identifier for the UUEK using some of the techniques described herein. As described herein, the exchange identifier may be associated with an exchange data object corresponding to the UUEK. The exchange data object may include and/or be associated with a user identifier and/or an instrument identifier for a service provider instrument of a member platform. In the event that an exchange data object is identified, the process 800 may proceed to step/operation 806. Otherwise the process 800 may return to step/operation 802.

In some embodiments, the process 800 includes, at step/operation 806, determining whether a user exchange modifier corresponds to the exchange request. For example, the exchange platform (e.g., exchange modification service, etc. thereof) may determine whether the user exchange modifier corresponds to the exchange request. In the event that a user exchange modifier is identified, the process 800 may proceed to step/operation 808. Otherwise, the process 800 may proceed to step/operation 810.

In some embodiments, the step/operation 806 may include identifying one or more user exchange modifiers for the exchange request based at least in part on the user identifier and/or the one or more request attributes. For example, the user exchange modifiers may respectively correspond to one or more exchange modifier data objects that each define one or more modification parameters and/or one or more object parameters for a respective user exchange modifier, as described herein. The user identifier may correspond to a plurality of user exchange modifiers. The user exchange modifiers for a particular exchange request may be identified from the plurality of user exchange modifiers based at least in part on a comparison between the one or more object parameters for each respective exchange modifier data object and the request attributes.

For example, the one or more request attributes may be indicative of one or more object identifiers corresponding to a plurality of objects associated with the value-based exchange. The one or more object parameters for at least one of the user exchange modifiers (e.g., a corresponding exchange modifier data object) may be indicative of one or more authorized object identifiers. The user exchange modifiers may be identified based at least in part on a comparison between the one or more object identifiers and the one or more authorized object identifiers. For instance, a user exchange modifier may be identified for each authorized object identifier that corresponds to an object identifier of the exchange request.

In addition, or alternatively, the one or more request attributes may be indicative of one or more object identifiers corresponding to a plurality of objects associated with the value-based exchange and the one or more object parameters for at least one of the user exchange modifiers (e.g., a corresponding exchange modifier data object) may be indicative of one or more authorized object attributes. In such a case, the exchange platform may identify one or more recorded data objects corresponding to the one or more object identifiers from the exchange request. Each recorded data object may include a plurality of object attributes for an object. The exchange platform may identify the user exchange modifier based at least in part on a comparison between the plurality of object attributes and the one or more authorized object attributes. For instance, a user exchange modifier may be identified for an object identifier associated with one or more of the authorized object attributes.

In some examples, the exchange platform may determine one or more authorized objects based at least in part on the request attributes and the authorized object attributes and/or authorized object identifiers of a plurality of user exchange modifiers corresponding to a user.

In some embodiments, an authorized object is an object of a value-based exchange that is authorized for use with a modification mechanism in accordance with an exchange modifier data object. An authorized object, for example, may correspond to an object identifier and/or one or more object attributes that match (e.g., strictly and/or partially) one or more object parameters of an exchange modifier data object. As an example, in a financial value system, an authorized object may be a product or service that is eligible for modification using an exchange modifier data object (e.g., a coupon, voucher, etc.). By way of example, a product may be a gallon of milk that may be associated with a SKU code and/or one or more objects attributes, such as “category: dairy,” “quantity: 1 gallon,” and/or the like. The product may be an authorized object for a value-based exchange in the event that an exchange modifier data object authorizes the SKU code and/or the one or more object attributes “category: dairy,” “quantity: 1 gallon,” and/or the like.

In some embodiments, the process 800 includes, at step/operation 808, generating a modified exchange value for the exchange request. For example, the exchange platform (e.g., exchange modification service, etc. thereof) may generate the modified exchange value. For instance, the exchange platform may generate a modified exchange value for the exchange request based at least in part on the user exchange modifier. For example, the user exchange modifiers may each correspond to a previously generated exchange modifier data object that defines one or more modification parameters. In some examples, the one or more modification parameters may include one or more modification mechanisms, as described herein.

In some examples, the exchange platform may identify an object value for an authorized object corresponding to the exchange modifier data object based at least in part on the one or more request attributes. The exchange platform may generate the modified object value for the object by applying the one or more modification mechanisms to the object value. The exchange platform may generate the modified exchange value based at least in part on the modified object value. For example, the modified exchange value may include an aggregation (e.g., summation, etc.) of the modified and/or unmodified object value for each object identified by the request attributes.

In some embodiments, the process 800 includes, at step/operation 810, providing an exchange authorization request. For example, the exchange platform (e.g., a service provider service, etc. thereof) may provide, using a service provider interface, the exchange authorization request. In some examples, the exchange authorization request may be provided, using a service provider interface, to the service provider platform The exchange authorization request may be indicative of the instrument identifier and the modified exchange value and/or the exchange value for the exchange request. For example, the exchange authorization request may be indicative of the modified exchange value in the event that an exchange modifier is applied to the exchange request. Otherwise, the exchange authorization request may be indicative of the exchange value for the exchange request.

In some embodiments, the exchange platform (e.g., a service provider service thereof) may request an exchange approval from a service provider platform of a service provider instrument correlated to the UUEK. In some examples, the exchange platform (e.g., a partner service thereof) may identify the member platform based at least in part on the UUEK (e.g., the entity partition thereof). In addition, or alternatively, the exchange platform (e.g., a service provider service thereof) may identify the service provider instrument based at least in part on the UUEK (e.g., the exchange identifier).

The exchange platform (e.g., a service provider service thereof) may provide, using the service provider interface, an exchange authorization request to the member platform. The exchange authorization request may be indicative of at least one of the one or more request attributes, an instrument identifier for the service provider instrument, and/or the modified exchange value for the exchange request. By way of example, the exchange platform may generate the exchange authorization request based at least in part on a system instrument data object identified from one or more aspects of the UUEK. The exchange authorization request may include an instrument key and/or an instrument reference from the system instrument data object.

In some examples, the exchange authorization request may be indicative of a user identifier associated with the service provider instrument. By way of example, the exchange platform may generate the exchange authorization request based at least in part on a system user data object identified from one or more aspects of the UUEK. In some examples, the system user data object may be identified based at least in part on a user identifier (e.g., system user identifier) of the exchange data object. In addition, or alternatively, the system user data object may be identified based at least in part on a user identifier (e.g., system user identifier) of the system instrument data object. In some examples, the exchange authorization request may include a user key and/or user reference from the system user data object.

In addition, or alternatively, the exchange authorization request may be indicative of an exchange identifier. By way of example, the exchange platform may generate an exchange identifier for representing the value-based exchange and provide the exchange identifier to the member platform.

In some embodiments, the process 800 includes, at step/operation 812, receiving an exchange authorization response. For example, the exchange platform (e.g., a partner service, service provider service, etc. thereof) may receive an exchange authorization response that is indicative of at least one of an exchange approval and/or an exchange denial. In some examples, the exchange authorization response may be received, using the service provider interface, from the service provider platform. In some examples, the exchange approval and/or the exchange denial may be based at least in part on the modified exchange value.

In some embodiments, the exchange platform (e.g., a service provider service thereof) may receive, using the service provider interface, an exchange authorization response that is indicative of at least one of an exchange approval and/or an exchange denial. In some embodiments, the exchange authorization response is based at least in part on a comparison between the exchange value (and/or modified exchange value) and an asset availability of a service provider instrument. For example, responsive to receiving an exchange authorization request, a member platform may be configured to compare the exchange value (and/or modified exchange value) to an asset availability of an identified service provider instrument. A value-based exchange may be authorized (e.g., resulting in an exchange approval, etc.) in the event that the asset availability exceeds the exchange value (and/or modified exchange value), otherwise the exchange may be denied (e.g., resulting in an exchange denial).

In some examples, the exchange authorization response may be indicative of one or more response attributes. The response attributes may include one or more error codes and/or the like for characterizing the exchange authorization response.

The exchange platform may generate an exchange record for the value-based exchange based at least in part on the exchange authorization request and/or the exchange authorization response. In some examples, the exchange record may be indicative of the exchange identifier, the one or more exchange attributes, the one or more response attributes, the exchange authorization response, the one or more instrument and/or user identifiers, the one or more user exchange modifiers, and/or any other data related to the value-based exchange. In some examples, the exchange platform may store the exchange record in the platform data vault in association with the one or more instrument, user, and/or modifier identifiers.

In some embodiments, the exchange platform tracks the use of exchange modifier data objects and/or user exchange modifiers on behalf of a member. For example, in response to (i) modifying an object value using a modification mechanism in accordance with user exchange modifier or (ii) an exchange approval, the exchange platform may modify a status indicator for the user exchange modifier and/or for an exchange modifier data object corresponding to the user exchange modifier. By way of example, the exchange platform may modify the status indicator to invalidate (e.g., for single use exchange modifiers) the user exchange modifier and/or for an exchange modifier data object. In addition, or alternatively, the status indicator for the user exchange modifier may include a count attribute and modifying the status indicator may include incrementing the count attribute of user exchange modifier. In some examples, the status indicator for the exchange modifier data object may include another count attribute and modifying the status indicator may include incrementing the count attribute of the exchange modifier data object. In some examples, the exchange platform may modify the status indicator to invalidate (e.g., for multi-use exchange modifiers) the user exchange modifier and/or for an exchange modifier data object based at least in part on the count attribute.

In some embodiments, the exchange platform initiates a near real time reconciliation for returning value to a member in response to the acceptance of an exchange modifier and/or an exchange approval. For example, in response to modifying an object value using a modification mechanism in accordance with the user exchange modifier, the exchange platform may provide an exchange modifier use request, based at least in part on the exchange modifier data object to a member platform (e.g., an exchange modification platform, etc.) associated with the exchange modifier data object. In some examples, the exchange modifier use request may be provided asynchronously to the exchange modification platform, such that the exchange request may be processed independently from the availability and/or accessibility of the exchange modification platform. By way of example, in response to an exchange approval, the exchange platform may provide an exchange response (e.g., at step/operation 814) and asynchronously provide an exchange modifier use request to the exchange modification platform that is indicative of the use of an exchange modifier in an approved exchange. In some examples, the exchange modifier use request may only be provided if an exchange is approved. For instance, in response to an exchange denial, the exchange platform may provide the exchange response (e.g., at step/operation 814) and ignore the exchange modifier.

The exchange modifier use request may include the exchange modification key for the exchange modifier data object and at least one of the one or more request attributes from the exchange request. The at least one request attribute, for example, may be indicative of a partner platform corresponding to the exchange request. In some examples, the modified exchange value may be decreased from an exchange value by a modification amount. The exchange modifier use request may cause a member platform corresponding to the member partition of the exchange modification key to provide the modification amount to the partner platform in near real time and/or during clearing and settlement time period (e.g., end of day, etc.).

In some embodiments, the exchange platform records a modification amount for each of a plurality of exchange modifiers used (e.g., applied in an approved exchange, etc.) throughout a settlement time period. For example, in response to an exchange approval, the exchange platform may generate an exchange modifier use data object indicative of the modification amount, an exchange modification platform, a partner platform, and/or any other data associated with the value-based exchange, such as the data recorded by an exchange record. In some examples, a plurality of exchange modifier use data objects may be generated throughout a settlement time period. At the end of the settlement time period, the exchange platform may initiate one or more settlement requests (e.g., to net settle, etc.) to the exchange modification platforms corresponding to each of the plurality of exchange modifier use data objects to initiate a reconciliation of a plurality of modification amounts.

In addition, or alternatively, the reconciliation of the modification amounts may be initiated by a respective exchange modification platform in response to the exchange modifier use request. For example, an exchange modification platform may receive an exchange modifier use request from the exchange platform. In response to the exchange modifier use request, the exchange modification platform may update a state of a corresponding exchange modifier (e.g., by incrementing a count, voiding, etc.) and/or generate a reconciliation action item for providing a modification amount to a member platform associated with the value-based exchange.

In some embodiments, the process 800 includes, at step/operation 814, providing an exchange response. For example, the exchange platform (e.g., a partner service, service provider service, etc. thereof) may provide the exchange response based at least in part on the exchange authorization response. In some examples, the exchange platform may provide, using the partner interface, the exchange response to the partner platform. The exchange response may be indicative of the exchange approval or the exchange denial.

The exchange response may be based at least in part on the exchange authorization response. For instance, the exchange response may be indicative of the exchange approval and/or the exchange denial. In some examples, the exchange response may be indicative of a replacement UUEK (if generated), one or more exchange attributes, an exchange identifier, one or more response attributes, and/or one or more user exchange modifiers. In some examples, the member platform may be configured to replace the UUEK with the replacement UUEK. For instance, the exchange response may be provided to a partner platform. The partner platform may receive the exchange response and replace the UUEK with the replacement UUEK.

FIG. 9 provides a message flow diagram 900 illustrating steps/operations for applying an exchange modifier to a credential-less exchange in accordance with one or more embodiments of the present disclosure. As will be recognized, the steps/operations of the message flow diagram 900 may be executed and carried out with the corresponding steps/operations of FIG. 8.

At step/operation 904, a user 902 may initiate a value-based exchange, for example, by providing a UUEK to a partner platform 420. At step/operation 906, the partner platform 420 may provide an exchange request to the exchange platform (e.g., partner service 410, etc.). At step/operation 908, the exchange platform (e.g., partner service 410, etc.) may look up an exchange data object corresponding to the UUEK. At step/operation 910, the exchange platform (e.g., partner service 410, etc.) may provide one or more aspects of the exchange request to another service of the platform, such as the service provider service 412 that corresponds to the exchange data object (and/or an instrument identifier thereof). At step/operation 912, the service provider service 412 may look up a user identifier and/or an instrument identifier corresponding to the exchange data object.

At step/operation 914, the service provider service 412 may provide the user identifier and/or one or more aspects of the exchange request to another service of the platform, such as the exchange modification service 408. At step/operation 916, the exchange modification service 408 may look up a plurality of user exchange modifiers corresponding to the user identifier. At step/operation 918, the exchange modification service 408 may determine one or more user exchange modifiers that are applicable to the exchange request. At step/operation 920, the exchange modification service 408 may identify an optimized set of the one or more of the applicable user exchange modifiers for the exchange request. At step/operation 922, the exchange modification service 408 may return the optimized set of the one or more of the applicable user exchange modifiers to the service provider service 412. At step/operation 924, the service provider service 412 may generate a modified exchange value for the exchange request, for example, by reducing the requested exchange value by a discounted amount indicated by the optimized set of the one or more of the applicable user exchange modifiers.

At step/operation 926, the service provider service 412 may provide an exchange authorization request to the service provider platform 440. At step/operation 928, the service provider platform 440 may approve or deny the exchange authorization request. At step/operation 930, the service provider platform 440 may provide an exchange authorization response to the service provider service 412 that is indicative of the exchange approval and/or exchange denial. In some examples, the exchange authorization response may include an exchange identifier. At step/operation 932, the service provider service 412 may generate an exchange key for the value-based exchange and provide the exchange key and data indicative of the exchange approval and/or exchange denial to the partner service 410. At step/operation 934, the partner service 410 may provide an exchange response to the partner platform 420. The exchange response may be indicative of the exchange and the exchange approval and/or exchange denial. At step/operation 936, the partner platform 420 may provide (e.g., via a partner application, etc.) an indication of the exchange approval and/or exchange denial to the user 902.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:

receiving, by one or more processors and using a partner interface, an exchange request for executing a value-based exchange, wherein the exchange request is indicative of (i) a universally unique ephemeral key (UUEK) that comprises an exchange identifier and (ii) one or more request attributes;

identifying, by the one or more processors, an exchange data object based at least in part on the exchange identifier, wherein the exchange data object comprises an instrument identifier for a service provider instrument of a member platform;

identifying, by the one or more processors, an exchange modifier for the exchange request based at least in part on the instrument identifier, the one or more request attributes, and one or more authorized object attributes;

providing, by the one or more processors and using a service provider interface, an exchange authorization request to the member platform based at least in part on the instrument identifier and the exchange modifier;

receiving, by the one or more processors and using the service provider interface, an exchange authorization response that identifies an approval or a denial for the exchange request; and providing, by the one or more processors and using the partner interface, an exchange response based at least in part on the exchange authorization response, wherein the exchange response is indicative of the approval or the denial.

2. The computer-implemented method of claim 1, wherein the one or more authorized object attributes correspond to one or more authorized object categories for the service provider instrument.

3. The computer-implemented method of claim 1, wherein the exchange modifier is identified based at least in part on the one or more request attributes and one or more modification requirements, and the one or more modification requirements comprise at least one of a timing requirement, a location requirement, a member requirement, an exchange requirement, or a historical exchange requirement for applying a modification mechanism of the exchange modifier.

4. The computer-implemented method of claim 3, wherein the timing requirement identifies a time period for applying the modification mechanism.

5. The computer-implemented method of claim 3, wherein the location requirement identifies a geographic location, a physical location, or a virtual location for applying the modification mechanism.

6. The computer-implemented method of claim 1, further comprising:

generating a modified exchange value for the exchange request based at least in part on the exchange modifier;

providing the exchange authorization request with the modified exchange value for the exchange request; and receiving the exchange authorization response based on the modified exchange value.

7. The computer-implemented method of claim 6, wherein generating the modified exchange value for the exchange request comprises:

identifying an object value for an object corresponding to the exchange modifier based at least in part on the one or more request attributes;

generating a modified object value for the object by applying a modification mechanism of the exchange modifier to the object value; and generating the modified exchange value based at least in part on the modified object value.

8. The computer-implemented method of claim 1, wherein identifying the exchange modifier for the exchange request comprises:

identifying a recorded data object associated with the exchange request, wherein the recorded data object comprises a plurality of object attributes for an object referenced within the exchange request; and identifying the exchange modifier based at least in part on a comparison between the plurality of object attributes and the one or more authorized object attributes.

9. The computer-implemented method of claim 1, wherein the exchange modifier corresponds to an exchange modifier data object, and the exchange modifier data object is previously generated by:

receiving an exchange modifier definition request, wherein the exchange modifier definition request is indicative of one or more modification parameters, one or more object parameters, and a member partition;

identifying a modification provider based at least in part on the member partition;

in response to identifying the modification provider, generating the exchange modifier data object based at least in part on the one or more modification parameters and the one or more object parameters, wherein the exchange modifier data object comprises an exchange modification identifier;

generating an exchange modification key based at least in part on the member partition and the exchange modification identifier; and providing an exchange modifier definition response indicative of the exchange modification key.

10. A system comprising:

one or more processors; and one or more memories storing processor-executable instructions that, when executed by the one or more processors, cause the one or more processors to perform operations comprising:

receiving, using a partner interface, an exchange request for executing a value-based exchange, wherein the exchange request is indicative of (i) a universally unique ephemeral key (UUEK) that comprises an exchange identifier and (ii) one or more request attributes;

identifying an exchange data object based at least in part on the exchange identifier, wherein the exchange data object comprises an instrument identifier for a service provider instrument of a member platform;

identifying an exchange modifier for the exchange request based at least in part on the instrument identifier, the one or more request attributes, and one or more authorized object attributes;

providing, using a service provider interface, an exchange authorization request to the member platform based at least in part on the instrument identifier and the exchange modifier;

receiving, using the service provider interface, an exchange authorization response that identifies an approval or a denial for the exchange request; and providing, using the partner interface, an exchange response based at least in part on the exchange authorization response, wherein the exchange response is indicative of the approval or the denial.

11. The system of claim 10, wherein the one or more authorized object attributes correspond to one or more authorized object categories for the service provider instrument.

12. The system of claim 10, wherein the exchange modifier is identified based at least in part on the one or more request attributes and one or more modification requirements, and the one or more modification requirements comprise at least one of a timing requirement, a location requirement, a member requirement, an exchange requirement, or a historical exchange requirement for applying a modification mechanism of the exchange modifier.

13. The system of claim 12, wherein the timing requirement identifies a time period for applying the modification mechanism.

14. The system of claim 12, wherein the location requirement identifies a geographic location, a physical location, or a virtual location for applying the modification mechanism.

15. The system of claim 10, wherein the operations further comprise:

generating a modified exchange value for the exchange request based at least in part on the exchange modifier;

providing the exchange authorization request with the modified exchange value for the exchange request; and receiving the exchange authorization response based on the modified exchange value.

16. The system of claim 15, wherein generating the modified exchange value for the exchange request comprises:

identifying an object value for an object corresponding to the exchange modifier based at least in part on the one or more request attributes;

generating a modified object value for the object by applying a modification mechanism of the exchange modifier to the object value; and generating the modified exchange value based at least in part on the modified object value.

17. The system of claim 10, wherein identifying the exchange modifier for the exchange request comprises:

identifying a recorded data object associated with the exchange request, wherein the recorded data object comprises a plurality of object attributes for an object referenced within the exchange request; and identifying the exchange modifier based at least in part on a comparison between the plurality of object attributes and the one or more authorized object attributes.

18. One or more non-transitory computer-readable media storing processor-executable instructions that, when executed by one or more processors, cause the one or more processors to perform operations comprising:

receiving, using a partner interface, an exchange request for executing a value-based exchange, wherein the exchange request is indicative of (i) a universally unique ephemeral key (UUEK) that comprises an exchange identifier and (ii) one or more request attributes;

identifying an exchange data object based at least in part on the exchange identifier, wherein the exchange data object comprises an instrument identifier for a service provider instrument of a member platform;

identifying an exchange modifier for the exchange request based at least in part on the instrument identifier, the one or more request attributes, and one or more authorized object attributes;

providing, using a service provider interface, an exchange authorization request to the member platform based at least in part on the instrument identifier and the exchange modifier;

receiving, using the service provider interface, an exchange authorization response that identifies an approval or a denial for the exchange request; and providing, using the partner interface, an exchange response based at least in part on the exchange authorization response, wherein the exchange response is indicative of the approval or the denial.

19. The one or more non-transitory computer-readable media of claim 18, wherein the exchange modifier corresponds to an exchange modifier data object, and the exchange modifier data object is previously generated by:

receiving an exchange modifier definition request, wherein the exchange modifier definition request is indicative of one or more modification parameters, one or more object parameters, and a member partition;

identifying a modification provider based at least in part on the member partition;

in response to identifying the modification provider, generating the exchange modifier data object based at least in part on the one or more modification parameters and the one or more object parameters, wherein the exchange modifier data object comprises an exchange modification identifier;

generating an exchange modification key based at least in part on the member partition and the exchange modification identifier; and providing an exchange modifier definition response indicative of the exchange modification key.

20. The one or more non-transitory computer-readable media of claim 18, wherein the one or more authorized object attributes correspond to one or more authorized object categories for the service provider instrument.

* * * * *